(12) United States Patent
Germeraad et al.

(10) Patent No.: US 7,966,328 B2
(45) Date of Patent: Jun. 21, 2011

(54) PATENT-RELATED TOOLS AND METHODOLOGY FOR USE IN RESEARCH AND DEVELOPMENT PROJECTS

(75) Inventors: Paul Germeraad, Saratoga, CA (US); Luke Hohmann, Mountain View, CA (US); Irving S. Rappaport, Palo Alto, CA (US); Kevin G. Rivette, Palo Alto, CA (US)

(73) Assignee: Rose Blush Software LLC, Los Altos, CA (US)

( * ) Notice: Subject to any disclaimer, the term of this patent is extended or adjusted under 35 U.S.C. 154(b) by 226 days.

(21) Appl. No.: 11/513,165

(22) Filed: Aug. 31, 2006

(65) Prior Publication Data

US 2007/0136116 A1 Jun. 14, 2007

Related U.S. Application Data

(63) Continuation-in-part of application No. 09/790,897, filed on Feb. 23, 2001, now Pat. No. 7,716,060, which is a continuation-in-part of application No. 09/545,564, filed on Apr. 7, 2000, now abandoned, and a continuation-in-part of application No. 09/260,079, filed on Mar. 2, 1999, now abandoned, and a continuation-in-part of application No. 09/560,889, filed on Apr. 28, 2000, now abandoned.

(51) Int. Cl.
*G06F 7/00* (2006.01)
*G06F 17/30* (2006.01)

(52) U.S. Cl. ........ 707/737; 707/758; 707/933; 707/934; 707/936; 707/937; 707/938

(58) Field of Classification Search .................. 707/737, 707/758, 933, 934, 936, 937, 938, 999.003, 707/999.004, 999.005
See application file for complete search history.

(56) References Cited

U.S. PATENT DOCUMENTS 4,205,780 A 6/1980 Burns et al.
(Continued)

FOREIGN PATENT DOCUMENTS

EP 0 239 884 A1 10/1987
(Continued)

OTHER PUBLICATIONS

Lamping, J. et al. "The Hyperbolic Browser: A Focus + Context Technique for Visualizing Large Hierarchies," *Journal of Visual Languages and Computing*, 7(1): 33-55, Academic Press, London, GB (Mar. 1996).
(Continued)

*Primary Examiner* — Mohammad Ali
*Assistant Examiner* — Patrick A Darno
(74) *Attorney, Agent, or Firm* — Sterne, Kessler, Goldstein & Fox, PLLC

(57) ABSTRACT

The present invention is related to patent-related tools, and methodologies involving those tools, for assisting in all stages of research and development (R&D) projects. The IPAM server may be used in conjunction with the tools and methodologies to aid in R&D projects. These tools or methods include, but are not limited to, a topographic map, a top company table, a top inventor table, a inventors by company table, a features grouping, a technology classification, a Standard Industrial Codes (SIC) classification, a patent citation tree, a patent count/year, an application count/year, a nested patent citation tree, a product/patent/revenue table, a patent/months to issue chart, and a document/annotation chart.

37 Claims, 75 Drawing Sheets

Tools for R&D Professionals

U.S. PATENT DOCUMENTS

| | | | |
|---|---|---|---|
| 4,270,182 A | 5/1981 | Asija | |
| 4,486,857 A | 12/1984 | Heckel | |
| 4,533,910 A | 8/1985 | Sukonick et al. | |
| 4,555,775 A | 11/1985 | Pike | |
| 4,613,946 A | 9/1986 | Forman | |
| 4,622,545 A | 11/1986 | Atkinson | |
| 4,686,590 A | 8/1987 | Kunii et al. | |
| 4,716,476 A | 12/1987 | Okada et al. | |
| 4,719,523 A | 1/1988 | Kutaragi | |
| RE32,632 E | 3/1988 | Atkinson | |
| 4,736,308 A | 4/1988 | Heckel | |
| 4,748,618 A | 5/1988 | Brown et al. | |
| 4,752,889 A | 6/1988 | Rappaport et al. | |
| 4,772,882 A | 9/1988 | Mical | |
| 4,785,408 A | 11/1988 | Britton et al. | |
| 4,788,538 A | 11/1988 | Klein et al. | |
| 4,812,834 A | 3/1989 | Wells | |
| 4,847,604 A | 7/1989 | Doyle | |
| 4,868,733 A | 9/1989 | Fujisawa et al. | |
| 4,873,623 A | 10/1989 | Lane et al. | |
| 4,884,223 A | 11/1989 | Ingle et al. | |
| 4,899,136 A | 2/1990 | Beard et al. | |
| 4,914,732 A | 4/1990 | Henderson et al. | |
| 4,931,783 A | 6/1990 | Atkinson | |
| 4,935,865 A | 6/1990 | Rowe et al. | |
| 4,939,507 A | 7/1990 | Beard et al. | |
| 4,959,769 A | 9/1990 | Cooper et al. | |
| 4,977,455 A | 12/1990 | Young | |
| 4,985,863 A | 1/1991 | Fujisawa et al. | |
| 4,991,087 A | 2/1991 | Burkowski et al. | |
| 5,008,853 A | 4/1991 | Bly et al. | |
| 5,021,989 A | 6/1991 | Fujisawa et al. | |
| 5,029,013 A | 7/1991 | Hiratsuka et al. | |
| 5,062,060 A | 10/1991 | Kolnick | |
| 5,072,412 A | 12/1991 | Henderson, Jr. et al. | |
| 5,120,944 A | 6/1992 | Kern et al. | |
| 5,142,674 A | 8/1992 | Barker et al. | |
| 5,148,154 A | 9/1992 | MacKay et al. | |
| 5,155,806 A | 10/1992 | Hoeber et al. | |
| 5,157,768 A | 10/1992 | Hoeber et al. | |
| 5,163,104 A | 11/1992 | Ghosh et al. | |
| 5,179,643 A | 1/1993 | Homma et al. | |
| 5,183,404 A | 2/1993 | Aldous et al. | |
| 5,206,830 A | 4/1993 | Isobe et al. | |
| 5,222,160 A | 6/1993 | Sakai et al. | |
| 5,228,123 A | 7/1993 | Heckel | |
| 5,237,158 A | 8/1993 | Kern et al. | |
| 5,241,671 A | 8/1993 | Reed et al. | |
| 5,251,294 A | 10/1993 | Abelow | |
| 5,253,362 A | 10/1993 | Nolan et al. | |
| 5,276,616 A | 1/1994 | Kuga et al. | |
| 5,283,894 A | 2/1994 | Deran | |
| 5,319,745 A | 6/1994 | Vinsonneau et al. | |
| 5,327,235 A | 7/1994 | Richards | |
| 5,334,030 A | 8/1994 | Brilliott | |
| 5,349,170 A | 9/1994 | Kern | |
| 5,353,059 A | 10/1994 | Lawlor et al. | |
| 5,359,428 A | 10/1994 | Kubota et al. | |
| 5,359,508 A | 10/1994 | Rossides | |
| 5,381,175 A | 1/1995 | Sudo et al. | |
| 5,392,428 A | 2/1995 | Robins | |
| 5,402,336 A | 3/1995 | Spiegelhoff et al. | |
| 5,404,295 A | 4/1995 | Katz et al. | |
| 5,404,514 A | 4/1995 | Kageneck et al. | |
| 5,428,778 A | 6/1995 | Brookes | |
| 5,430,681 A | 7/1995 | Sugawara et al. | |
| 5,432,897 A | 7/1995 | Tatsumi et al. | |
| 5,434,962 A | 7/1995 | Kyojima et al. | |
| 5,440,481 A | 8/1995 | Kostoff et al. | |
| 5,442,778 A * | 8/1995 | Pedersen et al. | 1/1 |
| 5,444,615 A | 8/1995 | Bennett et al. | |
| 5,444,779 A | 8/1995 | Daniele | |
| 5,452,018 A | 9/1995 | Capitant et al. | |
| 5,481,666 A | 1/1996 | Nguyen et al. | |
| 5,511,186 A | 4/1996 | Carhart et al. | |
| 5,519,857 A | 5/1996 | Kato et al. | |
| 5,530,520 A | 6/1996 | Clearwater | |
| 5,537,526 A | 7/1996 | Anderson et al. | |
| 5,540,597 A | 7/1996 | Budman et al. | |
| 5,544,302 A | 8/1996 | Nguyen | |
| 5,544,352 A | 8/1996 | Egger | |
| 5,550,976 A | 8/1996 | Henderson et al. | |
| 5,551,055 A | 8/1996 | Matheny et al. | |
| 5,553,216 A | 9/1996 | Yoshioka et al. | |
| 5,557,722 A | 9/1996 | DeRose et al. | |
| 5,557,785 A | 9/1996 | Lacquit et al. | |
| 5,559,942 A | 9/1996 | Gough et al. | |
| 5,568,639 A | 10/1996 | Wilcox et al. | |
| 5,576,954 A | 11/1996 | Driscoll | |
| 5,581,686 A | 12/1996 | Koppolu et al. | |
| 5,583,982 A | 12/1996 | Matheny et al. | |
| 5,584,035 A | 12/1996 | Duggan et al. | |
| 5,592,607 A | 1/1997 | Weber et al. | |
| 5,592,608 A | 1/1997 | Weber et al. | |
| 5,594,837 A | 1/1997 | Noyes | |
| 5,596,700 A | 1/1997 | Darnell et al. | |
| 5,604,901 A | 2/1997 | Kelley et al. | |
| 5,615,112 A | 3/1997 | Liu Sheng et al. | |
| 5,615,328 A | 3/1997 | Hadderman et al. | |
| 5,615,362 A | 3/1997 | Jensen et al. | |
| 5,619,632 A | 4/1997 | Lamping et al. | |
| 5,623,679 A | 4/1997 | Rivette et al. | |
| 5,623,681 A | 4/1997 | Rivette et al. | |
| 5,628,003 A | 5/1997 | Fujisawa et al. | |
| 5,630,125 A | 5/1997 | Zellweger | |
| 5,632,031 A | 5/1997 | Velissaropoulos et al. | |
| 5,634,012 A | 5/1997 | Stefik et al. | |
| 5,634,051 A | 5/1997 | Thomson | |
| 5,638,519 A | 6/1997 | Haluska | |
| 5,642,502 A | 6/1997 | Driscoll | |
| 5,692,176 A | 11/1997 | Holt et al. | |
| 5,696,963 A | 12/1997 | Ahn | |
| 5,721,910 A | 2/1998 | Unger et al. | |
| 5,732,216 A | 3/1998 | Logan et al. | |
| 5,748,956 A | 5/1998 | Lafer et al. | |
| 5,754,840 A | 5/1998 | Rivette et al. | |
| 5,761,497 A | 6/1998 | Holt et al. | |
| 5,765,152 A | 6/1998 | Erickson | |
| 5,774,833 A | 6/1998 | Newman | |
| 5,787,424 A | 7/1998 | Hill et al. | |
| 5,794,257 A | 8/1998 | Liu et al. | |
| 5,799,325 A | 8/1998 | Rivette et al. | |
| 5,806,079 A | 9/1998 | Rivette et al. | |
| 5,808,615 A | 9/1998 | Hill et al. | |
| 5,809,318 A | 9/1998 | Rivette et al. | |
| 5,826,252 A | 10/1998 | Wolters, Jr. et al. | |
| 5,832,476 A | 11/1998 | Tada et al. | |
| 5,848,409 A | 12/1998 | Ahn | |
| 5,870,770 A | 2/1999 | Wolfe | |
| 5,875,431 A | 2/1999 | Heckman et al. | |
| 5,892,900 A | 4/1999 | Ginter et al. | |
| 5,918,236 A | 6/1999 | Wical | |
| 5,924,090 A | 7/1999 | Krellenstein | |
| 5,933,841 A | 8/1999 | Schumacher et al. | |
| 5,950,214 A | 9/1999 | Rivette et al. | |
| 5,963,941 A | 10/1999 | Hirakawa | |
| 5,990,897 A | 11/1999 | Hanratty | |
| 5,991,751 A * | 11/1999 | Rivette et al. | 1/1 |
| 5,999,907 A | 12/1999 | Donner | |
| 6,003,033 A | 12/1999 | Amano et al. | |
| 6,006,257 A | 12/1999 | Slezak | |
| 6,041,323 A | 3/2000 | Kubota | |
| 6,067,528 A | 5/2000 | Breed et al. | |
| 6,078,913 A | 6/2000 | Aoki et al. | |
| 6,151,595 A | 11/2000 | Pirolli et al. | |
| 6,169,995 B1 | 1/2001 | Yoshimura et al. | |
| 6,175,824 B1 | 1/2001 | Breitzman et al. | |
| 6,279,014 B1 | 8/2001 | Schilit et al. | |
| 6,282,545 B1 | 8/2001 | Coats | |
| 6,339,767 B1 | 1/2002 | Rivette et al. | |
| 6,389,434 B1 | 5/2002 | Rivette et al. | |
| 6,393,406 B1 | 5/2002 | Eder | |
| 6,460,034 B1 | 10/2002 | Wical | |
| 6,499,026 B1 | 12/2002 | Rivette et al. | |
| 6,556,992 B1 | 4/2003 | Barney et al. | |
| 6,571,241 B1 * | 5/2003 | Nosohara | 1/1 |
| 6,581,039 B2 | 6/2003 | Marpe et al. | |

| | | | |
|---|---|---|---|
| 6,963,920 | B1 | 11/2005 | Hohmann et al. |
| 7,016,851 | B1* | 3/2006 | Lee .................... 705/310 |
| 7,437,471 | B2 | 10/2008 | Hohmann et al. |
| 7,523,126 | B2 | 4/2009 | Rivette et al. |
| 2002/0007373 | A1 | 1/2002 | Blair et al. |
| 2002/0035499 | A1 | 3/2002 | Germeraad et al. |
| 2002/0055924 | A1* | 5/2002 | Liming .................... 707/100 |
| 2002/0077835 | A1 | 6/2002 | Hagelin |
| 2002/0082778 | A1 | 6/2002 | Barnett et al. |
| 2003/0204514 | A1 | 10/2003 | Owens et al. |
| 2004/0073443 | A1* | 4/2004 | Gabrick et al. .................... 705/1 |
| 2007/0078886 | A1 | 4/2007 | Rivette et al. |
| 2007/0208669 | A1 | 9/2007 | Rivette et al. |

FOREIGN PATENT DOCUMENTS

| | | |
|---|---|---|
| EP | 0 694 829 A | 1/1996 |
| JP | 5-135109 | 6/1993 |
| JP | 6-231141 | 8/1994 |
| JP | 8-221435 | 8/1996 |
| WO | WO 93/25974 A1 | 12/1993 |
| WO | WO 94/14122 A | 6/1994 |
| WO | WO 95/00896 A2 | 1/1995 |
| WO | WO 95/14280 A | 5/1995 |
| WO | WO 98/16890 A1 | 4/1998 |
| WO | WO 98/34179 A1 | 8/1998 |
| WO | WO 98/44430 A1 | 10/1998 |
| WO | WO 98/55945 A1 | 12/1998 |
| WO | WO 99/62005 A1 | 12/1999 |
| WO | WO 00/11575 A1 | 3/2000 |
| WO | WO 00/52618 A2 | 9/2000 |
| WO | WO 00/60495 A2 | 10/2000 |
| WO | WO 01/73657 A1 | 10/2001 |

OTHER PUBLICATIONS

European Search Report for European Patent Application No. EP 01 1 249 936.4, published Oct. 20, 2004, 5 pages.
"'New Wave' MetricsWare—Metrics SoftwareYou Just Gotta Have", IT Metrics Strategies (Reprint), vol. II, No. 10, Cutter Information Corp.TM., 1996.
"A Few Facts About MicroPatent", from http:www.micropat.com/info/facts.htm, Printed Dec. 6, 1996.
"Advanced Patent Data Mining and Visualization Capabilities for Information Users," Apparent Press Release, London, apparent publication date of Dec. 3, 1996 (printed from Manning & Napier Information Services web page at www.mnis.net).
"Agent Searching," Executive Technologies, Inc., Last Updated: Jan. 12, 1996.
"Asian MicroPatent.RTM. Representatives", from http:www.micropat.com/info.asreps.htm, Printed Dec. 6, 1996.
"Bertelsmann Portrait", from http://www.bertelmann.de/bag/englisch/portrait, 1 page, Date Unknown.
"Boolean Searching," Executive Technologies, Inc., at http://www.cris.com/~eti/boolean.html, Last Updated: Jan. 12, 1996.
"BRS/Search," Dataware Technologies, Inc., date unclear.
"BRS/Search: An Industrial Strength Document Warehouse Solution—Profile," Dataware Technologies, Copyright May 1996, pp. 1-12.
"Business Objects Announces Data Mining Partnership With DataMind Corporation," Apparent Press Release, Cupertino, CA, apparent publication date of May 20, 1996 (printed from DataMind web page at www.datamindcorp.com).
"Business Objects to Offer Data Mining for the Masses," Apparent Press Release, San Jose, CA, apparent publication date of Nov. 18, 1996 (printed from Business Objects web page at wwww.businessobjects.com).
"Canadian MicroPatent.RTM. Representatives", from http:www.micropat.com/info/canreps.htm, Printed Dec. 6, 1996.
"CD Author/CD Answer," Dataware Technologies, date unclear.
"Chapter 1: Component Object Model Introduction," OLE Development, Microsoft Corporation, Copyright 1997, pp. 1-37.
"CHI Research Competitor Assessments," printed from the CHI Research web page at www.chiresearch.com/compet.html, pp. 1-2, Feb. 29, 1996.
"CHI Research Corporate Brain Mapping," printed from the CHI Research web page at www.chiresearch.com, pp. 1-2, 1996.
"CHI Research Merger & Acquisition Technology Due Diligence," printed from the CHI Research web page at www.chiresearch.com, pp. 1-2, 1996.
"CHI Research Tracking the World's Technology (About CHI Research, Consulting Services and Information Products, History of CHI Research, Science and Technology Indicators, Patent Citation Analysis, and Key Technology Indicators: Number of Patents, Current Impact Index, Technological Strength, Technology Cycle Time, Science Linkage)," printed from the CHI Research web page at www.chiresearch.com, pp. 1-6, 1996.
"CHI Research, Inc.: Technology Indicators Consulting Services and Products", from http://www.chiresearch.com/services.html, Copyright 1996.
"CHI Research, Inc.: Tracking the World's Technology", from http://www.chiresearch.com, Date Unknown.
"Creation/Modification of the Audio Signal Processor Setup for a PC Audio Editor", IBM Technical Disclosure Bulletin, vol. 30, No. 10, Mar. 1988.
"Dataware Technologies: Products and Services," Dataware Technologies, Copyright 1996.
"Derwent Patents Citation Index", from http://www.derwent.com/products/database/pcidesc.html, Date Unknown.
"Eastern Electricity: BRS/Search Customer Profile," Dataware Technologies, Copyright 1995.
"Essentials for Mapping Your Intellectual Property: Annuities Master Data Center", Prentice Hall Legal Practice Management, 1993.
"European MicroPatent.RTM. Representatives", from http:www.micropat.com/info/epreps.htm, Printed Dec. 6, 1996.
"EZ-C + DE2 Images: The New Standard in Data Capture," Textware Corporation, Copyright 1994, pp. 1-8.
"Forms Processing Products & Services," TextWare Coproration, Copyright 1996.
"FormWare for Windows 95/NT," TextWare Corporation, Copyright 1996.
"Fuzzy Searching," Executive Technologies, Inc., Last Updated: Jan. 12, 1996.
"Hip Products," ZyLab Europe BV, Copyright 1996.
"Hyperbolic Tree Toolkit Application: Programmer's Reference," Version 1.0, Xerox Corporation and InXight Software, Inc., Jan. 1997.
"IBM Announces Free On-Line Patent Info Service", Communications Media Center at New York Law School Web Page, Mar. 9, 1997.
"IBM Selects RSS's Royalties Payable Solution: Real Software Systems Provides IBM with Worldwide Software Royalty Payments Solution", from http://www.elcamino.com/rss/7b.htm, Nov. 18, 1996, (2Pages).
"IDI brings Basis plus down to workgroups," The Seybold Report on Publishing Systems, v. 22, n. 14, p. 16(2), Apr. 1993.
"Intellectual Property Management Issues", from http://ww.elcamino.com/rss/2.htm, Copyright 1995, 1997, (2 Pages).
"Manning & Napier Information Serivces: Competitive Intelligence Tools Migrating from Government Labs to Corporations", from http://www.mnis.net/press8.shtml, May 15, 1997.
"Manning & Napier Information Services HomePage", from http://www.mnis.net, Date Unknown.
"Manning & Napier Information Services: AFCEA Intelligence Professionals Adopt New Paradigm for Information Analysis", from http://www.mnis.net/press10.shtml, Jun. 11, 1997.
"Manning & Napier Information Services: Breakthrough in Intelligent Information Analysis From Software That Thinks Like Humans", from http://www.mnis.net/press2.shtml, Sep. 16, 1996.
"Manning & Napier Information Services: Competitive Intelligence", from http://www.mnis.net/compete.shtml. Date Available on Internet Unknown.
"Manning & Napier Information Services: Crawler Technology (Trygon)", from http://www.mnis.net/trygon.shtml, Date Available on Internet Unknown.
"Manning & Napier Information Services: Innovative Technology Tool Unveiled", from http://www.mnis.net/press4.shtml, Dec. 3, 1996.

"Manning & Napier Information Services: Intellectual Property", from http://www.mnis.net/intellect.shtml, Date Available on Internet Unknown.

"Manning & Napier Information Services: Manning & Napier and RTI announce alliance for corporate information market", from http://www.mnis.net/press9.shtml, May 15, 1997.

"Manning & Napier Information Services: Manning & Napier Offers Broad Coverage of Computer and Software Technology Databases", from http://www.mnis.net/press5.shtml, Dec. 3, 1996.

"Manning & Napier Information Services: MNIS Announces System for Improving Software Patents—at ABA Conference", from http://www.mnis.net/press.shtml, Jun. 28, 1996.

"Manning & Napier Information Services: Patent Licensing Made Easier With MNIS Data Mining Tools", from http://www.mnis.net/press6.shtml, Jan. 30, 1997.

"Manning & Napier Information Services: Zolowicz to Head Intellectual Property Unit at Manning & Napier Information Services", from http://www.mnis.net/press3.shtml, Nov. 18, 1996.

"Manning & Napier: Manning & Napier Information Services", from http://www.mnis.net/press7.shtml, Apr. 25, 1997.

"MAPit: Prevent Patent Infringement with the Virtual Patent Advisor", from http://www.mnis.net/mapitdemo, Date Available on Internet Unknown.

"Master Data Center: PC Master Patent Lite for Windows", Master Data Center, Date Unknown.

"Master Data Center: PC Master Trademark Lite for Windows", Master Data Center, Date Unknown.

"MasterView for Microsoft Windows," TMS Inc., Copyright 1993.

"MicroPatent PatentWEB and Trademark WEB Service Agreement", from http:www.micropat.com/cgi-bin/servagree, Printed Dec. 6, 1996.

"MicroPatent: Providers of Patent and Trademark Information", from http:www.micropat.com/info/mission.htm, Printed Dec. 6, 1996.

"Micro Patent's CD-ROM Products", from http:www.micropat.com/info/about.htm, 1996.

"NetAnswer Hosting Service," Dataware Technologies, Inc., Copyright 1995.

"NetAnswer: Information Super Server for the World Wide Web," Dataware Technologies, Inc., Copyright 1995.

"NetAnswers: Organizations Worldwide Take Content Onto the Web with NetAnswer," Dataware Technologies, Spring 1996.

"New Investment Bank Formed to Serve the South Florida Business Community". Business Wire. Mar. 24, 1999.

"Patent Abstracts of Japan—Now on CDROM", from http://www.netaxs.com/.about.aengel/PAJ/PAJInfo.html, Last Updated Dec. 22, 1995.

"Patent Searching and Document Delivery Resources", from http:www.micropat.com/info/websrch.htm, 1996.

"Patent-Monitor", from http:www.fachinformation.bertelsmann.de/verlag/wb/profil.htm, Date Unknown.

"PatentQuery: Search & Deliver", from http:www.micropat.com/info/prelegal.htm, Printed Dec. 6, 1996.

"Performance Management: The Way it Should be . ", Panorama Business Views, Inc., Date Unknown.

"Platinum technology and Sybase Inc. Expand Partnership to Deliver Wider Selection of Data Warehouse Solutions", from http:www.platinum.com/press/1996/dw_sybas.htm, Jun. 11, 1996.

"re:Search V. 2.6," Software Product Specification, Computer Select, Nov. 1993.

"Real Software Systems, Inc.", from http://ww.elcamino.com/rss/, Copyright 1995, 1997, (2Pages).

"Real Software Systems, Inc.: Alliant Participation Management & Accounting", from http://www.elcamino.com/rss/3b.htm, Copyright 1995, 1997, (4 Pages).

"Real Software Systems, Inc.: Home Video & Title Based Distribution", from http://www.elcamino.com/rss/3d.htm, Copyright 1995, 1997, (3 Pages).

"Real Software Systems, Inc.: Rights Licensing", from http://www.elcamino.com/rss/3c.htm, Copyright 1995, 1997, (3 Pages).

"Real Software Systems, Inc.: Royalties Payable", from http://www.elcamino.com/rss/3a.htm, Copyright 1995, 1997, (4 Pages).

"Solutions for managing Intellectual Property", from http://www.elcamino.com/rss/3.htm, Copyright 1995, 1997, (2 Pages).

"Specialized Services", from http://www.elcamino.com/rss/4.htm, Copyright 1995, 1997, (2 Pages).

"Tech-Line CD User Manual Part 1 Abridged Version for the World Wide Web," printed from the CHI Research web page at www.chiresearch.com, pp. 1-3, 1996.

"Text Retrieval Products & Services," TextWare Corporation, Copyright 1996.

"TextWare Pricing," TextWare Corporation, Effective Mar. 26, 1996.

"TextWare: Instant Information Access," TextWare Corporation, Copyright 1995.

"The Digital Patent Office", Smartpatents, Inc., Date Unknown.

"The History of MicroPatent", from http:www.micropat.com/info/history.htm, Printed Dec. 6, 1996.

"Toshiba America Information Systems: CD-ROM Customer Profile," Dataware Technologies, Copyright 1995.

"Total Recall," Dataware Technologies, Copyright 1995.

"Turning Information Into Insight," Press Release, The Business Wire, Apr. 25, 1997 (printed from Manning & Napier Information Services web page at www.mnis.net).

"United States MicroPatent.RTM. Representatives", from http:www.micropat.com/info.usreps.htm, Printed Dec. 6, 1996.

"Universal Selects RSS to Provide Worldwide television Licensing Solution", from http://www.elcamino.com/rss/7c.htm, Apr. 30, 1997, (2 Pages).

"Voyager cd-roms," Voyager, Spring, 1996.

"Voyager: CD-Rom Catalog," Voyager, pp. 1-79 (42 Pages), 1996-1997.

"Welcome to ISTA", from http://www.netaxs.com/.about.aengel/ista.htm, Date Unknown.

"Welcome to MicroPatent's PatentWEB.TM.. for Patent Information", from http:www.micropat.com/info/welcome.htm, Printed Dec. 6, 1996.

"Welcome to the MicroPatent PatentWeb", from http:www.micropat.com/patentwebindex.htm, 1996.

"What our customers say about us.", from http://www.elcamino.com/rss/5.htm, Copyright 1995, 1997, (2 Pages).

"Where will we be?", from http:www.micropat.com/info/shows.htm, 1996.

"Why should you be interested in Patent Information?", from http:www.micropat.com/info/interested.htm, Printed Dec. 6, 1996.

"WorldView V. 1.1 and WorldView Press V. 1.0.2," Software Product Specification, Computer Select, Nov. 1993.

"Zylmage Web Server; Powerful Imaging and Full Text Retrieval for Pulishing OnLine," at http://www.zylab.nl/zylab/p2/zyimageweb.html, ZyLab Europe BV, Copyright 1996.

"Zylmage," ZyLab International, Inc., Copyright 1996.

"Zylmage: Common Questions Asked About Zylmage," ZyLab Europe BV, Copyright 1996.

"ZyIndex for Windows User's Guide," ZyLab Division, Copyright 1992, pp. 1-262.

"Zylab retrieval engine optimized for CD-ROM; Zylab, Progressive Technologies merge," Seybold Report on Desktop Publishing. vol. 8, No. 10, Jun. 6, 1994, p. 40.

"ZyLab: The Full Text Retrieval & Publishing Experts," ZyLab Europe BV, Copyright 1996.

2002 NAICS Matched to 1987 SIC; NAICS Mining; UD Census Bureau.

A. Pelham, A Wave of the Wand for Litigators. Tools of the Trade Go High-Tech, Focus on Technology, Legal Times, Jan. 24, 1994.

Aho et al., "Data Structures and Algorithms", ISBN 0-201-00023-7, 1983.

Albano, R.E. and Keska, J.P., "Is design realization a process? A case study," Electronic Manufacturing Technology Symposium, Sep. 25-27, 1989, pp. 344-354.

Alexander, M., "Visualizing Cleared-Off Desktops", ComputerWorld, May 6, 1991, p. 20.

Alexander, S., "Users find tangible rewards digging into data mines", Infoworld, vol. 19, Issue 27, pp. 61-62, (Jul. 1997).

Alpert, M., CD-ROM: The Next PC Revolution, Fortune Magazine, Jun. 29, 1992.

Alpert, M., Easy Access to Patents, Fortune Magazine, Jun. 29, 1992.

Banet, "Creating a CD-ROM: overview of the product field," The Seybold Report on Desktop Publishing, v. 7, n. 6, p. 3(29), Feb. 1993.
Becker, "Voyager kit: Ticket to books on-line," MacWeek, vol. 7, No. 8, Feb. 22, 1993, p. 57.
Berk et al. eds., Hypertext/Hypermedia Handbook, pp. 209-224, 285-297, 329-355, 529-533, Jan. 1991.
Bermant, "Finding it Fast: New Software Features That Search Your System," Personal Computing. vol. 11, No. 11, Nov. 1987, pp. 125-131.
Bish, "An Essential ingredient: Post recognition processing," Imaging World, vol. 5, Issue 3, Mar. 1996.
Blatt, J., A Primer on User Interface Software Patents, The Computer Lawyer, vol. 9, No. 4, Apr. 1992.
Bobbie, P.O., "Clustering Relations of Large Databases for Parallel Querying," Proceedings of the Twenty-Seventh Annual Hawaii International Conference on System Sciences, 1994, pp. 246-252.
Boedeker et al., "Choosing Imaging Software," Law Office Computing. vol. 5, Issue 3, Jun./Jul. 1995, pp. 50-55.
Bradbury, "Expanded Book Toolkit," MacUser. vol. 9, No. 3, Mar. 1993, p. 85.
Briggs, "CD-ROM publishing boom is Dataware's delight," MIS Week. vol. 10, No. 38, Sep. 25, 1989, pp. 40-41.
Briggs, "Dataware Comes to U.S. With CD-ROM Publishing," MIS Week. vol. 10, No. 5, Jan. 30, 1989, p. 21.
Brockschmidt, "What OLE is Really About," OLE Development, Microsoft Corporation, Copyright 1997, pp. 1-59.
Brockschmidt, Inside OLE 2, Microsoft Press, Redmond, WA, Copyright 1994.
Catchings et al., "Price Delineates Text-Retrieval Software," PC Week. vol. 8, No. 20, May 20, 1991, pp. 120-123.
Catchings et al., "Retrieval Technologies Inc.: re:Search 2.0," PC Week, v. 8, n. 20, p. 121(2), May 1991.
Catlin et al., InterNote: Extending a Hypermedia Framework to Support Annotative Collaboration, Hypertext '89 Proceedings, pp. 365 to 378, Nov. 1989.
Charniak et al., Introduction to Artificial Intelligence, Addison Wesley, 1986.
Classified Search and Image Retrieval Student Manual, U.S. Patent and Trademark Office, May 7, 1991.
Cohen, "Browsers get BookWorm for Mac," MacWeek. vol. 7, No. 39, Oct. 4, 1993, p. 4.
Commands and Settings, OmniPage Professional Windows Version 5, Caere Corporation, Chapter 1, pp. 1-1 to 1-70, 1988-1993.
Conklin, "Hypertext: An Introduction and Survey," Computer, pp. 17-41, Sep. 1987.
Cooper et al., "Oh! Pascal!," pp. 389-399, Jan. 1982.
Australian Examiner's First Report from Appl. No. 36091/00, mailed May 21, 2003, 2 pages.
International Search Report from PCT Appl. No. PCT/US00/05080, 6 pages, mailed Dec. 18, 2000.
International Search Report from PCT Appl. No. PCT/US00/09382, 3 pages, mailed Jun. 12, 2000.
International Search Report from PCT Appl. No. PCT/US01/09584, 1 page, mailed Jun. 8, 2001.
International Search Report from PCT Appl. No. PCT/US98/10923, 2 pages, mailed Oct. 19, 1998.
International Search Report from PCT Appl. No. PCT/US99/19050, 1 page, mailed Nov. 19, 1999.
International Search Report issued Dec. 7, 2000 for PCT Appl. No. PCT/US00/09382, 7 pages.
Cote et al., "Searching for Common Threads," Byte, vol. 17, No. 6, Jun. 1992, pp. 290-305.
Coxeter, "Non-Euclidean Geometry", University of Toronto Press, 1965.
Creating Value Through Knowledge Management Conference, Conference handouts, San Francisco, CA, Feb. 20 and 21, 1997.
Curran, "Growing company changes data entry," ImagingWorld. vol. 4, Issue 3, Mar. 1995.
Dialog Pocket Guide, by Knight-Ridder Information, Inc., Copyright 1995.
Dintzner, J.P. and J. Van Thielen, "Image Handling at the European Patent Office: Bacon and First Page," World Patent Information, vol. 13, No. 3, pp. 152-154, 1991.
Doherty, "New Op-Disk Peripherals Displayed at Conference," Electronic Engineering Times. No. 339, Jul. 22, 1985, p. 15.
Duncan, "Zylmage's Use of Windows Interface Falls Short of Mark," LAN Times. vol. 10, Issue 10 May 24, 1993, pp. 70 and 79.
Editing Recognized Documents, OmniPage Profession Windows Version 5, Caere Corporation, Chapter 3, pp. 3-1 to 3-20, 1988-1993.
Edvinsson, Leif et al., Intellectual Capital: Realizing Your Company's True Value by Finding its Hidden Brainpower, HarperBusiness, New York, NY, 1997.
English Abstract for Japanese Patent Publication No. 05-135109, supplied by the Japanese Patent Office, 2 pages, Jun. 1, 1993.
English Abstract for Japanese Patent Publication No. 06-231141, supplied by the Japanese Patent Office, 2 pages.
English Abstract for Japanese Patent Publication No. 08-221435, supplied by the Japanese Patent Office, 2 pages.
English Language Abstract of 'Kumamoto, K., "Commercial databases: the keypoints and practical use. 10. Patent and Trademark," Joho Kanri, vol. 36, No. 10, pp. 914-938 (Jan. 1994),' 1 page, printed from Dialog Inspec database.
English Language Abstract of 'Otake, Y., "Information each department in corporate needs from the standpoint of R&D department," Joho Kanri, vol. 34, No. 7, pp. 635-646 (Oct. 1991),' 1 page, printed from Dialog Inspec database.
Fersko-Weiss, "3-D Reading with the Hypertext Edge," PC Magazine. vol. 10, No. 10, May 28, 1991, pp. 241-282.
Fish et al., Quilt: a collaborative tool for cooperative writing, Conf. on Information Systems '88, pp. 30 to 37, Jan. 1988.
Gerber, "Lotus rolls out gateway for Notes, cc: Mail," InfoWorld, v. 14, n. 46, p. 1(2), Nov. 1992.
Germeraad, Paul. "Intellectual Property in a Time of Change". Research Technology Management. Nov./Dec. 1999. vol. 42, Iss. 6, pp. 34-39.
Germeraad, Paul; Lorraine Morrison. "How Avery Dennison Manages its Intellectual Assets". Research Technology Management. Nov./Dec. 1998. vol. 41 Iss. 6. pp. 36-43.
Graham et al., "Browsing Within Time-Driven Multimedia Documents", Institute for Computer Research, University of Waterloo, Waterloo, Ontario, Canada, pp. 219-227, Jul. 1988.
Grunder, O. et al., "An Approach to Model and Evaluate Innovation and Concurrent Engineering Projects," Emerging Technologies and Factory Automation, vol. 1, Oct. 10-13, 1995, pp. 155-163.
Halasz et al., "Issues in the Design of Hypermedia Systems," CHI '90 Tutorial, Jan. 1990.
Halperin, M.R. et al. "Firm and Industry Characteristics Influencing Publication of Scientists in Large American Companies," R.D. Management 17: 167-173; reprinted online in Essays of an Information Scientist: 1998. Science Literacy, Policy, Evaluation, and Other Essays, vol. 11, location at <http://www.garfield.library.upenn.edu/essays/v11p246y1998.pdf>, last accessed on Jul. 14, 2009, pp. 246-250.
Harney, "TextWare's FormWare—Complex Data Capture that Puts Simplicity First," Imaging Mazazine. Apr. 1996.
Haskin, "Textware 4.0: Text Retrieval for Electronic Documents," Computer Shopper. vol. 13, No. 8, Aug. 1993, pp. 334-335.
Haskin, "Zylmage Finds Images and Text," PC-Computing, vol. 6, No. 5, May 1993, p. 60.
Help Yourself! With PCT Patent Search on CD-ROM, MicroPatent, New Haven, CT, appears to be before Jul. 1, 1993.
Holtz, "Mastering Ventura; Second Edition," pp. 360-375, Jan. 1989.
How to Install and Use the USAPat Demonstration Disc, USPTO Office of Information Products Development, 1994(?).
HyperCard Basics, Apple Computer, Inc., pp. iii-iv and 1-31( 1990).
Iandiorio, Joseph S., "From Start to Finish: Protecting Ideas and Inventions wit Intellectual Property ," Electro/95 International Professional Program Proceedings, Jun. 21-23, 1995, Hynes Convention Center, Boston, MA, pp. 141-149.
Introduction to Dataware's CD-ROM Product and Services, at http://www.dataware.com/site/prodserv/cdintro.htm, 12 pages (n.d.).
Ishii, H., et al., "Clearface: Translucent Multiuser Interface for Team Work Station", Proceedings of the Second European Conference on Computer-Supported Cooperative Work, Sep. 1991, pp. 163-174.
Ishii, H., et al., Toward an Open Shared Workspace, Communications of the ACM, Dec. 1991, vol. 34, No. 12, pp. 37-50, 68.

Jonckheere, W., "EPOQUE (EPO QUEry service) the Inhouse Host Computer of the European Patent Office," World Patent Information, vol. 12, No. 3, pp. 155-157, 1990.
Jordan, K.A. and Zawilski, A.J., "Specification of a Rapid Prototyping Capability for the Automated Patent System," IEEE, 1990, pp. 76-81.
Kahaner, Larry, Competitive Intelligence: From Black Ops to Boardrooms—How Businesses Gather. Analyze. and Use Information to Succeed in the Global Marketplace, Simon & Schuster, New York, NY, 1996.
Karraker, "Voyager Toolkit stretches Expanded Book concept to let users pen their own," MacWeek, vol. 6, No. 11, Mar. 16, 1992, p. 9.
Kevin G. Rivette et al., U.S. Appl. No. 08/341,129, filed Nov. 18, 1994, entitled Method and Apparatus for Synchronizing, Display and Manipulating Text and Image Documents.
Kevin G. Rivette et al., U.S. Appl. No. 09/138,368, filed Aug. 21, 1998, entitled "System, Method, and Computer Program Product for Managing and Analyzing Intellectual Property (IP) Related Transactions."
Kevin G. Rivette et al., U.S. Appl. No. 09/260,079, filed Mar. 2, 1999, entitled "Intellectual Property Asset Manager (IPAM) for Context". Processing of Data Objects.
Kim et al., "Patent Technology Portfolio for SAW Filters," Proceedings 1994 IEEE Ultrasonics Symposium, vol. 1, pp. 139-142, 1994.
Kincaid et al., "electronic calendars in the office: An assessment of user needs and current technology", CAN, vol. 3, No. 2, pp. 89-102, Jan. 1985.
Knibbe, "Zylmage 2 boosts, OCR, batch duties," InfoWorld, vol. 15, Issue 51, Dec. 20, 1993, p. 20.
Knibbe, "Zylmage 3.0 will facilitate distribution on CD-ROMs; Boasts integration with WordScan OCR software," InfoWorld, vol. 16, No. 38, Sep. 19, 1994, p. 22.
Kramer, J., "An Evaluation of the Internet as a Searching Tool for Patents and Intellectual Property: Alternative or Complementary?", from http://www.fplc.edu/ipmall/ipcorner/evals97/ipsi97/internetpatsearch.htm, Publication date appears to be before Jun. 2, 1997, Downloaded May 8, 1998.
Kumamoto, K., "Commercial Databases: The Keypoints and Practical Use. 10. Patent and Trademark," Joho Kanri, vol. 36, No. 10, pp. 914-938, Jan. 1994 (article in Japanese and English abstract submitted herewith).
Lamping et al., A Focus+Context Technique Based on Hyperbolic Geometry for Visualizing Large Hierarchies, obtained via the Internet at http://www.acm.org/sigchi/chi95/electronic/documents/papers/jl.sub.13bdy.html, Jan. 1995.
Lamping, John and Ramana Rao. "Visualizing Large Trees Using the Hyperbolic Browser." Proceedings of the Conference on Human Factors in Computing Systems (Apr. 13-18, 1996). Vancouver, British Columbia, Canada.
Lexis-Nexis Printout of a Business Wire Article Entitled: TMS Announces Easy View Available for CD-ROM Publishers, Business Wire Inc., Mar. 9, 1992.
Lexis-Nexis Printout of a Business Wire Article Entitled: TMS Announces Contract With Major Insurance Information Provider, Business Wire Inc., Feb. 11, 1991.
Lexis-Nexis Printout of a Business Wire Article Entitled: TMS Announces Release of Inner View 2.1 Software. Business Wire Inc., Mar. 18, 1991.
Liebeherr, J. et al., "The Effect of Index Partitioning Schemes on the Performing of Distributed Query Processing," IEEE Transactions on Knowledge and Data Engineering, vol. 5, No. 3, Jun. 1993, pp. 510-522.
Lougher et al., Supporting long-term collaboration in software maintenance, Conf. on Organizational Computing Systems, pp. 228-238, 1993.
Lucas, Jay, "The Progress of Automation at the U.S. Patent and Trademark Office," World Patent Information, vol. 14, No. 3, pp. 167-172, 1992.
Lucena, John J., "Merlot Design Specification", Version 1.0—D2, Last modified Jun. 24, 1996.
Luke Hohmann, Journey of the Software Professional a Sociology of Software Development, Prentice Hall PTR, New Jersey, 1997.

Mallory, "New for Mac: text/graphics retrieval software from TMS," Newsbytes, Jul. 1992.
Marshall et al., "Zylndex for Windows, Version 5.0," InfoWorld, v. 15, n. 21, May 1993, pp. 127, 129, 133 and 137.
Marshall, "Text retrieval alternatives: 10 more ways to pinpoint important information," Infoworld, vol. 14, No. 12, Mar. 23, 1992, pp. 88-89.
Marshall, "Zylmage adds scanning access to Zylndex," InfoWorld, vol. 16, No. 15, Apr. 11, 1994, pp. 73, 76, and 77.
Marshall, "Zylmage is Zylndex plus a scan interface integrated," InfoWorld. vol. 15, Issue 10, Mar. 8, 1993, p. 100.
Matazzoni, "Expanded Book Toolkit 1.0.1," Macworld. vol. 10, No. 6, Jun. 1993, p. 158.
McEvoy, Ed., Object Linking and Embedding: Programmer's Reference, Version 1, Microsoft Press, Redmond, WA, Copyright 1992.
MDC Patent Rules Update, May 1996.
MDC Trademark Rules Update, Apr. 1996.
Mendelson, "HyperWriter for Windows," PC Magazine, vol. 14, No. 3, Feb. 7, 1995, pp. 140, 142, and 143.
Mogee Research & Analysis Associates, Homepage URL:http://www.mogee.com, (What We Do) and Hyperlinks (Who We Are(1); Who We Are(2); Competitive Technology Reports; Competitive Technology Report:GPS; Competitive Technology Report:Medical Implants; Data resources; Consulting Services), 1996.
Mogee Research and Analysis Associates: "International Technology Monitoring and Competitive Assessment," at http://www.mogee.com, 2 pages (1996).
Mogee Research and Analysis Associates: Competitive Technology Report: Global Positioning System (GPS) Technology, at http://www.mogee.com/gps.htm, 3 pages (1996).
Mogee Research and Analysis Associates: Competitive Technology Report: Medical Implants, at http://www.mogee.com/mi.htm, 3 pages (1996).
Mogee Research and Analysis Associates: Competitive Technology Reports, at http://www.mogee.com/ctr.htm, 3 pages (1996).
Mogee Research and Analysis Associates: Consulting Services, at http://www.mogee.com/consult.htm, 6 pages (1996).
Mogee Research and Analysis Associates: Data Resources, at http://www.mogee.com/data.htm, 5 pages (1996).
Moise, "Elemental Geometry from an Advanced Standpoint," Addison-Wesley, 1974.
Moore, "Dataware lands $6.6M GPO pact," Federal Computer Week. vol. 9, No. 27, Sep. 11, 1995, pp. 84 and 86.
Moore, "The Forms Processing Paradigm Shift," Imaging Magazine. Mar. 1995.
Mylls, R., Information Engineering Case Practices and Techniques, Wiley-Interscience, ISBN 0-471-58711-7, pp. 180-201.
Narin, F. et al., "Technological Performanc Assessments Based on Patents and Patent Citations," IEEE Transactions on Engineering Management, vol. EM-31, No. 4, Nov. 1984, pp. 172-183.
Narin, Francis, "Tech-Line Background Paper", CHI Research, Inc., Hadden Heights, NJ 08035.
Narin, Francis, Presentation Figures, "In the Realm of Technology, Asia Looms Ever Larger: Patent Citation as Measures of Corporate and National Strength, Presented at: Stanford University, Asia/Pacific Research Center, Stanford, California," Oct. 29, 1992.
Nils J. Nilsson, Principles of Artificial Intelligence, Morgan Kaufmann, Los Altos, Calif., 1980.
Omiecinski, E. et al., "Performance Analysis of a Concurrent File Reorganization Algorithm for Record Clustering," IEEE Transactions on Knowledge and Data Engineering, vol. 6, No. 2, Apr. 1994, pp. 248-257.
OmniPage Professional Tutorials, Windows Version 5, Caere Corp, pp. 1-1 to 1-34, 2-1 to2 2-26, and 3-1 to 3-14 (1988).
Ores, "Hypertext Publishing: Edit Trail," PC Magazine, vol. 14, No. 3, Feb. 7, 1995, pp. 132, 134, 136, and 138.
Otake, Y., "Information Each Department in Corporate Needs from the Standpoint of R&D Department," Joho Kanri, vol. 34, No. 7, pp. 635-646, Oct. 1991 (article in Japanese and English abstract submitted herewith).
Parker et al., "Simulation of a coordinated accident rescue system", pp. 5963, CAN.
Patent Abstracts of Japan, JP06231141, published Aug. 19, 1994.

PatentImages. User Profile European Patents. Search & Tech Tips. Conference Calendar, MicroPatent World Newsletter, Spring 1991, New Haven, CT.

Patents on CD-ROM. Track Technology. Focus R&D. Watch Competitors. Speed Products to Market. Cut Online/Copy Costs. A World of Opportunities from MicroPatent, MicroPatent USA, New Haven, CT, appears to be before Sep. 1, 1992.

Patrick P. Chan, "Learning Considerations in User Interface Design: The Room Model", Software Portability Laboratory, University of Waterloo, Waterloo, Ontario, Canada, Jul. 1984.

Paul B. Germeraad et al., U.S. Appl. No. 09/560,618, filed Apr. 28, 2000, entitled "Patent-Related Tools and Methodology for Use in the Licensing Process".

Paul B. Germeraad et al., U.S. Appl. No. 09/560,889, filed Apr. 28, 2000, entitled "Patent-Related Tools and Methodology for Use in the Merger & Acquisition Process".

Paul B. Germeraad et al., U.S. Appl. No. 09/564,828, filed May 4, 2000, entitled "Patent-Related Tools and Methodology for Use in the Licensing Process".

Paul B. Germeraad et al., U.S. Appl. No. 09/565,126 filed May 4, 2000, entitled "Patent-Related Tools and Methodology for Use in the General Management of a Business".

Paul B. Germeraad et al., U.S. Appl. No. 10/178,540, Jun. 22, 2002, entitled "Using Hyperbolic Trees to Visualize Data Generated by Patent-Centric and Group-Oriented Data Processing".

Paul B. Germeraad, U.S. Appl. No. 09/545,564, filed Apr. 7, 2000, entitled "Patent-Related Tools and Methodology for Use in Research and Development Projects".

Paul B. Germeraad, U.S. Appl. No. 09/560,619, filed Apr. 28, 2000, entitled "Patent-Related Tools and Methodology for Use in the General Management of a Business".

PC Master Lite Booklet, Master Data Center Intellectual Property Software and Services, 1996.

Perenson, "Retrieving Text on the Net," PC Magazine. vol. 14, No. 20, Nov. 21, 1995, p. 61.

Previewing the Letter, WordPerfect Workbook for IBM Personal Computers, WordPerfect Corporation, Version 5.0, Lesson 4, p. 24 and Lesson 13, pp. 108-109, 1988.

Print out of On-Line Help Manual, Innerview for Windows 3.0, Version 2.2, Pre-Release #6, TMS, Inc. 1991-1992.

Quattro Pro User's Guide, Borland Int'l, Inc., pp. 240-245, Jan. 1989.

R. W. Wiggins, "Networked Hypermedia: The World-Wide Web and NCSA Mosaic", from the Internet for Everyone—A Guide for Users and Providers. Chapter 13, pp. 245-290, McGraw-Hill, Inc., 1995.

Rappaport, I., "Time to Count Your Patents the Way You Would Beans", PCWeek, vol. 14, No. 2, Jan. 13, 1997.

Rooney, "Text-retrieval veterans prepare Windows attack," PC Week, v. 9, n. 24, p. 46, Jun. 1992.

Rooney, "ZyLab partners with Calera: firms roll out document-image system," PC Week, vol. 10, No. 3, Jan. 25, 1993, p. 22.

Samtani, Rajan, "Following the Money: Managing Intellectual Property in the Digital Managing Age", from http://www.elcamino.com/rss/7a.htm, Copyright 1995, 1997, (5 Pages).

Schroeder, "Low Price Point is Key for Buyers of Text Databases," PC Week, vol. 8, No. 20, May 20, 1991, pp. 120 and 122.

Schroeder, "Multimedia offerings target expanded platform support," PC Week, vol. 10, No. 13, Apr. 5, 1993, pp. 59 and 73.

Schwartz, "Dataware Plants CD-ROM Seeds," Computer Systems News, No. 403, Feb. 6, 1989, p. 33.

Search Results from Dialog Search for MicroPatent for News Releases and Corporate Anouncements Relating to APS, FullText, PatentImages, Espace, Dialog Files: 148, 479 and 648, 1989-1991.

Sibley, J.F., "STN Express 4.0, a professional software for successful online searches," World Patent Information, Elsevier Publishing, Mar. 1, 1997, vol. 19, No. 1, pp. 73-75.

Sibley, J.F., "The EPOQUE Suite of Applications," World Patent Information, Elsevier Science Ltd., 1996, vol. 18, No. 3, pp. 141-148.

Simon, "ZyImage: A Winning Combination of OCR and Text Indexing," PC Magazine. vol. 12, No. 6, Mar. 30, 1993, p. 56.

Simpson, Mastering WordPerfect 5.1 & 5.2 for Windows, p. 58-60, (1993).

SmartPatent Quarterly Newsletter, vol. 2, No. 3, Winter 1996-1997.

SmartPatent Quarterly Newsletter, vol. 2, No. 4, Spring/Summer 1997.

Somers, "Personal Text-Retrieval Software Works with Calera's WordScan," PC Magazine. vol. 14, No. 2, Jan. 24, 1995, p. 68.

Spencer, "Tijuana data entry shop logs 500K forms/day," ImagingWorld. vol. 4, Issue 4, Apr. 1995.

Spitzer, "Needles in Document Haystacks" DBMS. vol. 9, No. 1, Jan. 1996, pp. 84-87.

Stefanov, V. "Some Possibilities of a "Patents" Database in Determining a Firm's Policy," World Patent Information, vol. 17, No. 3, 1995, pp. 201-204.

Stewart, T.A., "Getting Real About Brainpower", Fortune, Nov. 27, 1995, (pp. 201-203).

Stewart, T.A., "Mapping Corporate Brainpower", Fortune, Oct. 30, 1995, (pp. 209-211).

Stewart, Thomas A., "Trying to Grasp the Intangible," Fortune, vol. 132, No. 7, Oct. 2, 1995, pp. 157-159.

Stewart, Thomas A., "Your Company's Most Valuable Asset: Intellectual Capital," Fortune, vol. 130, No. 7, Oct. 3, 1994, pp. 68-74.

Stewart, Thomas, Intellectual Capital: The New Wealth of Organizations, Doubleday, 1997.

Sullivan, "Dataware's CD Author System to Boast Hypertext Capability," PC Week, vol. 8, No. 31, Aug. 5, 1991, pp. 31-32.

Tech-Line CD Indicators of Technological Excellence Manual Including Introduction to Company Evaluation Using Technology Indicators, Bertelsmann Informations Service, CHI Research Inc., TT-Technologie-Transfer GmbH, 1994.

The Complete Document Profiling and Retrieval System for Windows, World Software Corporation, Worldox, Copyright World Software Corp., 1992.

The Fastest. Most Powerful Full Text Retrieval System, ZyIndex 5.2 for Windows, ZyLab, 1994.

Thoma, Elke et al. "Entwicklungen bei Patentdatenbanken," *NfD* 46:331-340 (1995). (German language document and English translation).

Thompson et al., Full Write Professional—A User's Guide, pp. 99-122, 1988.

Torgan, "ZyImage: Document Imaging and Retrieval System," PC Magazine. vol. 12, No. 3, Feb. 9, 1993, p. 62.

Tredennick, Jr., J. C., Full-Text Search and Retrieval Winning Big With Computers, Law Practice Management, vol. 19, No. 8, Nov./Dec. 1993.

Tribute, "Searching CeBit for publishing products; Power Mac draws the crowds at Hannover show," Seybold Report on Publishing Systems, vol. 23, No. 15, Apr. 22, 1994, pp. 5-8.

Ueda, H., et al., "An Interactive Natural-Motion-Picture Dedicated Multi-Media Authoring System", Human Factors in Computing Systems—Reaching Through Technology Conference Proceedings, Mar. 1991, pp. 343-350.

Understanding OCR, OmniPage Professional Windows Version 5, Caere Corporation, Chapter 6, pp. 6-1 to 6-8 and Glossary pp. 1-8, 1988-1993.

Vantive Corporation Home Page (Delivering TRUE Customer Asset Management) and Various Hyperlinks (Vantive Products and Services; Solution Partners; Vantive HelpDesk; Vantive Sales; Free White Paper), Vantive, 1996.

Warshofsky, Fred, The Patent Wars: The Battle to Own the World's Technology, John Wiley & Sons, Inc., 1994.

Welcome! TextWare Corporation, from http://www.textware.com/, printed Oct. 29, 1996, 1 page.

Williams, J. et al., "STN Easy: point-and-click patent searching on the World Wide Web," World Patent Information, Elsevier Science Ltd., 1997, vol. 19, No. 3, pp. 161-166.

Young, "UK Police Put Criminals On-Line With New National Computer," Imaging Magzine. Aug. 1995.

ZyIMAGE: Archive Text Fast, at http://www.zylab.nl/zylab/p2/zyimage.html, ZyLAB International, Inc., 1 page (1996).

ZyIndex Developer's Toolkit for Windows, Version 5.0, Programmer's Guide Information Dimensions, Inc., Copyright 1992, pp. 1-35.

Dataware Products and Services, at http://www.dataware.com/site/prodserv/prodserv.htm, 2 pages.

Derwent Patents Citation Index, at http://www.derwent.com/products/database/pcidesc.html, 2 pages.

Full Write Professional—A User's Guide, Ashton-Tate Corp., pp. 99-122 (1988).

Mogee Research and Analysis Associates: Who We Are: Company Information, at http://www.mogee.com/whower_1.htm, 3 pages (1996).

Mogee Research and Analysis Associates: Who We Are: Personal Biographies, at http://www.mogee.com/whower_2.htm, 3 pages (1996).

NetAnswer Hosting Service, Dataware Technologies, Inc., 4 pages (Oct. 1995).

English Language Abstract of Japanese Publication No. 08-221435, 1 page, printed from the JPO PAJ webpage at http://www1.ipdl.jpo.go.jp, date of publication of application—Aug 30, 1996.

* cited by examiner

R&D Tools Map

| Ref | Tool | Description | Idea | Preliminary Assessment | Feasibility | Development | Scale-up | Portfolio |
|---|---|---|---|---|---|---|---|---|
| 202 | Topographic map | Overall view of related art, uses, competitors | 1 | 10 | 21 | 33 | | 51 |
| 204 | Top Company Table | Ranked List of Companies | 2 | | | | | |
| 206 | Top Inventor Table | Ranked List of Inventors | 3 | | | | | |
| 208 | Inventors by Company Table | Ranked List of Inventors in each Company | | 11 | 22 | | | |
| 210 | Features Grouping | Overall view of feature set to offer | 4 | 12 | 23 | 34 | | |
| 212 | Technology classification | Which technical fields produce similar feature sets | | 13 | 24 | 35 | 44 | |
| 214 | SIC classification | Which market segments can use the product / services | 5 | 14 | 25 | 36 | | |
| 216 | Patent count / year | How fast is product / use technology changing | | 15 | 26 | 37 | 45 | |
| 218 | Patent count / year | How fast is project technology changing | 6 | 16 | 27 | 38 | 46 | |
| 220 | Application count / year | Which other companies are active in project area | 7 | 17 | 28 | 39 | 47 | |
| 222 | Technology by Company map | Technical assessment of serious competitors and partners | 8 | 18 | 29 | 40 | | |
| 224 | Patent Citation Tree | View of which companies can block and/or circumvent other's patents | | 19 | 30 | 41 | 48 | |
| 226 | Nested Patent Citation Tree | Prediction of related technology / markets under exploration | | | | | | |
| 228 | Product / Patent / Revenue Table | Which products, and their revenue stream size, are protected by patents | | | | | | 52 |
| 230 | Patent, Months to Issue | How long is typical company & patent office cycle time per field | 9 | 20 | 31 | 42 | 49 | 54 |
| 232 | Document / Annotation | Immediate, linked, searchable documentation of facts and ideas | | | 32 | 43 | 50 | 55 |

FIG. 2

FIG. 3
TOOL #1
A MAP OF SIMILAR IDEAS, ART AND MARKETS

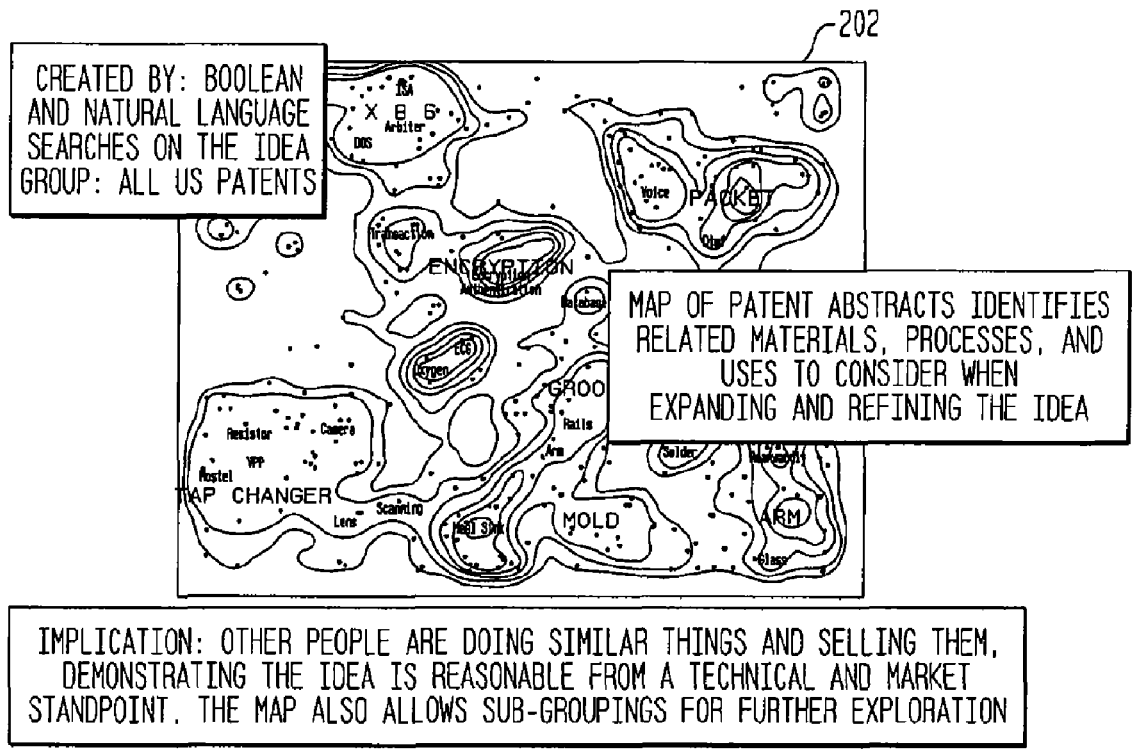

CREATED BY: BOOLEAN AND NATURAL LANGUAGE SEARCHES ON THE IDEA GROUP: ALL US PATENTS

MAP OF PATENT ABSTRACTS IDENTIFIES RELATED MATERIALS, PROCESSES, AND USES TO CONSIDER WHEN EXPANDING AND REFINING THE IDEA

IMPLICATION: OTHER PEOPLE ARE DOING SIMILAR THINGS AND SELLING THEM, DEMONSTRATING THE IDEA IS REASONABLE FROM A TECHNICAL AND MARKET STANDPOINT. THE MAP ALSO ALLOWS SUB-GROUPINGS FOR FURTHER EXPLORATION

TOOL #10
MAP OF SIMILAR TECHNOLOGIES & USES

TOOL #21
A MAP OF TECHNOLOGY AND USES THE PROJECT TEAM
IS FOCUSED ON REFINING

TOOL #33
MAP OF COMPETITIVE TECHNOLOGY AND USES

TOOL #51
MAP OF COMPANY COMPETENCY & NEW PROJECTS

Tool #2
A Table of Assignees

204

Assignee - U.S. Patent Count Report for Microwave Food Heating - US Patents

| Assignee | Document Count |
|---|---|
| Matsushita Electric Industrial Co., Ltd. | 81 |
| Raytheon Company | 77 |
| General Electric Company | 59 |
| | 48 |
| | 46 |
| | 42 |
| | 36 |
| | 33 |
| | 33 |
| | 27 |
| | 25 |
| Amana Refrigeration, Inc. | |
| E. I. Du Pont de Nemours and Company | |
| James River Corporation | |
| Champion International Corporation | |
| E. Khashoggi Industries | |
| Minnesota Mining and Manufacturing Company | |
| The United States of America as represented by the Secretary of the | |
| International Paper Company | |
| Sanyo Electric Co., Ltd. | |
| Andrew Corporation | 16 |
| Daewoo Electronics Co., Ltd. | 15 |
| Golden Valley Microwave Foods, Inc. | 15 |
| International Flavors & Fragrances Inc. | 15 |
| Mobil Oil Corporation | 15 |
| Nabisco Brands, Inc. | 15 |
| The Procter & Gamble Company | 15 |

Created By: Boolean and Natural Language Searches on the Idea.
Group: All US Patents Table of Assignees Gives New Ideas on Technology and Markets to Consider When Expanding and Refining the Idea Implication: Shows the Quality and Variety of Top Companies Who Are Also Active in Areas Surrounding the Idea

FIG. 9

Tool #3
A Table of Inventors

Inventor - U.S. Patent Count Report for Microwave Food Heating - US Patents — 206

| Inventor Name | Document Count |
|---|---|
| Levinson, Melvin L. | 21 |
| Hodson, Simon K. | 20 |
| Kusunoki, Shigeru | 20 |
| Pawlowski, Thomas D. | 19 |
| Seaborne, Jonathan | 18 |
| Lentz, Ronald R. | 15 |
| Simpson, James E. | 14 |
| Watkins, James D. | 14 |
| Byrne, Brian | 14 |
| Doble, Michael J. | 13 |
| Dudley, Kenneth W. | 12 |
| Fitzmayer, Louis H. | 10 |
| Norris, John R. | 10 |
| Schiffmann, Robert F. | 10 |
| Turpin, Charles H. | 10 |
| Buck, Ronald G. | 9 |
| Colato, Albert E. | 9 |
| Cox, David H. | 9 |

Created By: Boolean and Natural Language Searches on the Idea.
Group: All US Patents Table of Inventors Identifies People Who Have Worked In This Area on Which to Run Literature Searches Implication: Shows the Quality and Variety of Top Individuals Who Are Active in Areas Surrounding the Idea.

Shared Under NDA - Copywrite 1999 Aurigin Systems,Inc. All Rights Reserved

FIG. 11

Tool #11
A Table of Inventors by Assignee

Inventor - U.S. Patent Count by Assignee for Microwave Food Heating - US
Patents

| Inventor Name | Assignee | Document Count |
|---|---|---|
| Levinson, Melvin L. | General Housewares Corporation | 20 |
|  |  | 1 |
|  |  | 21 |
|  | E. Khashoggi Industries | 17 |
|  | E. Khashoggi Industries, LLC | 2 |
|  | E. Khashoggi. Industries | 1 |
|  |  | 20 |
|  | Patentsmith Corporation |  |
|  | Patentsmith Corporation |  |
|  | Patentsmith II, Inc. |  |
|  | Patentsmith Technology, Ltd. |  |
|  | Smith, Donald P. |  |
| Bowen, Robert F. | Raytheon Company |  |
| Tanaka, Junzo | Matsushita Electric Industrial C |  |
| Pesheck, Peter S. | The Pillsbury Company | 1 |
|  |  | 14 |
|  |  | 15 |
| Brown, Richard K. | James River - Norwalk, Inc. | 1 |
|  | James River Corporation | 4 |

208

Created By: Boolean and Natural Language Searches on the Idea.
Group: All US and European Patents Table of Inventors by Assignee Identifies People Who Have Worked In This Area on Which to Run Literature Searches and Establish Partnership Contacts

Implication: Shows Which Top Individuals, at What Companies, May Be Resources For The Project Team

FIG. 13

Tool #22
A Table of Inventors by Assignee

Inventor - U.S. Patent Count by Assignee for Microwave Food Heating - US

| Inventor Name | Assignee | Document Count |
|---|---|---|
| Levinson, Melvin L | | |
| | General Housewares Corporation | 20 |
| | | 1 |
| | | 21 |
| | E. Khashoggi Industries | 17 |
| | E. Khashoggi Industries, LLC | 2 |
| | E. Khashoggi, Industries | 1 |
| | | 20 |
| | Patentsmith Corporation | |
| | Patentsmith Corportion | |
| | Patentsmith II, Inc. | |
| | Patentsmith Technology, Ltd. | |
| | Smith, Donald P. | |
| Bowen, Robert F. | Raytheon Company | |
| Tanaka, Junzo | Matsushita Electric Industrial Co. | |
| Pesheck, Peter S. | The Pillsbury Company | 1 |
| | | 14 |
| | | 15 |
| Brown, Richard K. | James River - Norwalk, Inc. | 1 |
| | James River Corporation | 4 |

Created By: Boolean and Natural Language Searches on the Idea.
Group: All US and European Patents and European Applications Table of Inventors by Assignee Identifies People Who Have Worked In This Area on Which to Run Literature Searches and Establish Partnership Contacts Implication: Shows Which Individuals May Be Resources For The Project Team, and Which to Commence Competitive Intelligence

FIG. 15

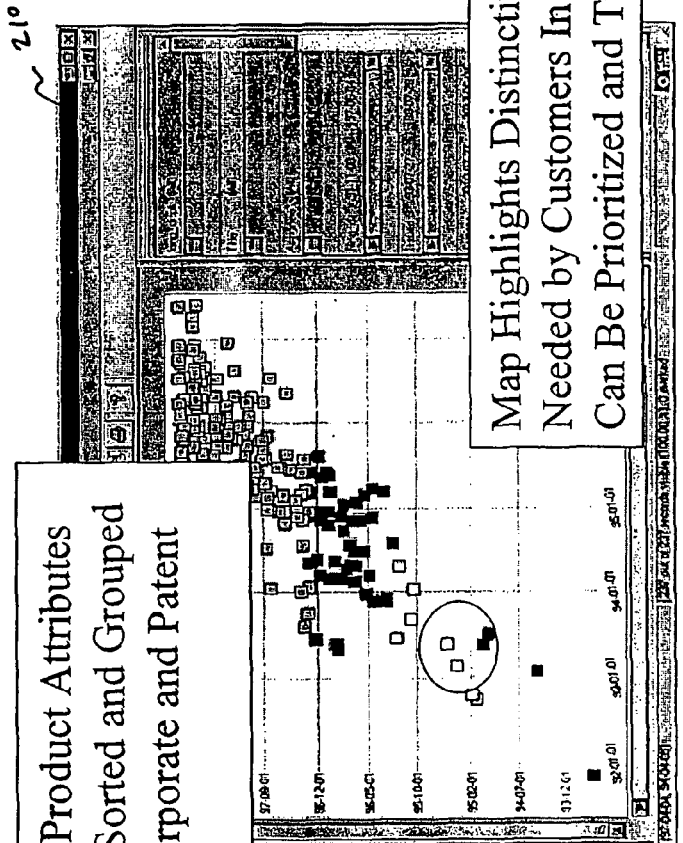

Tool #23
Map of Which Proposed Product Features Are Feasible

Created by: Product Attributes Which Are Sorted and Grouped
Groups: Corporate and Patent Documents Map Highlights Distinctive Features Needed by Customers In a Way They Can Be Prioritized and Traded-off Implication: Product Feature Sets Are Found Early in the Project Via Previous Internal and Partner's Research

FIG. 18

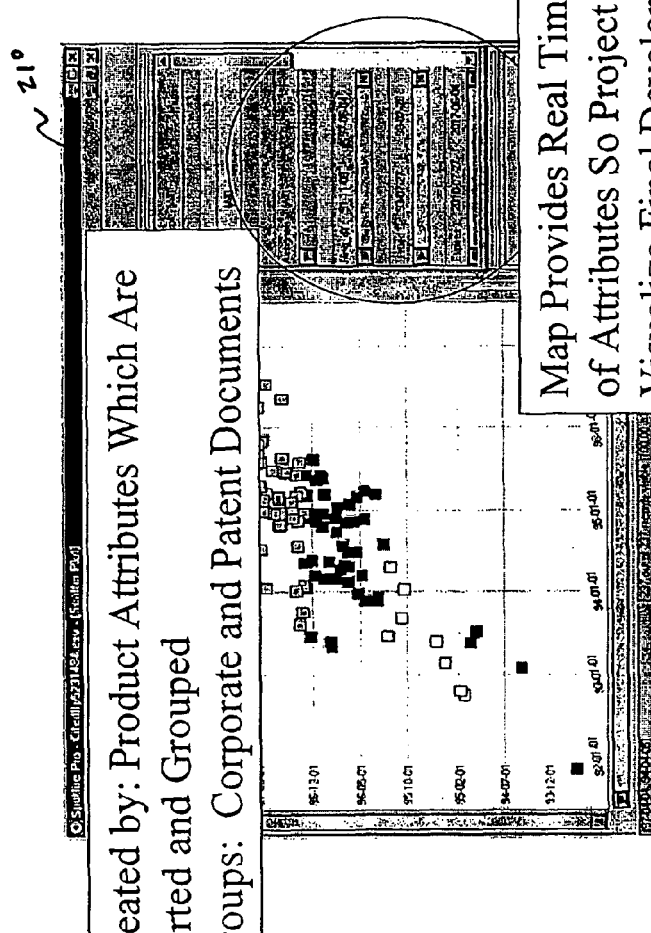

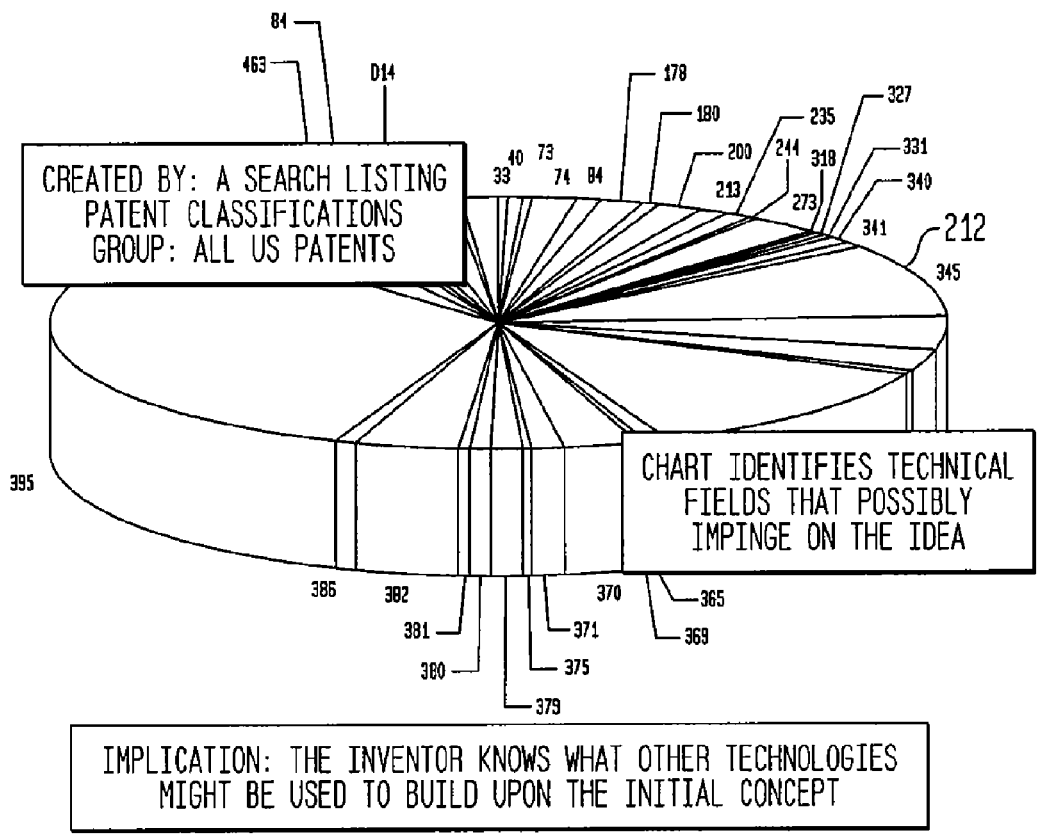

TOOL #35
MAP OF SIMILAR TECHNOLOGIES

TOOL #44
A CHART OF SIMILAR TECHNOLOGIES

TOOL #5
PATENT ACTIVITY CHART

TOOL #15
RECENT PATENT ACTIVITY CHART

TOOL #37
RECENT PATENT ACTIVITY CHART

TOOL #53
MAP OF COMPANY PATENT ACTIVITY

TOOL #16
RECENT PATENT APPLICATION CHART

TOOL #27
RECENT PATENT APPLICATION CHART

TOOL #38
RECENT PATENT APPLICATION CHART

TOOL #46
RECENT PATENT APPLICATION CHART

TOOL #6
CHART NARROWING AREAS TO EXPLORE

IMPLICATION: INVENTOR KNOWS IN WHICH COMPETITORS MAJOR EFFORTS EXIST, POSSIBLE PARTNERS ARE LIKEWISE IDENTIFIED

TOOL #39
A CHART SHOWING AREAS TO LOCK-UP OR LOCK-OUT

TOOL #47
A CHART NARROWING AREAS TO EXPLORE

FIG. 53
TOOL #40
A CITATION TREE SHOWING PROJECT'S IP POSITION

CITATION TREE FOCUSES PROJECT TEAM ON PATENTS WHICH COULD BE KEY TO BLOCKING COMPETITIVE APPROACHES

IMPLICATION: PROJECT TEAM KNOWS KEY PRIOR ART TO ACQUIRE DURING THE DEVELOPMENT PHASE FOR FREEDOM TO PRACTICE AND TO BLOCK COMPETITION

TOOL #8
A CITATION ROOT-TREE SHOWING IDEA'S ENVIRONMENT

TOOL #19
A CITATION ROOT-TREE SHOWING CONCEPT'S ENVIRONMENT

TOOL #30
A CITATION ROOT-TREE SHOWING COMPETITIVE ENVIRONMENT

TOOL #41
A CITATION ROOT-TREE SHOWING PROJECT'S IP POSITION

TOOL #48
A CITATION ROOT-TREE TO TIME PROJECT'S IP FILINGS

TOOL #31
CYCLE TIME FOR PATENT ROSECUTION

TOOL #42
CYCLE TIME FOR PATENT PROSECUTION

TOOL #54
CYCLE TIME FOR PATENT PROSECUTION

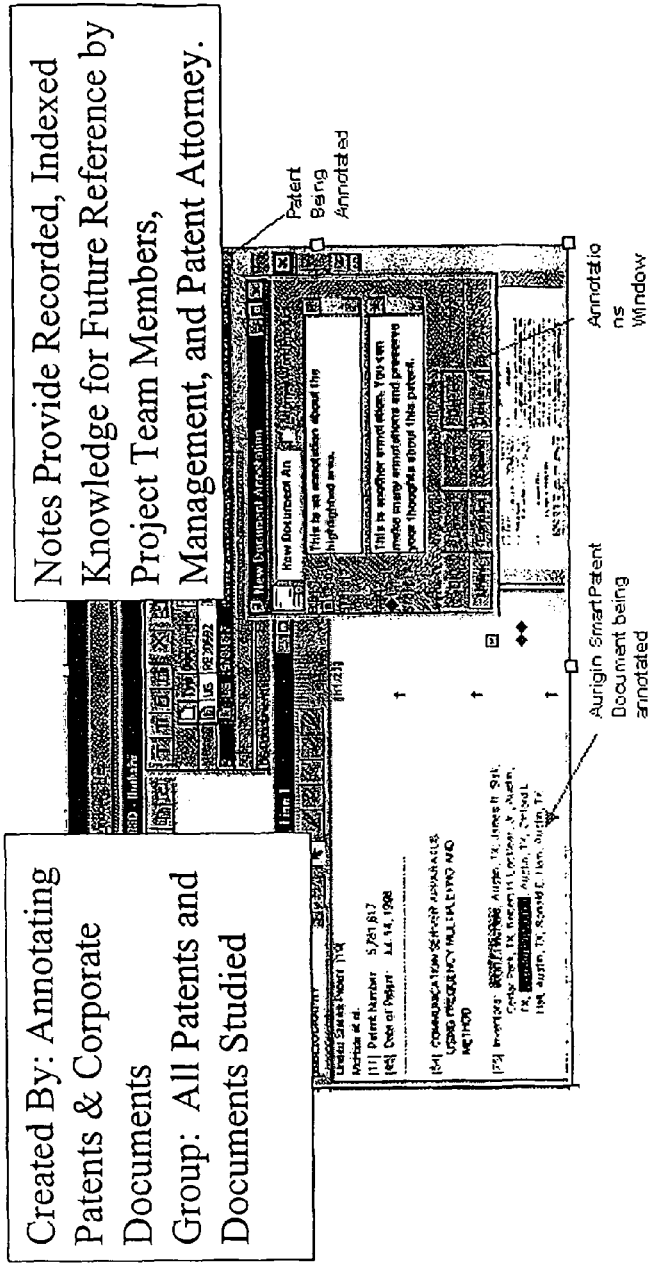

TOOL #55
NOTES TO DOCUMENT MEETING THOUGHTS AND ANALYSIS

US 7,966,328 B2

PATENT-RELATED TOOLS AND METHODOLOGY FOR USE IN RESEARCH AND DEVELOPMENT PROJECTS

CROSS-REFERENCE TO OTHER APPLICATIONS

The present application is a continuation-in-part of U.S. application Ser. No. 09/790,897, filed Feb. 23, 2001, now pending, which is incorporated by reference herein in its entirety, and which is a continuation-in-part application to the following applications: "Patent-Related Tools and Methodology for Use in Research and Development Projects," invented by Germeraad et. al., application Ser. No. 09/545,564, Filed: Apr. 7, 2000, now abandoned; "Intellectual Property Asset Manager (IPAM) for Context Processing of Data Objects," invented by Rivette et al., application Ser. No. 09/260,079, Filed: Mar. 2, 1999, now abandoned; and "Patent-Related Tools and Methodology for Use in the Merger and Acquisition Process," invented by Germeraad et. al., application Ser. No. 09/560,889, Filed: Apr. 28, 2000, now abandoned, which are each incorporated by reference herein in their entireties.

The present application is related to the following applications and patents:

"System, Method, and Computer Program Product for Patent-Centric and Group-Oriented Data Processing," invented by Rivette et al., U.S. Pat. No. 5,991,751, issued Nov. 23, 1999 from application Ser. No. 08/867,392; Filed: Jun. 2, 1997 (incorporated by reference in its entirety);

"Using Hyperbolic Trees to Visualize Data Generated by Patent-Centric and Group-Oriented Data Processing," invented by Rivette et al., U.S. Pat. No. 6,339,767, issued Jan. 15, 2002 application Ser. No. 08/921,369; Filed: Aug. 29, 1997 (incorporated by reference in its entirety);

"System, Method, and Computer Program Product for Managing and Analyzing Intellectual Property (IP) Related Transactions," invented by Rivette et al., application Ser. No. 09/138,368; Filed: Aug. 21, 1998, now abandoned (incorporated by reference in its entirety);

"Method and Apparatus for Synchronizing, Displaying and Manipulating Text and Image Documents," invented by Rivette et al., U.S. Pat. No. 5,623,681, issued Apr. 22, 1997, from application Ser. No. 08/155,572, filed Nov. 19, 1993 (incorporated by reference in its entirety);

"System and Method and Computer Program Product for Using Intelligent Notes to Organize, Link, and Manipulate Disparate Data Objects," invented by Rivette et al., U.S. Pat. No. 5,806,079, issued Apr. 17, 1996 from application Ser. No. 08/632,801; Filed: Apr. 17, 1996 (incorporated by reference in its entirety);

"Method and Apparatus for Synchronizing, Displaying and Manipulating Text and Image Documents", invented by Rivette et al., U.S. Pat. No. 5,809,318, issued Sep. 15, 1998 from application Ser. No. 08/832,971; filed Apr. 4, 1997 (incorporated by reference in its entirety);

"System, Method, and Computer Program Product for Accessing a Note Database Having Subnote Information for the Purpose of Manipulating Subnotes Linked to Portions of Documents," invented by Rivette et al., U.S. Pat. No. 5,950,214, issued Sep. 7, 1999 from application Ser. No. 09/058,275; Filed: Apr. 10, 1998 (incorporated by reference in its entirety);

"System and Method for Developing and Maintaining Documents," invented by Rivette et al., U.S. Pat. No. 5,754,840, issued May 19, 1998, from application Ser. No. 08/590,082, filed Jan. 23, 1996 (incorporated by reference in its entirety);

"System, Method, and Computer Program Product for Generating Equivalent Text Files," invented by Rivette et al., U.S. Pat. No. 5,799,325, issued Aug. 25, 1998, from application Ser. No. 08/662,377, filed Jun. 12, 1996 (incorporated by reference in its entirety);

"System, Method, and Computer Program Product for Managing and Analyzing Intellectual Property (IP) Related Transactions," invented by Rivette et al., application Ser. No. 09/138,368; Filed: Aug. 21, 1998, now abandoned (incorporated by reference in its entirety); and "System, Method, and Computer Program Product for Creating Subnotes Linked to Portions of Data Objects After Entering an Annotation Mode," invented by Rivette et al., U.S. Pat. No. 6,389,434, issued May 14, 2002 application Ser. No. 09/057,557; Filed: Apr. 9, 1998 (incorporated by reference in its entirety).

BACKGROUND OF THE INVENTION

1. Field of the Invention

The invention is generally directed to methodologies related to research and development projects, and more particularly directed to patent-related tools and methodologies involving those tools for assisting in all stages of research and development projects.

2. Related Art

Research and Development (R&D) projects typically go through a variety of stages before an idea can be commercialized or launched as a final product. A funnel map, as shown in FIG. 1, is the classic way to look at R&D projects. FIG. 1 illustrates that an R&D project may have, but is not limited to, five (5) stages. The first stage is the Idea Stage. Here, the idea is expanded and is prepared for consideration as a formal project/program.

The second stage is the project definition and preliminary assessment stage (hereafter "Preliminary Assessment Stage"). This stage immediately follows the Idea Stage and comprises project definition and preliminary assessment of the feasibility of the technology and business surrounding the idea or project. The basic questions asked at this stage includes: "Will mother nature let it happen on the technical side?" and "Will consumers be interested on the buy side?"

The purpose of preliminary assessment is to explore new ideas and concepts and set in motion as many promising "seed" ideas or projects as possible. The cost of research and investigation is small at this stage. A single worker may have a project or even work on several projects simultaneously. At this stage, there are typically many avenues being explored and no valid idea is neglected. The main consideration is whether the idea is strategically appropriate, and whether the expertise available to address the idea is adequate and part of the company's core competencies. The output of this stage is the validation of ideas, physical principles and market features. Metrics for this process address the possibility of a market and whether or not basic scientific principles are established.

The next stage relates to the feasibility of technology and business relating to the idea (hereafter "Feasibility Stage"). At this stage the company has tentatively agreed on a particular R&D project. We believe that Mother Nature will let it happen, but in this stage the purpose is to show that Mother Nature will allow it to happen. Thus, this stage tests whether a concept is validated in the laboratory by making a prototype any way that it can be done. The emphasis is on the proof-of-principle for real business applications.

The Feasibility Stage is also concerned with validating that at least one lead customer might be interested in the technology or idea. Here, business considerations such as market window and competitive reaction begin to be important, although there will still be exploration of options and possible spin-offs of the technology or idea. The "filtration" function at this stage (to go on to the next stage) is fairly strong, since although the cost of research in the Feasibility Stage is still not great, there typically are many more candidate ideas than there are resources to explore them.

The following stage addresses the product development prototyping and market development (hereafter "Development Stage"). Development projects are carried out for the ideas that are highly promising for commercialization and meet all of the requirements for profitable business products. Here, we are concerned with whether a set of key lead customers will be interested, and not just one lead customer (as in the Feasibility Stage). In addition, candidate technologies in this stage have forecast long-term corporate benefit, and meet all the strategic requirements of fit, alignment, and attractiveness for the business. Emphasis shifts in this stage to harder-edge issues, such as timing and execution to assure that market windows are met and product needs are satisfied. There is also emphasis on maintaining and extending technologies to keep a competitive edge in the marketplace. Milestones are important due to cycle time issues. Project finding must be managed more carefully due to budgets which are typically millions of dollars rather than the 100 times lower investment that may be typical of the Feasibility and Preliminary Assessment Stages.

The final stage involves scale-up and commercial introduction of the product or service that resulted from the initial idea (hereafter "Scale-up Stage"). The Scale-up Stage is the last stage prior to full product launch. Here, the question asked is whether the company will be able to deliver the product with quality and service. Concerns for entering full commercialization are about whether all major manufacturing and distribution hurdles are cleared, and whether commercialization costs allow for profitable entry into the marketplace. Some strategic questions must still be addressed, including market need and timing. Metrics here address both the strategic and tactical issues. Scale-up is obviously market and manufacturing oriented. Careful management of commercialization and product costs, timing, and execution are the key issues. Since budgets up to tens to hundreds of millions of dollars may be at stake, program and resource management are paramount.

Once a business goes through the R&D process for multiple products and/or services a R&D portfolio is created. Typically, a R&D project consists of a written description. This written description has similar elements, such as the purpose of developing the technology, the particular way it will be done, the types of things it may be useful for, and so forth. It is important for a business with such a portfolio to be able to improve upon its R&D portfolio. One example of how to improve the R&D portfolio has been called Third Generation R&D and the goal is to select and improve upon an R&D portfolio (hereafter "Portfolio Stage"). In order to improve upon an R&D portfolio, it would be helpful to compare a R&D project in the portfolio with existing markets and technologies.

How much time is spent at each of the stages above depends partly on the idea itself. For example, an idea can just be a small deviation from what already exists (e.g., red pens exist and the idea is to make a blue pen), or an idea can be completely on the other side of the spectrum and be a breakthrough idea (e.g., a flying car). For ideas that are small deviations from what already exists, the stages of R&D process are passed through so quickly that one may not even realize they are touching every stage. For breakthrough ideas, one stage may last many years. Here, one loses track of which stage he or she is in because each stage is so drawn out.

It is possible to facilitate, expedite, and enhance R&D projects by building upon work that has been performed in the past. However, there are little if any automated tools for assisting in this process. There are even less automated tools that utilize patent-related tools for assisting in research and development projects.

SUMMARY OF THE INVENTION

The present invention is related to patent-related tools, and methodologies involving those tools, for assisting in all stages of R&D projects (see FIGS. 1-3). In the present invention, IPAM server may be used in conjunction with the tools and methodology to aid in R&D projects. The IPAM server can also be used as a support tool for independent inventors. These tools or methods include, but are not limited to, a topographic map, a top company table, a top inventor table, a inventors by company table, a features grouping, a technology classification, a Standard Industrial Codes (SIC) classification, a patent count per year chart, a patent count per year chart, an application count per year chart, a technology by company map, a patent citation tree, a nested patent citation tree, a product/patent/revenue table, a patent/months to issue chart, and a document/annotation chart.

Further features and advantages of the invention, as well as the structure and operation of various embodiments of the invention, are described in detail below with reference to the accompanying drawings. The drawing in which an element first appears is typically indicated by the leftmost character(s) and/or digit(s) in the corresponding reference number.

BRIEF DESCRIPTION OF THE FIGURES

The present invention will be described with reference to the accompanying drawings, wherein:

FIG. 2 is an overview of the Research and Development Tools of the present invention that map to each stage in the Research and Development process according to an embodiment of the present invention;

FIG. 3 illustrates the topographic map facilitating the Idea Stage according to an embodiment of the present invention;

FIG. 9 illustrates the top company table facilitating the Idea Stage according to an embodiment of the present invention;

FIG. 11 illustrates the top inventor table facilitating the Idea Stage according to an embodiment of the present invention;

FIG. 13 illustrates the inventors by company table facilitating the Preliminary Assessment Stage according to an embodiment of the present invention;

FIG. 15 illustrates the inventors by company table facilitating the Feasibility Stage according to an embodiment of the present invention;

FIG. 18 illustrates the features grouping facilitating the Feasibility Stage according to an embodiment of the present invention;

FIG. 19 illustrates the features grouping facilitating the Development Stage according to an embodiment of the present invention;

FIG. 20 illustrates the technology classification facilitating the Idea Stage according to an embodiment of the present invention;

FIG. 53 illustrates the patent citation tree facilitating the Development Stage according to an embodiment of the present invention;

FIG. 69 illustrates the document/annotation facilitating the Preliminary Assessment Stage according to an embodiment of the present invention;

FIG. 70 illustrates the document/annotation facilitating the Feasibility Stage according to an embodiment of the present invention;

DETAILED DESCRIPTION OF THE PREFERRED EMBODIMENTS

Figure 1:
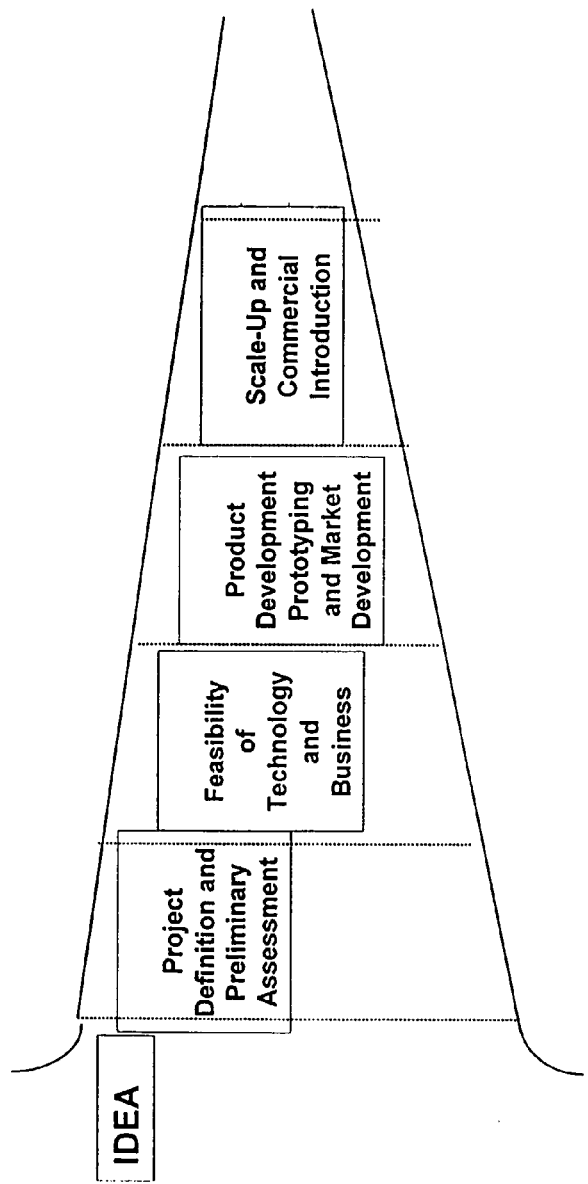
FIG. 1 illustrates a funnel map relating to Research and Development projects according to an embodiment of the present invention.
Figure 75:
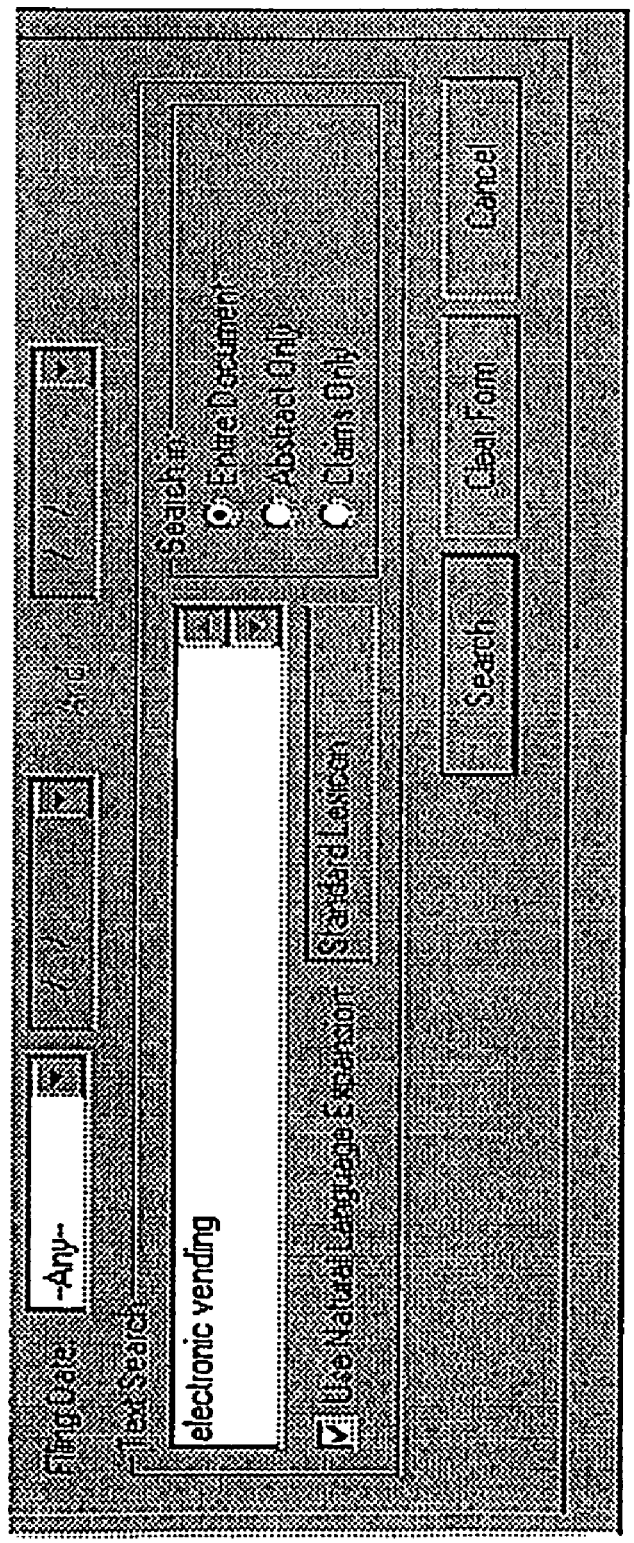

The present invention is related to patent-related tools, and methodologies involving those tools, for assisting in all stages of research and development projects. FIGS. 1-75 illustrate features of embodiments of the present invention. The pending U.S. applications cited above describe system and methods for achieving the functions, functionality, reports, etc., represented in FIGS. 1-75. Understanding of other methodologies represented in FIGS. 1-75 (and variations and extensions thereof) will be apparent to persons skilled in the relevant art(s) based on the teachings contained herein, and the teachings contained in the patents and pending U.S. applications cited above.

The present invention provides patent-related tools and methodologies for R&D. This may be accomplished through an Intellectual Property Asset Management (IPAM) server, which is described in detail in the patent and applications referenced above in the section entitled "Cross-Reference to Other Patents and Applications." The functionality of the present invention that is described herein as being performed by IPAM server, is not limited to being performed by IPAM server. For example tools such as Excel spreadsheets, the IBM patent server, the USPTO public server, and Manning and Napier's search tools can all be used to perform some or most of the steps of the described methodologies. It is important to note that the exact platform used to perform the methodologies herein is not critical.

IPAM server may be used in conjunction with the tools to aid in R&D. For convenience, IPAM server will briefly be discussed herein, although the invention is not limited to this brief description.

Briefly stated, IPAM server deals with context data processing. IPAM server may be used to define and select one or more contexts. Each context includes one or more attributes, and a plurality of data objects that satisfy the attributes. A list of data objects contained in the selected contexts may be displayed. At least some of the data objects in the selected contexts may be processed. Such processing may involve generating hierarchical and/or directed acyclic graph data structures to represent relationships among the data objects. These data structures can then be displayed in a variety of well-known techniques including but not limited to hyperbolic trees. Examples of such hierarchical or directed acyclic graph structures include claim trees, citation trees, and data object families, which may be displayed using hyperbolic trees.

In an embodiment, the contexts are groups. In another embodiment, the contexts are each associated with a data object type. In this latter embodiment, the contexts include data objects of their respective data object types.

IPAM server also supports the generation of annotations. IPAM server supports a plurality of annotation types, including document annotations, group annotations, data object type annotations, case annotations, and enterprise annotations. IPAM server also supports form-based annotations.

In an embodiment, IPAM server has a plug-in manager coupled thereto. Also included may be at least one plug-in coupled to the plug-in manager, and at least one external data processing component coupled to the plug-in. In an embodiment, the external data processing component displays data using at least graphs. In another embodiment, the external data processing component displays data using at least maps. The plug-in manager has a first application programming interface (API), and each external data processing component has a second API. The plug-in translates messages from the plug-in manager to the external data processing component to a format conforming to the second API, and translates messages from the external data processing component to the plug-in manager to a format conforming to the first API.

Embodiments of IPAM server can process, display, and otherwise operate with patent equivalent text files (EQV) (or other types of files or data) to aid in R&D, although the invention is not limited to this embodiment. Patent equivalent text files are described in U.S. Pat. No. 5,623,681, which is herein incorporated by reference in its entirety. A patent equivalent text file includes equivalency information that establishes an equivalency relationship between the text in the patent equivalent text file and the image in the patent image file. For example, this equivalency information may include pagination information that enables the patent equivalent text file to be displayed having the same pagination (line breaks, column breaks, page breaks) as the patent image file. In an embodiment, a pagination module generates the patent equivalent text file by comparing the patent text in the patent text file with the patent image file to detect equivalency information. This equivalency information is then embedded in the patent equivalent text file, along with the patent text. While the pagination module is capable of performing the pagination operation automatically, in some cases some manual intervention is required. In accordance, an operator is sometimes involved with the pagination process performed by the pagination module.

In the present invention, IPAM server may be used in conjunction with the tools and methodology to aid in R&D projects. The IPAM server can also be used as a support tool for independent inventors. FIG. 2 is an example overview of the R&D tools that map to each stage in the R&D process (FIG. 1) and in the R& D Portfolio Stage. The mapping provided in FIG. 2 is presented for illustrate purposes only. Other uses and applications of the invention will be apparent based on the teachings contained herein. These tools or methods include (when they are incorporated with IPAM server), but are not limited to, a topographic map 202, a top company table 204, a top inventor table 206, a inventors by company table 208, a features grouping 210, a technology classification 212, a Standard Industrial Codes (SIC) classification 214, a patent count per year chart 216, a patent count per year chart 218, an application count per year chart 220, a technology by company map 222, a patent citation tree 224, a nested patent citation tree 226, a product/patent/revenue table 228, a patent/months to issue chart 230, and a document/annotation chart 232. The following describes each tool or method and how it may be combined with IPAM server to aid in the R&D stages of a product, in addition to the R&D Portfolio Stage. As each of these tools or methods are described below, an exemplary graphical presentation is used. It should be noted that the particular exemplary graphical presentation used is for convenience purposes only and the invention is not limited to that particular graphical presentation. For example, a bar chart can be also implemented as a pie chart, radar or spider charts, two or three dimensional graphs, etc., and vice versa.

The same tool may be used in different ways to facilitate different stages in R&D. For example, the topographic map 202 (in conjunction with IPAM server) is Tool 1 in the Idea Stage, Tool 10 in the Preliminary Stage, Tool 21 in the Feasibility Stage, Tool 33 in the Development Stage, and Tool 51 in the Portfolio Stage. Other uses of tools will be apparent to persons skilled in the relevant art(s) based on the teachings contained herein.

1. IPAM Server and the Topographic Map

A. The Idea Stage

Referring to FIG. 2, IPAM server incorporates the topographic map 202 to facilitate the Idea Stage (as Tool 1), the Preliminary Assessment Stage (as Tool 10), the Feasibility Stage (as Tool 21), the Development Stage (as Tool 33), and the Portfolio Stage (as Tool 51) in the R&D process. How IPAM server and topographic maps are incorporated together to produce contour maps is described in detail in the commonly owned patent application, Intellectual Property Asset Manager (IPAM) for Context Processing of Data Objects, invented by Rivette et al., application Ser. No. 09/260,079, Filed: Mar. 2, 1999, now abandoned (incorporated by reference in its entirety). IPAM server and the topographic map 202 are used in a slightly different way to facilitate each of these stages. FIG. 3 illustrates the topographic map 202 facilitating the Idea Stage as Tool 1, entitled "A Map of Similar Ideas, Art and Markets." As stated above, in the Idea Stage, the idea is expanded and is prepared for consideration as a formal project/product.

In FIG. 3, topographic map 202 as Tool 1 is shown. The purpose of Tool 1 in the Idea Stage is to display a map of preferably patent abstracts that identifies related materials, processes and uses to consider when expanding and refining the idea. An addition purpose for using Tool 1 at this stage is to provide information relating to whether other individuals or companies are doing similar things and selling them. If so, this demonstrates that the idea is reasonable for a technical and market standpoint. In addition, the topographical map 202 shows sub-groupings for further exploration of the idea. How the IPAM server works in conjunction with the topographic map 202 to aid in the R&D Idea Stage is described with reference to FIG. 4.

Figure 4:
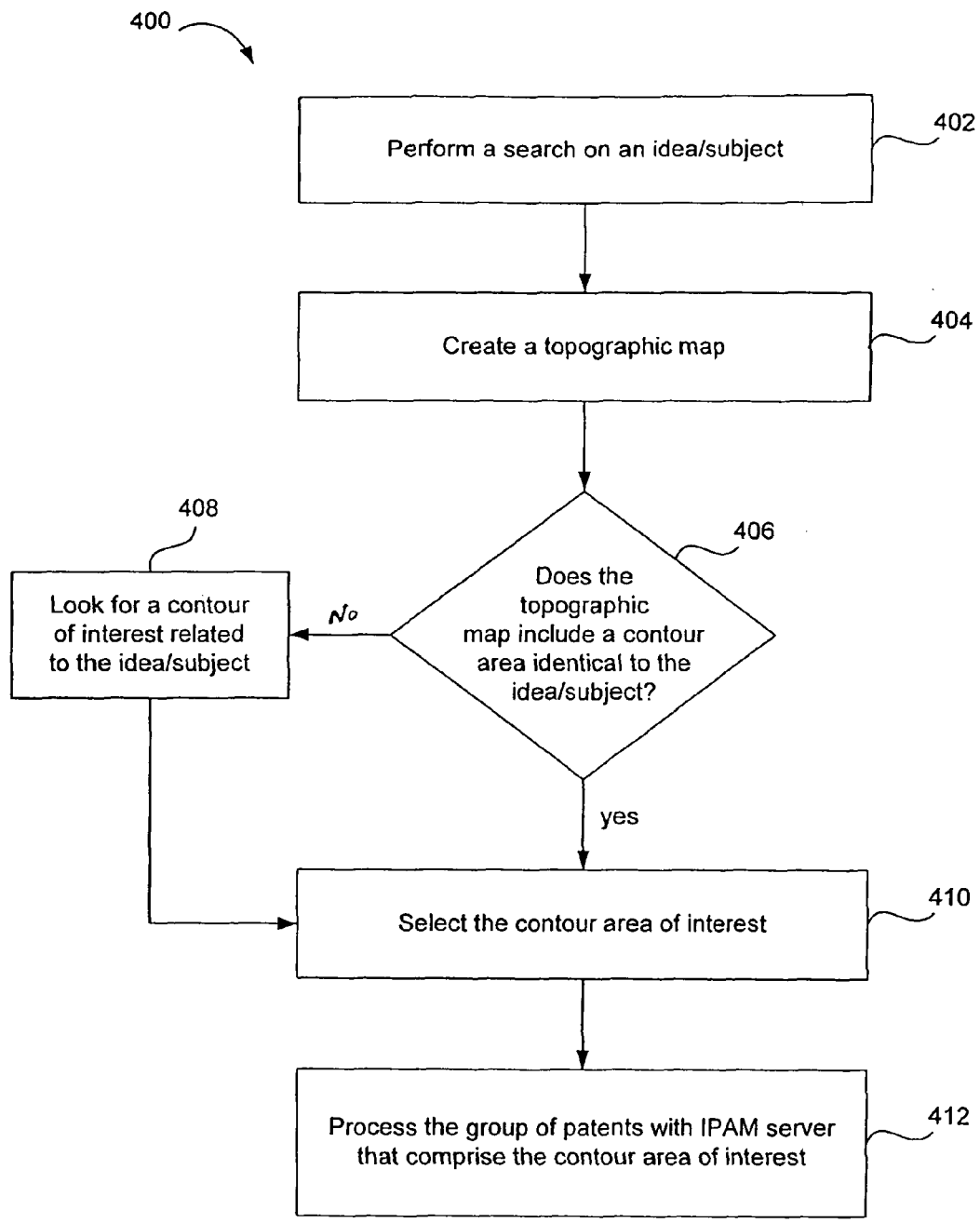
FIG. 4 is a flowchart illustrating how the IPAM server works in conjunction with the topographic map to aid in the Idea Stage according to an embodiment of the present invention.
Figure 74:
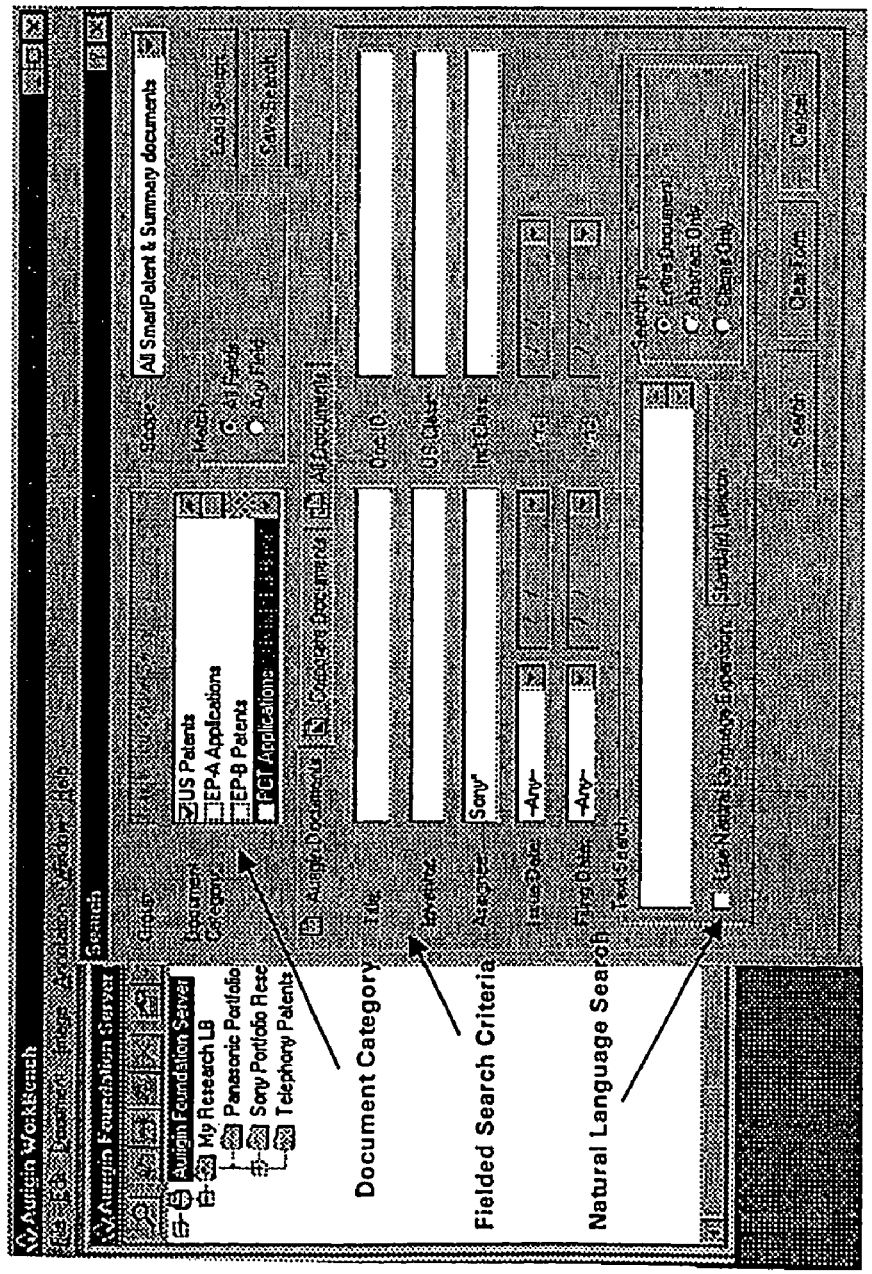
FIGS. 74 and 75 illustrate two exemplary sheet shots of the user interface of the present invention according to an embodiment of the present invention.

In FIG. 4, a flowchart 400 begins at step 402. In step 402, in an embodiment of the present invention a user performs a search on the group of U.S. patents. Here, because the user is just pointing at a broad field, the abstract of each U.S. patent is typically the section that is searched, but is not limited to this. The present invention is not limited to doing the search on U.S. patents (this is also true for all of the searches discussed herein). Here, the search performed is typically, but is not limited to, a boolean and/or natural language search on the idea/subject to produce a group of patents. The user interface of IPAM server is described in detail in the patent and applications referenced above in the section entitled "Cross-Reference to Other Patents and Applications." For illustration, FIGS. 74 and 75 each show a screen shot of IPAM server's user interface relating to the boolean and/or natural language search described herein.

For illustration purposes, assume that the idea involves inkjet printing for cardboard boxes. A boolean and/or natural language search on the keywords "cardboard" and/or "inkjet printing" on the group of all U.S. patents is likely to produce a large number of patents in the idea/subject group of patents. Here, if Tool 1 is not used in conjunction with the IPAM server, the user would typically have to narrow the search to a more manageable number of patents by date, by adding more keywords, and so forth. The goal would be to reduce the number of patents down to a number of patents that the user can study in depth. With the present invention there is no need for the user to further define his or her search. This is illustrated in the following step 404.

In step 404, IPAM server is used to produce a topographic map 202 having a map with contours' and labels indicating areas related to the idea//subject searched in step 402. Here, the group of patents produced in step 402 are further subdivided into subgroups, with each subgroup relating to a different area. Typically, this is done by the user selecting a topographic map function on the computer screen. The topographic map 202 produced by Tool 1 (FIG. 3) shows the pattern of subjects of all of the patents produced in step 402 (e.g., shows areas related to the user's idea). Labels on the topographic map 202 indicate the idea/subject, and the contours indicate how may U.S. patents exist for each subgroup area. The topographic map 202 shows areas people are focusing on. Control then passes to step 406.

In step 406, the user studies the topographic map 202 produced by Tool 1 and determines whether the exact area of the user's idea/subject is included in the topographic map 202. If the outcome to step 406 is positive, then control passes to step 410. Alternatively, control passes to step 408.

In step 408, an area related to the user's idea/subject was not included in the topographic map 202. Here, the user can determine if another area that is shown in the topographic map 202 is worth further exploration. Using same example as in step 402 above, assume that the topographic map 202 does not show an area relating to inkjet printing for cardboard boxes, but does show an area related to printing on heavy paper stock. Another example is if the cardboard that the user is interested in printing on has a coating on it, as many recycled boxes do, then the user may want to look at the area of printing on plastics or films. The user may be interested in exploring further one or more of these different areas. The present invention also allows the user to explore one or more different areas even if the area relating exactly to the user's idea/subject is displayed. Control then passes to step 410.

In step 410, the user selects the contour (or label) of interest in the topographic map 202. This is typically done by the user "clicking" on the contour of interest. Control then passes to step 412.

In step 412, the IPAM server processes the sub-group of U.S. patents that are included in the contour of interest indicated by the user in step 410. Again, topographic map 202 is displayed with contours, but this time the topographic map 202 is more specific to exactly the user's contour (or area) of interest. Now, the topographic map 202 shows the different types of technologies that are in the contour of interest. In addition, the topographic map 202 may show the different uses of the idea or area of interest. This indicates to the user whether the initial idea is reasonable from a technical and/or market standpoint. At this point, the user may use the IPAM server as described in detail in the applications and patents referenced above in the section entitled "Cross-Reference to Other Patents and Applications." At this point flowchart 400 ends.

B. The Preliminary Assessment Stage

Figure 5:
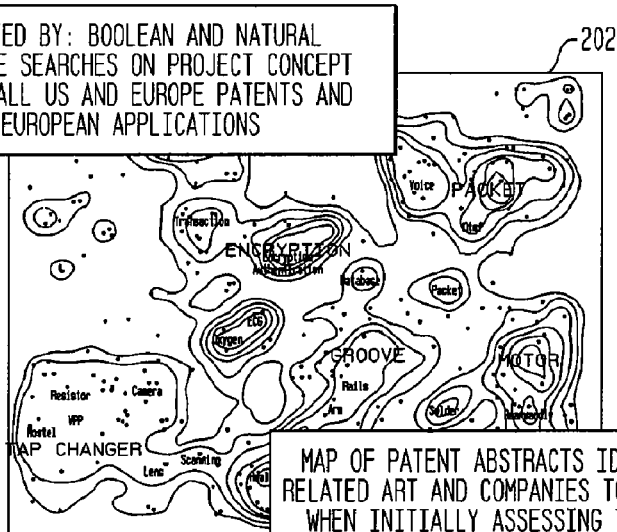
FIG. 5 illustrates the topographic map facilitating the Preliminary Assessment Stage according to an embodiment of the present invention.

The topographic map 202, in conjunction with IPAM server, is also useful in the Preliminary Assessment Stage of the R&D process. This is shown in FIG. 5 as Tool 10, and is entitled "A Map of Similar Technology and Uses." The Preliminary Assessment Stage comprises project definition and preliminary assessment of the feasibility of the technology and business surrounding the idea or project. The purpose of Tool 10 is to provide the project team with a high level map of the scope of the project. This includes showing the range of materials, and the processes and uses to consider on the project.

How the IPAM server works in conjunction with the topographic map 202 to aid in the R&D Preliminary Assessment Stage is similar to how it works in the Idea Stage as described with reference to FIG. 4 above. One exception is the initial search in step 402. Instead of searching just the group of U.S. patents as in the Idea Stage, here the search consists of the group of U.S., European, Japanese (and other available) patents and applications. As with Tool 1 (FIG. 3) because the user is still looking at a fairly broad field, the abstract of each patent and application is typically the section that is searched, but is not limited to this. The search itself may also slightly different in that the search is created by a boolean and/or natural language search on project concept (and not just an idea as in step 402), but is not limited to this.

C. The Feasibility Stage

Figure 6:
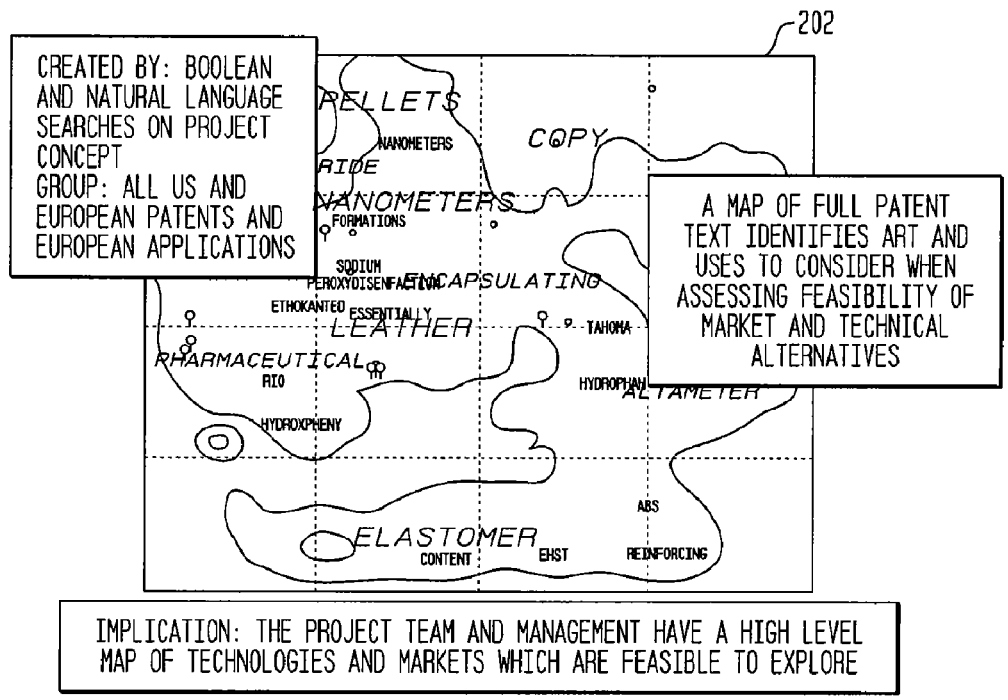
FIG. 6 illustrates the topographic map facilitating the Feasibility Stage according to an embodiment of the present invention.

As shown in FIG. 2, the topographic map 202, in conjunction with IPAM server, is also useful in the Feasibility Stage of the R&D process. In general, the Feasibility Stage tests whether a concept is validated in the laboratory and with at least one lead customer. The topographic map 202 used in conjunction with IPAM server is shown in FIG. 6 as Tool 21, entitled "A Map of Technology and Uses the Project Team is Focused on Refining." The purpose of Tool 21 is to provide the project team and management with a high level map of technologies and markets which are feasible to explore. A map of full patent text identifies art and uses to consider when assessing the feasibility of market and technical alternatives. How the IPAM server works in conjunction with the topographic map 202 to aid in the R&D Feasibility Stage is similar to how it works in the Idea Stage as described with reference to FIG. 4 above. One exception is the initial search in step 402. Instead of searching just the group of U.S. patents as in the Idea Stage, here the search consists of the group of U.S., European, Japanese (and other available) patents and applications. Here, because the desired search is starting to narrow as compared to Tools 1 and 10 (where only the abstract was searched), the entire patent is typically searched. The search itself may also slightly different in that the search is created by a boolean and/or natural language search on project concept (and not just an idea as in step 402), but is not limited to this.

D. The Development Stage

Figure 7:
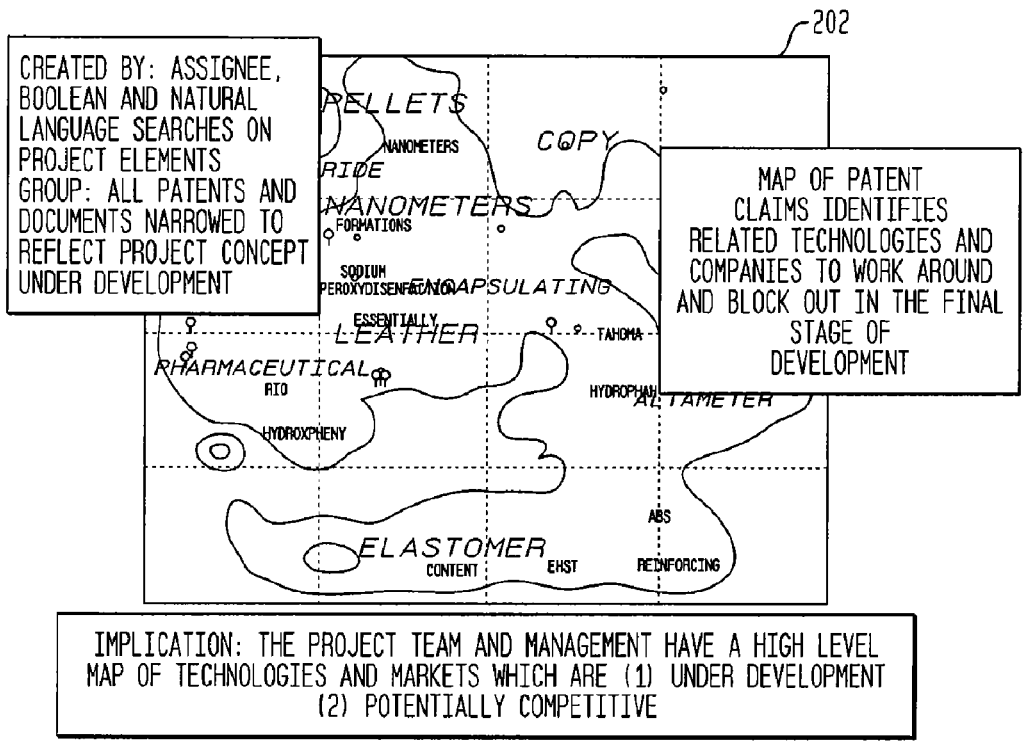
FIG. 7 illustrates the topographic map facilitating the Development Stage according to an embodiment of the present invention.

As shown in FIG. 2, the topographic map 202, in conjunction with IPAM server, is also useful in the Development Stage of the R&D process. In general, in the Development Stage candidate technologies determined from the Feasibility Stage have forecast long-term corporate benefit, and meet all the strategic requirements of fit, alignment, and/or attractiveness for the business. The topographic map 202 used in conjunction with IPAM server is shown in FIG. 7 as Tool 33, entitled "Map of Competitive Technology and Uses." The purpose of Tool 33 is to provide the project team and management with a high level map of technologies and markets which are: (1) under development and/or (2) potentially competitive. A map of patent claims identifies related technologies and companies to work around and block out in the Scale-up Stage. In addition, Tool 33 helps to indicate to a company who the competitors are in a particular area. This map also allows you to do time slices indicating who has entered the market and in which years or time slices. This indicates those companies on which competitive intelligence should be performed.

How the IPAM server works in conjunction with the topographic map 202 to aid in the R&D Development Stage is similar to how it works in the Idea Stage as described with reference to FIG. 4 above. One exception is the initial search in step 402. Instead of searching just the group of U.S., European, Japanese (and other available) patents and applications, as in the Idea Stage, here the search consists of the group of all patents, applications and documents narrowed to reflect the project concept under development. Here, because the desired search is more narrow than the search with Tool 21, the entire patent is typically searched. For example, in the Development Stage, if the user was concerned about infringing patents, the search may focus on only the claims of each patent. The search itself is also slightly different in that the search is created by a boolean and/or natural language search on project elements (and not just an idea as in step 402), but is not limited to this.

E. Scale-up Stage

The topographic map 202, in conjunction with IPAM server, is also useful in the Scale-up Stage (not indicated in FIG. 2) by providing analysis that will not only increase the strength of any patent applications that are filed on the idea, but also increase the probability of an earlier, successful patent prosecution. The topographic map 202, in conjunction with IPAM server, helps to identify technical fields that the U.S. Patent and Trademark Office and other competitors will search for prior art to be used against the patent application during prosecution. How the IPAM server works in conjunction with the topographic map 202 to aid in the R&D Scale-up Stage is similar to how it works in the Idea Stage as described with reference to FIG. 4 above. The one exception is that the group searched in step 402 is all patents and applications narrowed to reflect the developing products but is not limited to this.

F. Portfolio Stage

Figure 8:
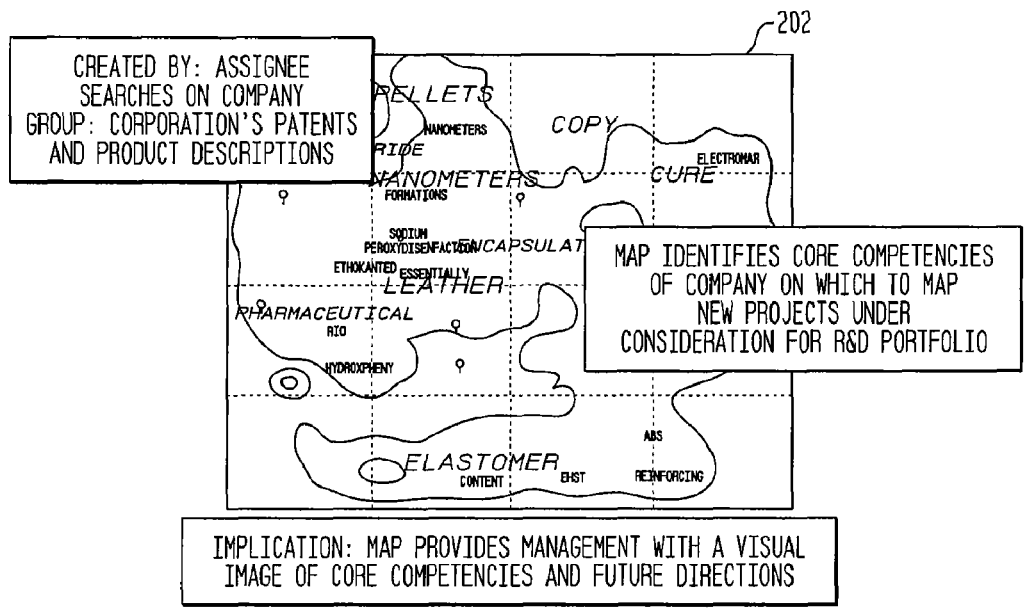
FIG. 8 illustrates the topographic map facilitating the Portfolio Stage according to an embodiment of the present invention.

As shown in FIG. 2, the topographic map 202, in conjunction with IPAM server, is also useful in the Portfolio Stage, which occurs after the R&D process. Once a business goes through the R&D process for multiple products and/or services a R&D portfolio is created. Typically, a R&D project consists of a written description. This written description has similar elements as a patent, such as the propose of developing the technology, the particular way it will be done, the types of things it may be useful for, and so forth. It is important for a business with such a portfolio to be able to improve upon its R&D portfolio. In order to improve upon a R&D portfolio, the present invention allows a company to compare a R&D project in the portfolio with existing markets and technologies. The topographic map 202 used in conjunction with IPAM server is shown in FIG. 8 as Tool 51, entitled "Map of Company Competency & New Projects." The purpose of Tool 51 is to provide the management of a company visual image of core competencies and future directions. In addition, it maps core competencies of the company and allows the user to also map new projects under consideration for R&D portfolio to the core competencies of the company.

How the IPAM server works in conjunction with the topographic map 202 to aid in the Portfolio Stage is similar to how it works in the Idea Stage as described with reference to FIG. 4 above. One exception is the initial search in step 402. Instead of searching the group of all U.S., European, Japanese (and other available) patents and applications as in the Idea Stage, here the search consists of a more limited group of patents that include the company's patents product descriptions and suggested project ideas. The search consists of assignee searches on the company (which is different from the search performed in step 402).

Referring to FIG. 8, Tool 51 allows the user to add R&D project information to a group of patents to determine where on the topographic map 202 its R&D projects fall. This indicates such things as: is the R&D project going to be competing with an active or crowed area (and thus more competition), or will the R&D project going to be competing in an explored area, and so forth. This is a very powerful tool for portfolio reviewers which typically includes the top management of a company. This is very powerful when a company is making a portfolio decision about which R&D project to push forward on and which to drop. Many times it depends on the strategy of the company. One strategy is to capture explored areas. If the topographic map 202 indicates that a R&D project will be headed to a crowded area, at least it will be a deliberate and expected outcome when competition is tough. Tool 51 allows a strategic planning team to, at a glance, make a rational decision without having to look at—in the case of our inkjet printers on cardboard, example thousands of patents.

II. IPAM Server and the Top Company Table

Figure 37:
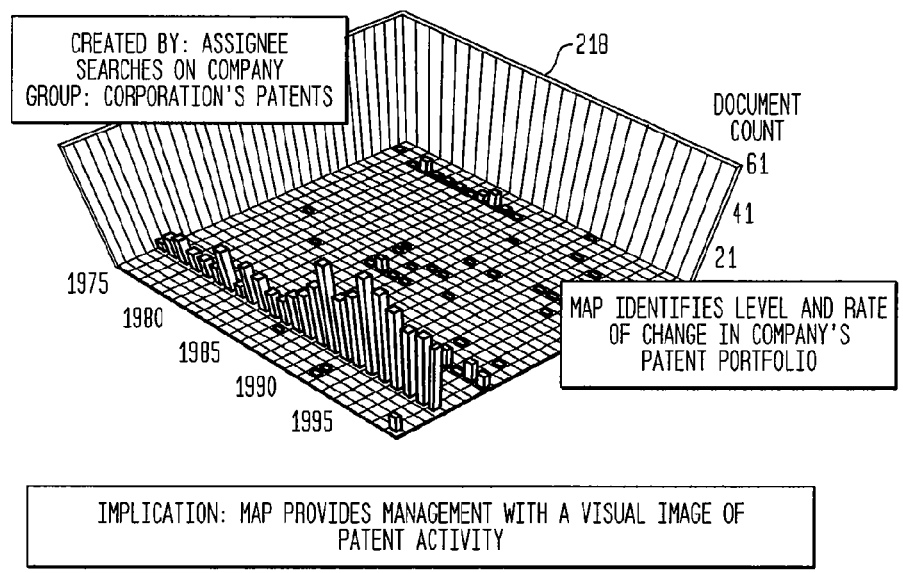
FIG. 37 illustrates the map of company patent activity facilitating the Scale-up Stage according to an embodiment of the present invention.

Referring to FIG. 2, IPAM server works in conjunction with the top company table 204 to facilitate the Idea Stage in the R&D process. FIG. 9 illustrates an example top company table 204 facilitating the Idea Stage as Tool 2, entitled "A Table of Assignees." A similar chart is shown in FIG. 37 as Tool 53 (in three dimensional). As stated above, in the Idea Stage, the idea is expanded and is prepared for consideration as a formal project/product.

In FIG. 9, top company table 204 as Tool 2 is shown. The purpose of Tool 2 in the Idea Stage is to display a table that provides a patent count report of the assignees or companies that are somehow involved in areas related to the idea. This helps to provide information relating to the quality and variety of top companies who are also active in areas surrounding the idea. The table of assignees gives new ideas on technology and markets to consider when expanding and refining the idea. How the IPAM server works in conjunction with the top company table 204 to aid in the R&D Idea Stage is described with reference to FIG. 10.

Figure 10:
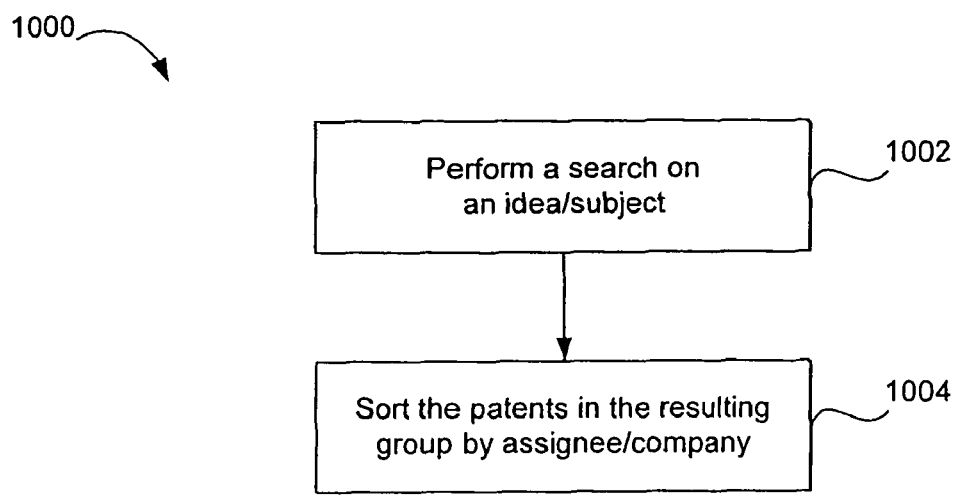
FIG. 10 is a flowchart illustrating how the IPAM server works in conjunction with the top company table to aid in the Idea Stage according to an embodiment of the present invention.

In FIG. 10, a flowchart 1000 begins at step 1002. In step 1002, in an embodiment of the present invention a user performs a search on the group of all U.S. patents. Here, because the user is just pointing at a broad field, the abstract of each U.S. patent is typically the section that is searched, but is not limited to this. The present invention is not limited to doing the search on U.S. patents, but may include European, Japanese (and other available) patents and/or applications. Here, the search performed is typically a boolean and/or natural language search on the idea/subject to produce a group of patents. Control passes to step 1004.

In step 1004, IPAM server generates a top company table 204 that indicates the top assignees/companies in a related area to the idea/subject searched in step 1002. Here, the group of patents produced in step 402 are further subdivided into subgroups, with each subgroup having the same assignee/company. IPAM server may store the assignee information of patents in a meta-data field that will also need to be searched to determine the assignee/company information, but is not limited to this.

Typically, step 1004 is initiated by the user selecting a top company function on the computer screen. The top company table 204, produced in conjunction with IPAM server and Tool 2 (FIG. 9), shows the quality and variety of top companies who are also active in areas surrounding the idea. At this point flowchart 1000 ends.

Note that in the Idea Stage, a user may decide to combine or integrate one or more tools to facilitate the stage. For example, once the group of patents (from the search in step 1002) is divided into subgroups (in step 1004), the user may use Tool 1 to produce the topographic map 202 and/or Tool 2 to produce the top company table 204. The integration and combination of tools discussed herein to facilitate the R&D stages is limitless and particular combinations useful to particular applications will be apparent to persons skilled in the relevant arts based on the techniques contained herein. Following is a general discussion describing how a company would use Tool 2 (FIG. 9) to facilitate the Idea Stage.

Referring to FIG. 9, the example idea involves "microwave food heating." What FIG. 9 shows is the ranking of companies in terms of frequency of patents, from the largest (in this example, Mitsushita Electric Industrial Co., Ltd., Raytheon Company, and General Electric Company are the top companies) to the smallest (companies/individuals who only have one patent). Assuming the user has an understanding of what different companies do, the user can go down the list of companies in the top company table 204 and get a feeling for how the company is involved in areas related to the idea.

For example, due to the nature of Matsushita Electrical Industrial Co., Ltd., Raytheon Company and General Electric Company, one can assume that these companies are making microwave ovens. The James River Corporation is a packaging company, and thus it is likely to be making the packages for microwave ovens. As the user goes through the list, it gives him or her a feeling for the companies who are working in the area of microwave food heating. Therefore, because of what a user knows, the user gets an idea about the technology each company is likely to apply, which market segments they are likely to be going into, and so forth. This facilitates the Idea Stage because it gives the user new ideas and markets.

Another way to use Tool 2 is as follows. Again, top company table 204 shows the quality and variety of top companies who are also active in areas surrounding the idea. If the most active companies are large companies, it gives the user the indication that if the user wants to develop the idea himself or herself, then he or she may have a struggle in breaking into related or the same area. If this is the case, the user may decide to approach one or more of the top companies and sell the idea, suggest a partnership, license a patent that relates to the idea, and so forth. At the bottom of the top company table 202 are companies or individuals who own one patent in the area. This indicates to the user that although the company/individual expended enough energy to get a patent, chances are the patent was never pursued. This presents a good source of companies/individuals to approach to either buy their patent or license their patent.

III. IPAM Server and the Top Inventor Table

Referring to FIG. 2, IPAM server works in conjunction with the top inventor table 206 to facilitate the Idea Stage in the R&D process. FIG. 11 illustrates an example top inventor table 206 facilitating the Idea Stage as Tool 3, entitled "A Table of Inventors." In general, the top inventor table 206 identifies leading inventors, allows companies to compare their own inventors to other inventors in the same market, and tracks inventor movement between companies.

In FIG. 11, top inventor table 206 as Tool 3 is shown. As stated above, in the Idea Stage, the idea is expanded and is prepared for consideration as a formal project/product. The purpose of Tool 3 in the Idea Stage is to display a table that provides a patent count report of the inventors that are somehow involved in areas related to the idea. This helps to provide information relating to the quality and variety of top, inventors who are also active in areas surrounding the idea. The top inventor table 206 identifies people who have worked in the area and therefore provides suggestions as to other types of searches to perform (e.g., literature searches on the top inventors). How the IPAM server works in conjunction with the top inventor table 206 to aid in the R&D Idea Stage is described with reference to FIG. 12.

Figure 12:
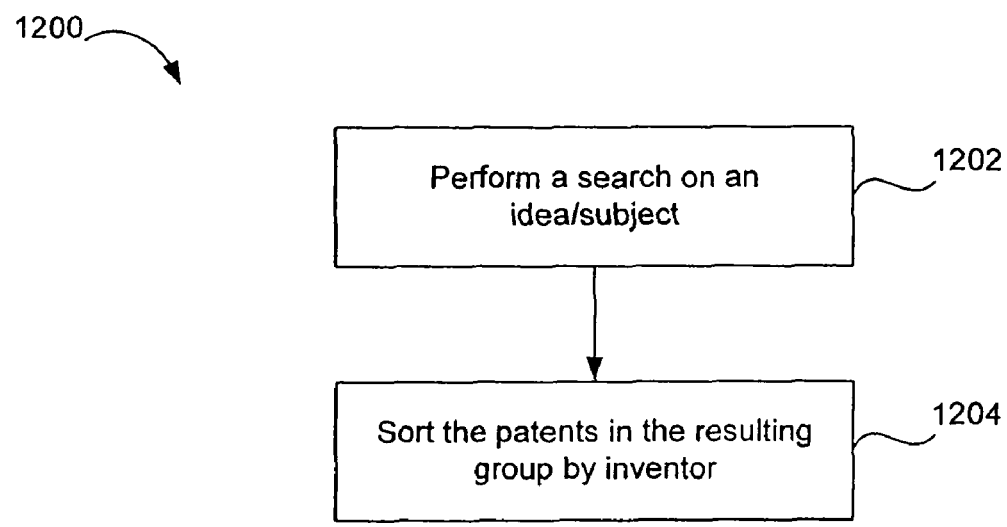
FIG. 12 is a flowchart illustrating how the IPAM server works in conjunction with the top inventor table to aid in the Idea Stage according to an embodiment of the present invention.

In FIG. 12, a flowchart 1200 begins at step 1202. In step 1202, in an embodiment of the present invention a user performs a search on the group of all U.S. patents. Here, because the user is just pointing at a broad field, the abstract of each U.S. patent is typically the section that is searched, but is not limited to this. The present invention is not limited to doing the search on U.S. patents, but may include European, Japanese (and other available) patents and/or applications. Here, the search performed is typically a boolean and/or natural language search on the idea/subject to produce a group of patents. Control passes to step 1204.

In step 1204, IPAM server generates a top inventor table 206 that indicates the top inventors in a related area to the idea/subject searched in step 1202. Here, the group of patents produced in step 1202 are further subdivided into subgroups, with each subgroup having the same inventor. As with assignee information, IPAM server may store the inventor information of patents in a metadata field that will also need to be searched to determine the inventor information, but is not limited to this.

Typically, step 1204 is initiated by the user selecting a top inventor function on the computer screen. The top inventor table 206, produced in conjunction with IPAM server and Tool 3 (FIG. 11), shows the quality and variety of top inventors who are also active in areas surrounding the idea. At this point flowchart 1200 ends.

As noted above, once the group of patents (from the search in step 1202) is divided into subgroups (in step 1204), the user may also use Tool 1 to produce the topographic map 202 and/or Tool 2 to produce the top company table 204 (to indicate the companies each inventor has worked for).

A general discussion describing how a company would use Tool 3 (FIG. 11) to facilitate the Idea Stage will now be described. Referring to FIG. 11, the example idea involves "microwave food heating." What FIG. 11 shows is the ranking of inventors in terms of frequency of patents, from the most (in this example, Melvin L. Levinson) to the least. Looking at the top inventor table, the user notices there are multiple inventors with over thirteen (13) patents. This indicates that these inventors have been practicing the art for some time. If the top inventor table 206 shows that no inventor has more than three (3) patents, this indicates nobody has really been in the field enough to buildup a patent portfolio related to the idea. And then there's some cases where you'll find a person(s) with fifty (50) patents in an area, indicating potential experts in the field.

What is important is that people who tend to patent a lot also tend to publish. And so this table identifies people who've worked in the area, and you should run literature searches on them, that is, non-patent searches. These are people on which to perform competitive intelligence. Which societies are they members of? Why are they interested in that? And which kinds of other journal articles have they written? Depending upon the quality of the journal (an example well regarded journal being the *Journal of the American Chemical Society*), the user gets an idea on how solid the inventor's technical work is. If the inventor's work is solid, then the inventor is likely to have a good understanding of that field. Whereas if the user runs a literature search and the user finds out that the inventor is publishing mostly in the trade magazines, the user knows that although the inventor is patenting a lot, there is perhaps not as much depth and understanding of the idea in that person.

The depth and understanding of inventors in areas related to the user's idea is helpful to know for a number of reasons, such as the following. Say the user has come up with a really unique way of doing a particular job. The user wants to be able to predict what the chances are that one of these inventors listed in the top inventor table 206 (FIG. 11) is going to stumble on the same unique way. It there is little chance that one of the inventors will stumble on the same unique way, it's reasonable for the inventor to pursue the project. Or on the other hand, if the user finds an inventor who is really studying the field, and is a good, scientific, and rigorous thinker, the user might want to consider who might be in that area, and what might blindside the user's project. One question the user is asking in the Idea Stage includes: Is my idea solid and thus worth pursuing?

IV. IPAM Server and the Inventors by Company Table

Referring to FIG. 2, IPAM server works in conjunction with the inventors by company table 208 to facilitate the Preliminary Assessment Stage (as Tool 11) and the Feasibility Stage (as Tool 22) in the R&D process. As will be apparent from the description below, inventors by company table 208 is an integration/combination of the top company table 204 and the top inventor table 206.

A. Preliminary Assessment Stage

The inventors by company table 208, in conjunction with IPAM server, is useful in the Preliminary Assessment Stage of the R&D process. This is shown in FIG. 13 as Tool 11 and is called "A Table of Inventors by Assignee." The Preliminary Assessment Stage comprises project definition and preliminary assessment of the feasibility of the technology and business surrounding the idea or project. The purpose of Tool 11 is to show which top individuals, at what companies, may be resources for the project team. Tool 11 identifies people who have worked in the idea area, and therefore who to run literature searches on and potentially establish partnership contracts with. How the IPAM server works in conjunction with the inventors by company table 206 to aid in the R&D Preliminary Assessment Stage is described with reference to FIG. 14.

Figure 14:
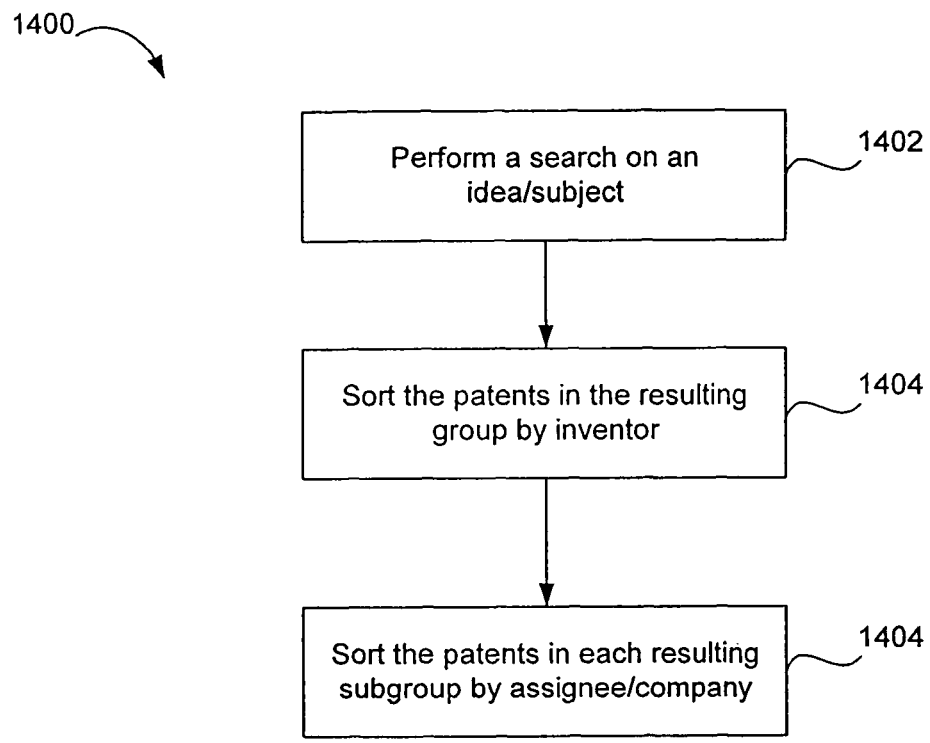
FIG. 14 is a flowchart illustrating how the IPAM server works in conjunction with the inventors by company table to aid in the Preliminary Assessment Stage according to an embodiment of the present invention.

In FIG. 14, a flowchart 1400 begins at step 1402. In step 1402, in an embodiment of the present invention a user performs a search on the groups of all U.S. and European patents. Here, because the user is just pointing at a broad field, the abstract of each U.S. patent is typically the section that is searched, but is not limited to this. The present invention is not limited to doing the search on U.S. patents, but may include. Japanese (and other available) patents and/or applications. Here, the search performed is typically a boolean and/or natural language search on the idea/subject to produce a group of patents. Control passes to step 1404.

In step 1404, the group of patents produced in step 1402 are further divided into subgroups, with each subgroup having the same inventor. IPAM server may store the inventor information of patents in a meta-data field that will also need to be searched to determine the inventor information, but is not limited to this. Control then passes to step 1406.

In step 1406, each subgroup produced in step 1404 is further divided into subgroups by assignee/company. IPAM server may store the assignee information of patents in a meta-data field that will also need to be searched to determine the assignee information, but is not limited to this. The flowchart 1400 ends at this point. Following is a general discussion describing how a company would use Tool 11 (FIG. 13) to facilitate the Preliminary Assessment Stage.

Referring to FIG. 13, the example idea involves "microwave food heating." What FIG. 13 shows is the ranking of inventors, by company, in terms of frequency of patents. The types of information the user can derive from viewing FIG. 13 includes, not only knowing which companies you may want to create a partnership with, but which individuals in the companies you would want to work with.

The other information that Tool 11 provides to the user is an indication of partnerships between the different companies that is not public information. Some inventors will show up as working for more than one assignee (company). In other words, they've done work, and they'll show up as having filed with several different companies. In this case two things may have happened. Either the inventor has switched jobs; or the two companies have a partnership working in the area. If one or two inventors have the same set of companies listed together, the inventor probably just switched jobs. On the other hand, if the inventors by company table 208 shows 3, 10, or 15 people that have the same pairings of companies, this indicates that there has been an inter-company partnership formed to work in that area.

The key point about the business process to make here, is that when the user sees this, he or she knows that there is a partnership between the companies. This can be valuable competitive intelligence information, because many times there will be partnerships formed that show up in these patents that are not publically announced. The types of companies that team up together in a particular area may be an indication of the types of products the user will have to compete with in the future.

B. Feasibility Stage

As shown in FIG. 2, the inventors by company table 208, in conjunction with IPAM server, is also useful in the Feasibility Stage of the R&D process. In general, the Feasibility Stage tests whether a concept is validated in the laboratory and with at least one lead customer. The inventors by company table 208, used in conjunction with IPAM server, is shown in FIG. 15 as Tool 22, entitled "A Table of Inventors by Assignee." The purpose of Tool 22 is to show which individuals may be resources for the project team, and which to commence competitive intelligence on.

How the IPAM server works in conjunction with the inventors by company table 208 to aid in the R&D Feasibility Stage is similar to how it works in the Preliminary Assessment Stage as described with reference to FIG. 13 above. One exception is the initial search in step 1402 (FIG. 14). Instead of searching just the groups of U.S. and European patents as in the Preliminary Assessment Stage, here the search consists of the group of U.S. patents, European patents and European applications, but is not limited to this.

V. IPAM Server and Features Grouping

Referring to FIG. 2, IPAM server works in conjunction with the features grouping chart 210 to facilitate the Preliminary Assessment Stage (as Tool 12), the Feasibility Stage (as Tool 23) and the Development Stage (as Tool 34) in the R&D process.

A. Preliminary Assessment Stage

Figure 16:
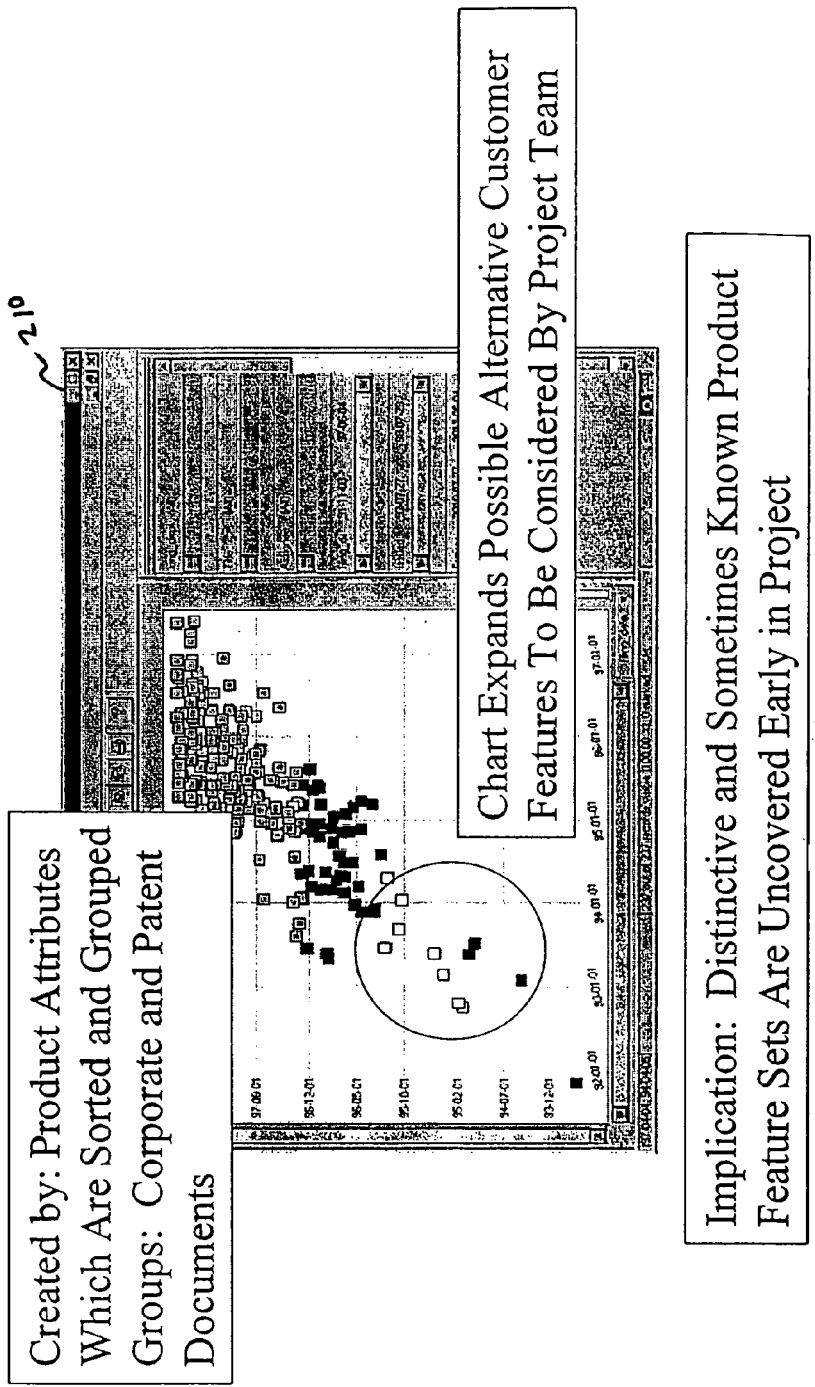
FIG. 16 illustrates the features grouping facilitating the Preliminary Assessment Stage according to an embodiment of the present invention.

The features grouping chart 210, in conjunction with IPAM server, is useful in the Preliminary Assessment Stage of the R&D process. This is shown in FIG. 16 as Tool 12 and is called "Groupings of Proposed Product Features." The Preliminary Assessment Stage comprises project definition and preliminary assessment of the feasibility of the technology and business surrounding the idea or project. The purpose of Tool 12 is to uncover distinctive and sometimes known product feature sets early in a project. Tool 12 expands possible alternative customer features to be considered by the project team. How the IPAM server works in conjunction with the features grouping chart 210 to aid in the R&D Preliminary Assessment Stage is described with reference to FIG. 17.

Figure 17:
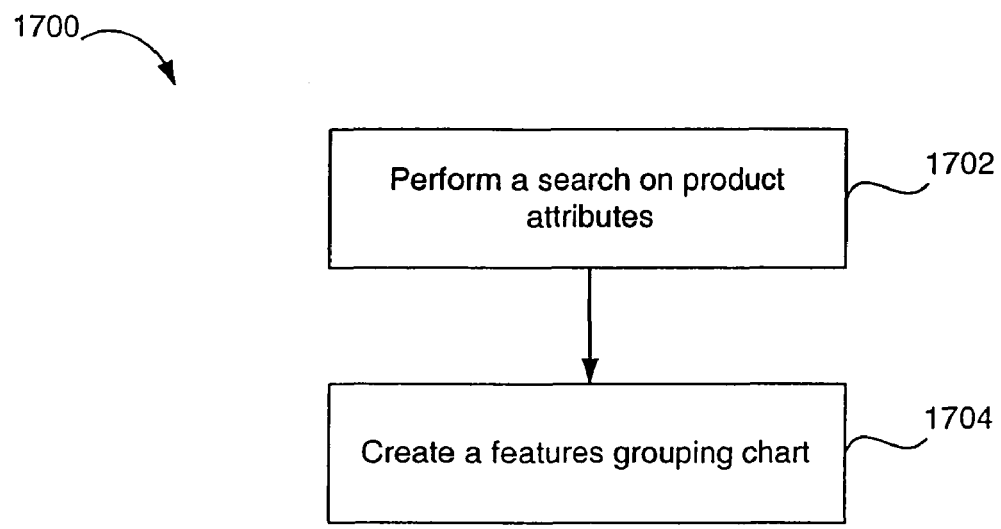
FIG. 17 is a flowchart illustrating how the IPAM server works in conjunction with the features grouping to aid in the Preliminary Assessment Stage according to an embodiment of the present invention.

In FIG. 17, a flowchart 1700 begins at step 1702. In step 1702, in an embodiment of the present invention a user performs a search on the groups of corporate and patent documents. The present invention is not limited to doing the search on corporate and patent document, but may include other available documents. Here, the search performed is typically a boolean and/or natural language search on product attributes which are sorted and grouped. Control passes to step 1704.

In step 1704, IPAM server is used in conjunction with the features grouping 210 to create a chart showing groupings of proposed product features. The chart in FIG. 16 expands possible alternative customer features to be considered by the project team.

B. Feasibility Stage

The features grouping chart 210, in conjunction with IPAM server, is also useful in the Feasibility Stage of the R&D process. This is shown in FIG. 18 as Tool 23 and is called "Map of Which Proposed Product Features Are Feasible." The purpose of Tool 23 is to find product feature sets early in the project via previous internal research and partner's research. Tool 23 also highlights distinctive features needed by customers in a way that they can be prioritized and traded-off. How the IPAM server works in conjunction with the features grouping chart 210 to aid in the R&D Feasibility Stage is similar to how it works in the Preliminary Assessment Stage as described with reference to FIG. 17 above.

C. Development Stage

The features grouping chart 210, in conjunction with IPAM server, is also useful in the Development Stage of the R&D process. This is shown in FIG. 19 as Tool 34, entitled "Map of achievable Product and Service Features." The purpose of Tool 34 is to visualize and present product feature sets to the review team in a dynamic form. How the IPAM server works in conjunction with the features grouping chart 210 to aid in the R&D Feasibility Stage is similar to how it works in the Preliminary Assessment and Feasibility Stages as described with reference to FIG. 17 above.

VI. IPAM Server and Technology Classification

Referring to FIG. 2, IPAM server works in conjunction with the technology classification 212 to facilitate the Idea Stage (as Tool 4), the Preliminary Assessment Stage (as Tool 13), the Feasibility Stage (as Tool 24), the Development Stage (as Tool 35) and the Scale-up Stage (as Tool 44) in the R&D process.

A. Idea Stage

FIG. 20 illustrates the technology classification 212 facilitating the Idea Stage as Tool 4, entitled "A Chart of Similar Technologies." As stated above, in the Idea Stage, the idea is expanded and is prepared for consideration as a formal project/product.

In FIG. 20, technology classification 212 as Tool 4 is shown. The purpose of Tool 4 in the Idea Stage is to provide the necessary information to the user (e.g., inventor of the idea) as to what other technologies might be used to build upon the initial concept. In addition, Tool 4 identifies technical fields that possibly impinge on the idea. How the IPAM server works in conjunction with the technology classification 212 to aid in the R&D Idea Stage is described with reference to FIG. 21.

Figure 21:
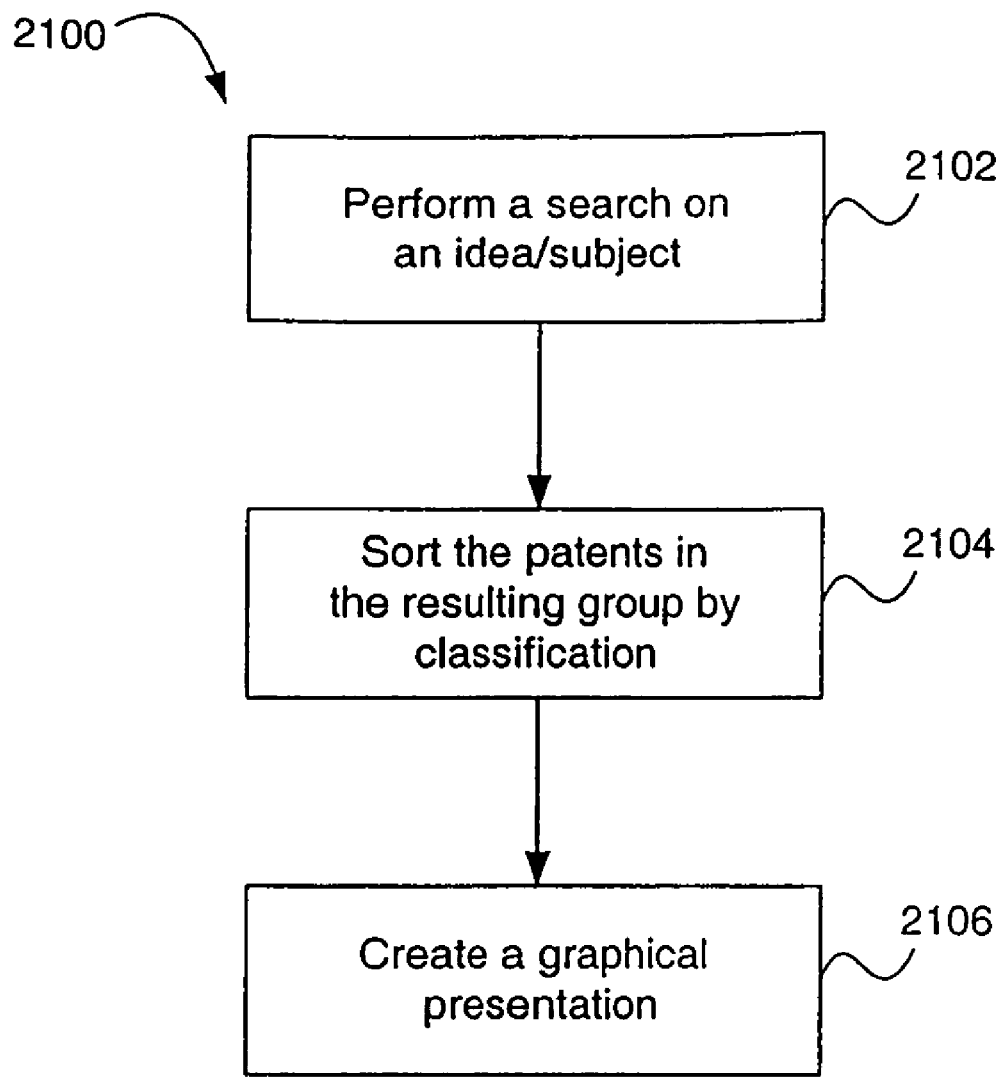
FIG. 21 is a flowchart illustrating how the IPAM server works in conjunction with the technology classification to aid in the Idea Stage according to an embodiment of the present invention.

In FIG. 21, a flowchart 2100 begins at step 2102. In step 2102, in an embodiment of the present invention a user performs a search on the group of all U.S. patents. Here, because the user is just pointing at a broad field, the abstract of each U.S. patent is typically the section that is searched, but is not limited to this. The present invention is not limited to doing the search on U.S. patents, but may include European, Japanese (and other available) patents and/or applications. Here, the search performed is typically a boolean and/or natural language search on the idea/subject to produce a group of patents. Control passes to step 2104.

In step 2104, IPAM server takes the group of patents produced in step 2102 and further divides it into subgroups, with each subgroup having the same technology classification. When the search in step 2102 is on the group of U.S. patents, the classification used is the U.S. Patent Classification designated by the U.S. Patent and Trademark Office. In a similar manner, if the search in step 2102 is on the group of International patents, then the classification used would be the IPC classification. IPAM server may store the U.S. Patent Classification (or IPC classification) a meta-data field that will also need to be searched to determine the technology classification, but is not limited to this. Control then passes to step 2106.

In step 2106, IPAM server is used in conjunction with a technology classification 212 to create a graphical representation of similar technologies. Typically, this is done by the user selecting a technology classification function on the computer screen. The technology classification 212 produced by Tool 4 (FIG. 20) shows the diverse technologies (via U.S. Patent Classifications) that might be used to build upon the initial idea. The graphical representation in FIG. 20 is a pie chart. The present invention is not limited to using a pie chart, but could also use radar or spider charts, two or three dimensional graphs, etc.

Referring to FIG. 20, the U.S. Patent Classification 395 represents the most common type of technology that can be used to implement the idea. The most common type of technology is typically the lowest cost. The most unique technologies that can be used to implement the idea are shown by the smallest slivers in the pie chart of FIG. 20. The most unique technologies generally indicate technologies that the user may not have thought of without the present invention. It is important to keep in mind that Tool 4 is used in the Idea Stage and the user is concerned with whether his or her idea makes any initial sense to pursue.

B. Preliminary Assessment Stage

Figure 22:
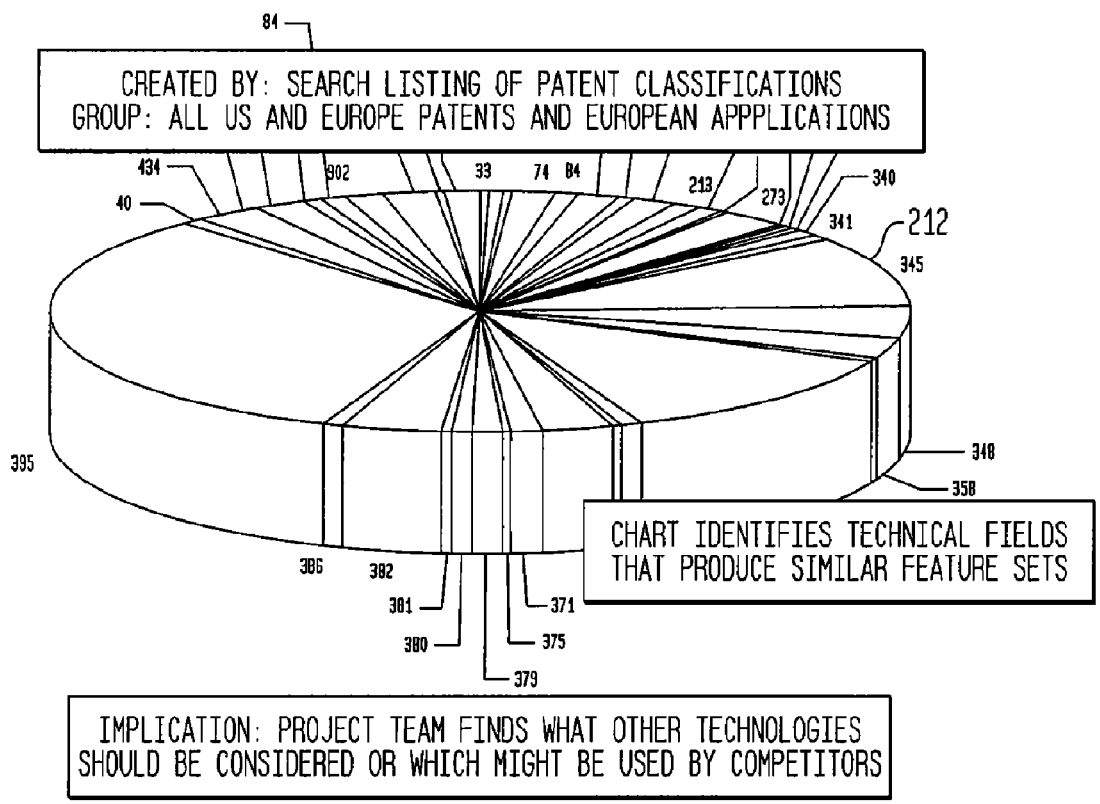
FIG. 22 illustrates the technology classification facilitating the Preliminary Assessment Stage according to an embodiment of the present invention.

FIG. 22 illustrates the technology classification 212 facilitating the Preliminary Assessment Stage as Tool 13, entitled "A Chart of Similar Technologies." The purpose of Tool 13 in the Preliminary Assessment Stage is to provide the necessary information to the project team as to what other technologies should be considered for the idea. In addition, what technologies are being used by other competitors. In addition, Tool 13 identifies technical fields that produce similar feature sets. How the IPAM server works in conjunction with the technology classification 212 to aid in the R&D Preliminary Assessment Stage is similar to how it works in the Idea Stage as described with reference to FIG. 21 above. The one exception is that the group searched in step 2102 also includes European and Japanese (or any other) Patents and Applications, in addition to U.S. Patents, but is not limited to this.

C. Feasibility Stage

Figure 23:
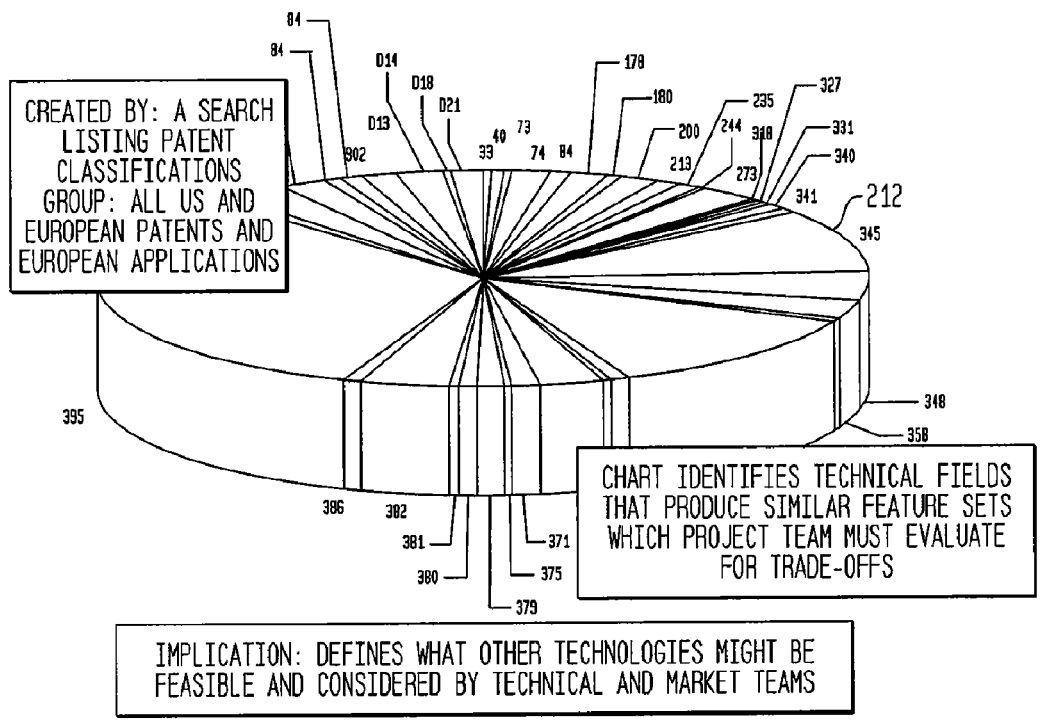
FIG. 23 illustrates the technology classification facilitating the Feasibility Stage according to an embodiment of the present invention.

FIG. 23 illustrates the technology classification 212 facilitating the Feasibility Stage as Tool 24, entitled "A Chart of Similar Technologies." The purpose of Tool 24 in the Feasibility Stage is to define what other technologies might be feasible and considered by technical and market teams. In addition, Tool 24 identifies technical fields that produce similar feature sets, which the project team must evaluate for trade-offs. How the IPAM server works in conjunction with the technology classification 212 to aid in the R&D Feasibility Stage is similar to how it works in the Idea Stage as described with reference to FIG. 21 above. The one exception is that the group searched in step 2102 also includes European and Japanese (or any other) Patents and Applications, in addition to U.S. Patents, but is not limited to this.

D. Development Stage

Figure 24:
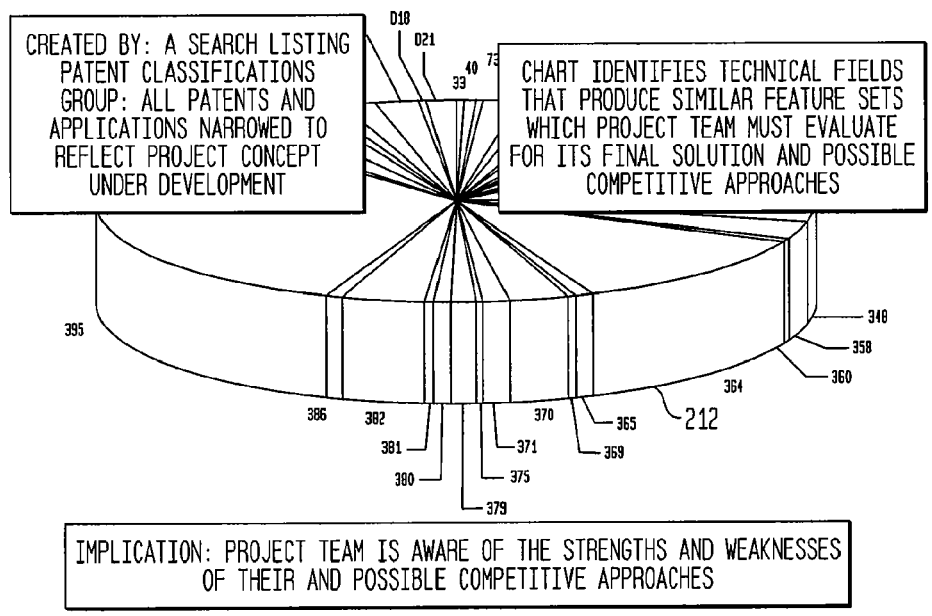
FIG. 24 illustrates the technology classification facilitating the Development Stage according to an embodiment of the present invention.

FIG. 24 illustrates the technology classification 212 facilitating the Development Stage as Tool 35, entitled "Map of Similar Technologies." The purpose of Tool 35 in the Development Stage is to make the project team aware of strengths and weaknesses of not only its approach, but also competitive approaches. In addition, Tool 35 identifies technical fields that produce similar feature sets, which the project team must evaluate for its final solution and possible competitive approaches. How the IPAM server works in conjunction with the technology classification 212 to aid in the R&D Development Stage is similar to how it works in the Idea Stage as described with reference to FIG. 21 above. The one exception is that the group searched in step 2102 is all patents and applications narrowed to reflect project concept under development, but is not limited to this.

E. Scale-up Stage

Figure 25:
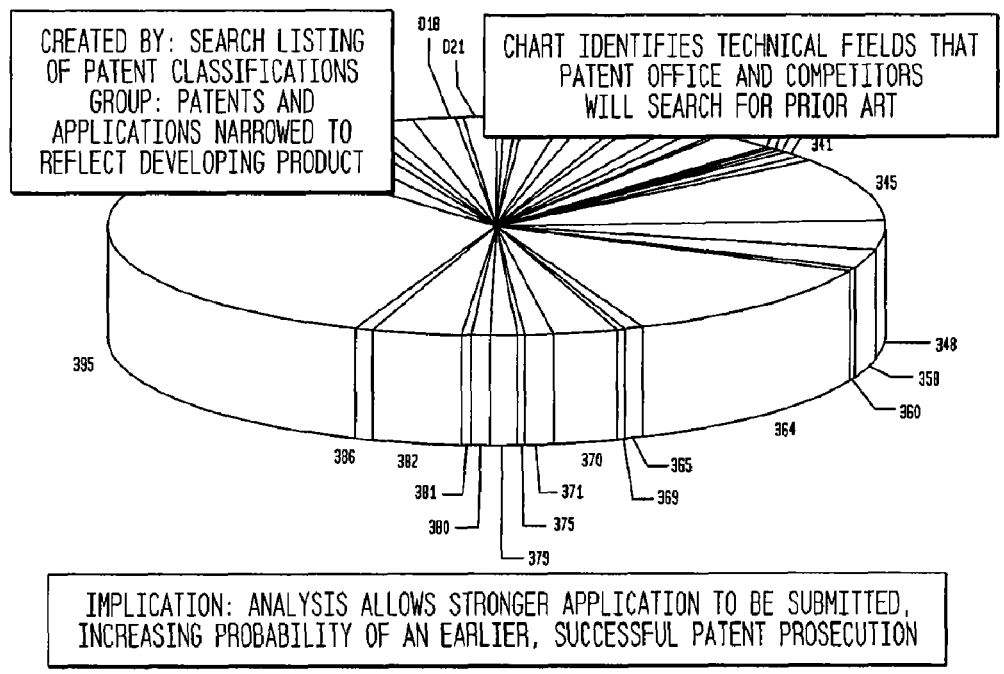
FIG. 25 illustrates the technology classification facilitating the Scale-up Stage according to an embodiment of the present invention.

FIG. 25 illustrates the technology classification 212 facilitating the Scale-up Stage as Tool 44, entitled "A Chart of Similar Technologies." The purpose of Tool 44 in the Scale-up Stage is to allow for analysis that will not only increase the strength of any patent applications that are filed on the idea, but also increase the probability of earlier, successful patent prosecution. In addition, Tool 44 identifies technical fields that the U.S. Patent and Trademark Office and other competitors may search for prior art to be used against the patent application during prosecution or thereafter. How the IPAM server works in conjunction with the technology classification 212 to aid in the R&D Scale-up Stage is similar to how it works in the Idea Stage as described with reference to FIG. 21 above. The one exception is that the group searched in step 2102 is all patents and applications narrowed to reflect the developing product, but is not limited to this.

VII. IPAM Server and Standard Industrial Codes (SIC) Classification

Referring to FIG. 2, IPAM server works in conjunction with the SIC classification 214 to facilitate the Preliminary Assessment Stage (as Tool 14), the Feasibility Stage (as Tool 25) and the Development Stage (as Tool 36).

A. Preliminary Assessment Stage

Figure 26:
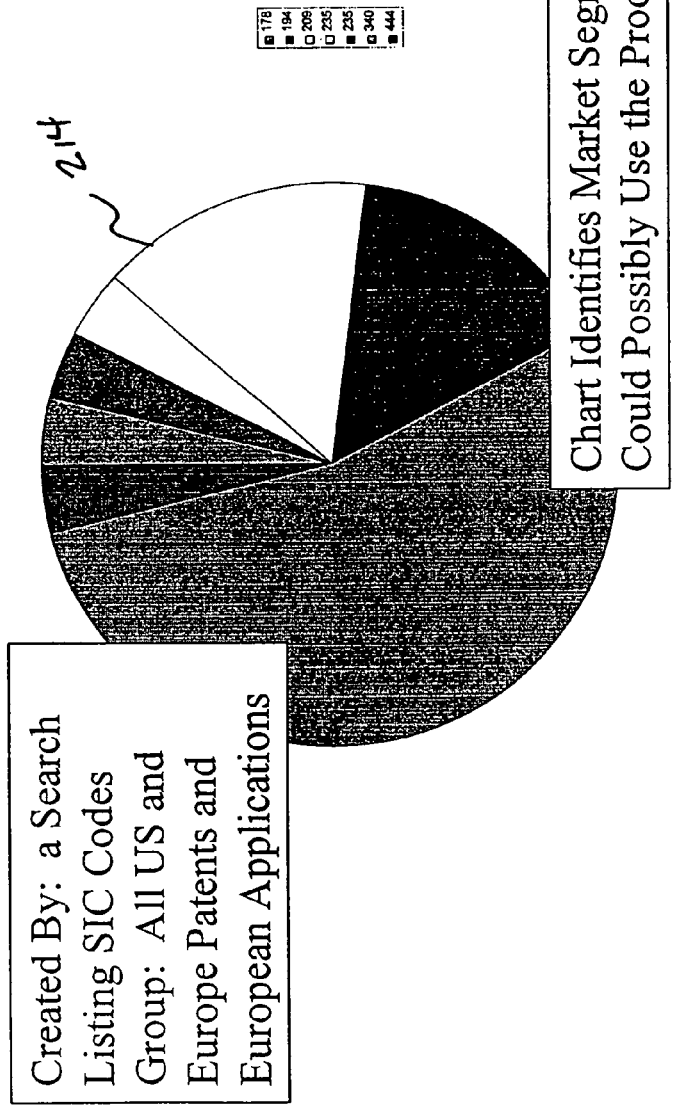
FIG. 26 illustrates the SIC classification facilitating the Preliminary Assessment Stage according to an embodiment of the present invention.

FIG. 26 illustrates the SIC classification 214 facilitating the Preliminary Assessment Stage as Tool 14, entitled "A Chart of Related Markets." The purpose of Tool 14 in the Preliminary Assessment Stage is to provide the necessary information to the project team to find other markets (or industries) which should be assessed by team members. In addition, Tool 14 identifies market (or industry) segments that could possibly use the product or service. The following Tools described in this section (Section VII) can easily be modified to allow the user to define the industry by companies by plotting the U.S. patent classification for that industry (e.g., SIC classification) . How the IPAM server works in conjunction with the SIC classification 214 to aid in the R&D Preliminary Assessment Stage is described with reference to FIG. 27.

Figure 27:
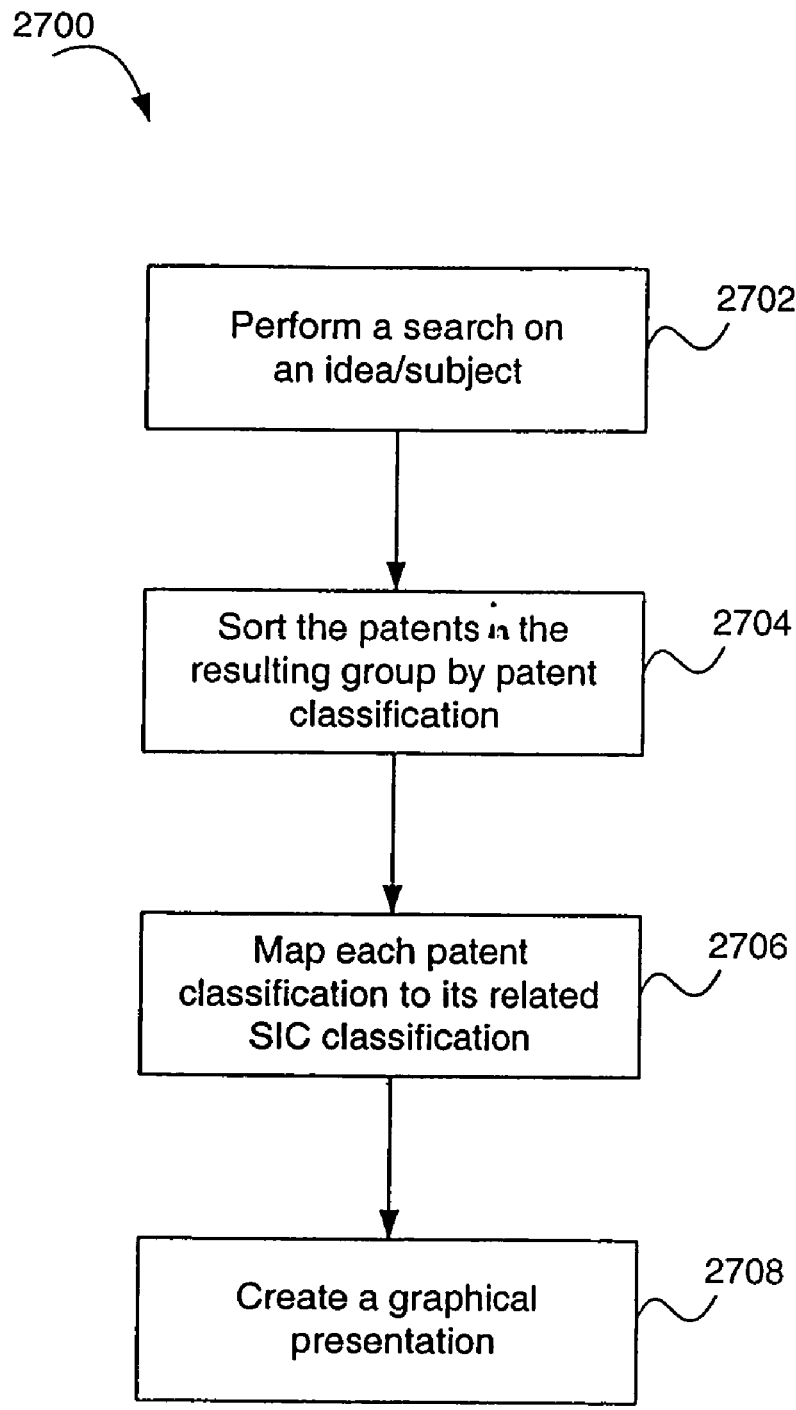
FIG. 27 is a flowchart illustrating how the IPAM server works in conjunction with the SIC classification to aid in the Preliminary Assessment Stage according to an embodiment of the present invention.

In FIG. 27, a flowchart 2700 begins at step 2702. In step 2702, in an embodiment of the present invention a user performs a search on the group of all U.S. patents, European patents, and European applications (and other available patents and/or applications). Here, because the user is just pointing at a broad field, the abstract of each patent and/or application is typically the section that is searched, but is not limited to this. Here, the search performed is typically a boolean and/or natural language search on the idea/subject to produce a group of patents and applications. Control passes to step 2704.

In step 2704, IPAM server takes the group of patents produced in step 2702 and further divides it into subgroups, with each subgroup having the same technology classification. When the search in step 2102 is on the group of U.S. patents, the classification used is the U.S. Patent Classification designated by the U.S. Patent and Trademark Office. In a similar manner, if the search in step 2102 is on the group of International patents and applications, then the classification used would be the IPC classification. IPAM server may store the U.S. Patent Classification and IPC classification each as a meta-data field that will also need to be searched to determine the technology classification, but is not limited to this. Control then passes to step 2706.

In step 2706, each U.S. and IPC classification determined by step 2704 is mapped to its related SIC classification. Control then passes to step 2708.

In step 2708, IPAM server is used in conjunction with a SIC classification 214 to create a graphical representation of similar industrial markets. Typically, this is done by the user selecting a SIC classification function on the computer screen. The SIC classification 214 produced by Tool 14 (FIG. 26) shows the diverse markets (via SIC Classifications) that apply to the idea. The graphical representation in FIG. 26 is a pie chart. The present invention is not limited to using a pie chart.

Referring to FIG. 26, the SIC Classification 178 represents the most common market or industry that the idea is related to. SIC classification codes are provided by the U.S. Department of Commerce.

B. Feasibility Stage

Figure 28:
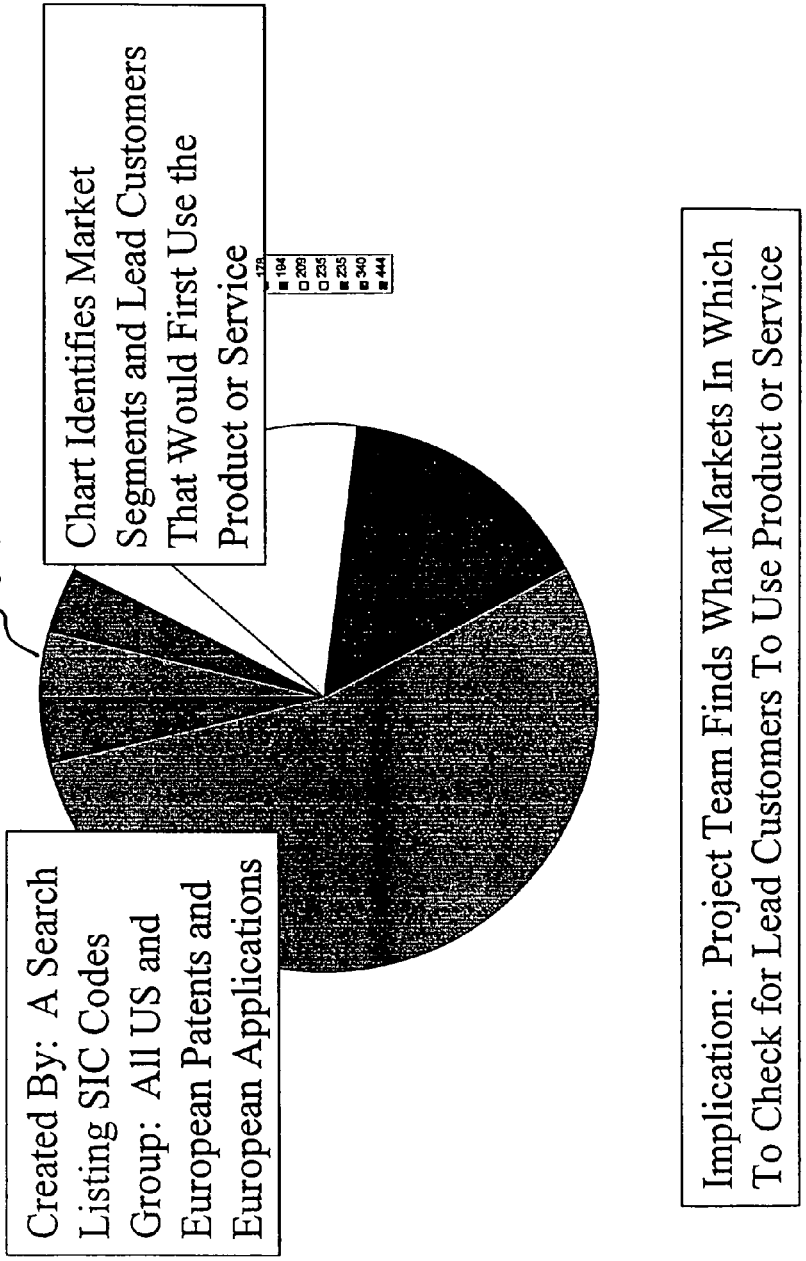
FIG. 28 illustrates the SIC classification facilitating the Feasibility Stage according to an embodiment of the present invention.

FIG. 28 illustrates the SIC classification 214 facilitating the Feasibility Stage as Tool 25, entitled "A Chart of Related Markets." The purpose of Tool 25 in the Feasibility Stage is to provide the necessary information to the project team as to what markets to check for lead customers to use the product or service (resulting from the initial idea). In addition, Tool 25 identifies market segments and lead customers that would first use the product or service. How the IPAM server works in conjunction with the SIC classification 214 to aid in the R&D Feasibility Stage is similar to how it works in the Preliminary Assessment Stage as described with reference to FIG. 27 above.

C. Development Stage

Figure 29:
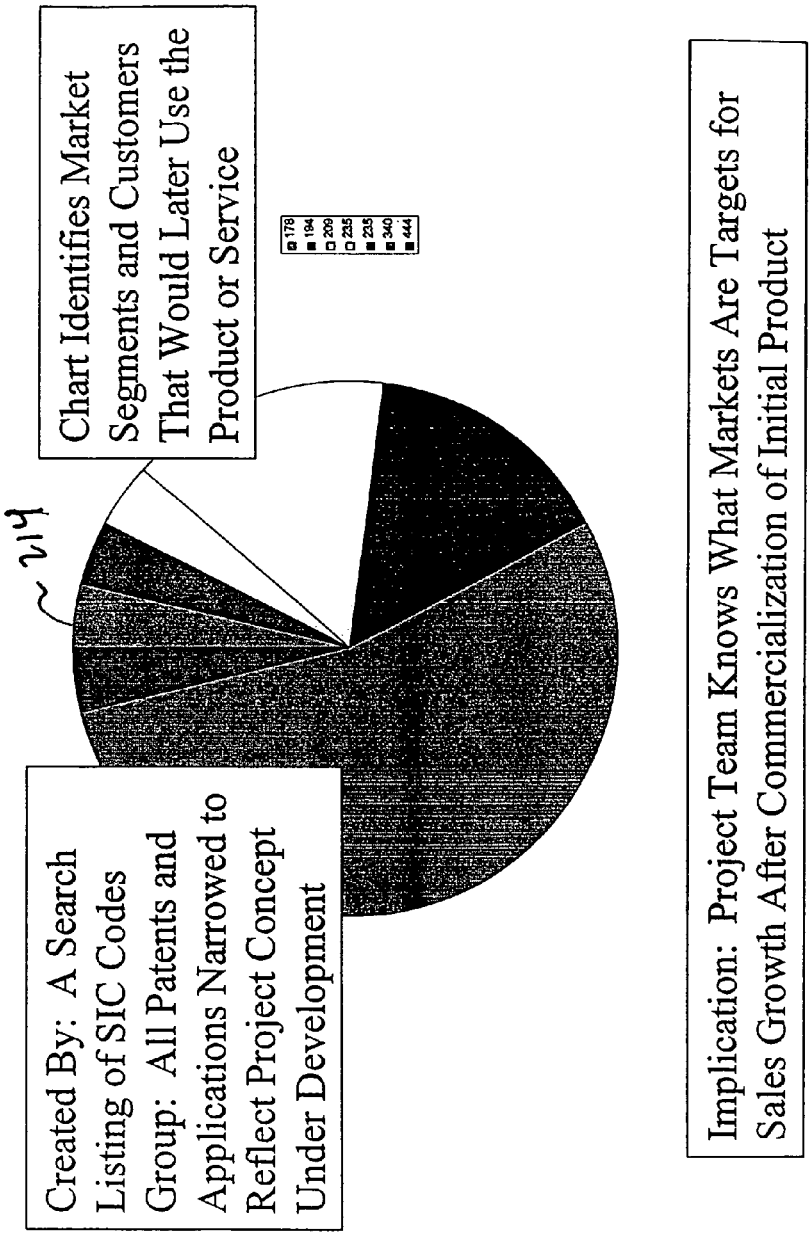
FIG. 29 illustrates the SIC classification facilitating the Development Stage according to an embodiment of the present invention.

FIG. 29 illustrates the SIC classification 214 facilitating the Development Stage as Tool 36, entitled "A Chart of Related Markets." The purpose of Tool 36 in the Development Stage is to provide the necessary information to the project team as to what markets are targets for sales growth after commercialization of the initial product. In addition, Tool 36 identifies market segments and customers that would later use the product or service. How the IPAM server works in conjunction with the SIC classification 214 to aid in the R&D Feasibility Stage is similar to how it works in the Preliminary Assessment Stage as described with reference to FIG. 27 above. The one exception is that the group searched in step 2702 is all patents and applications narrowed to reflect project concept under development, but is not limited to this.

VIII. IPAM Server and Patent Count Per Year

Figure 30:
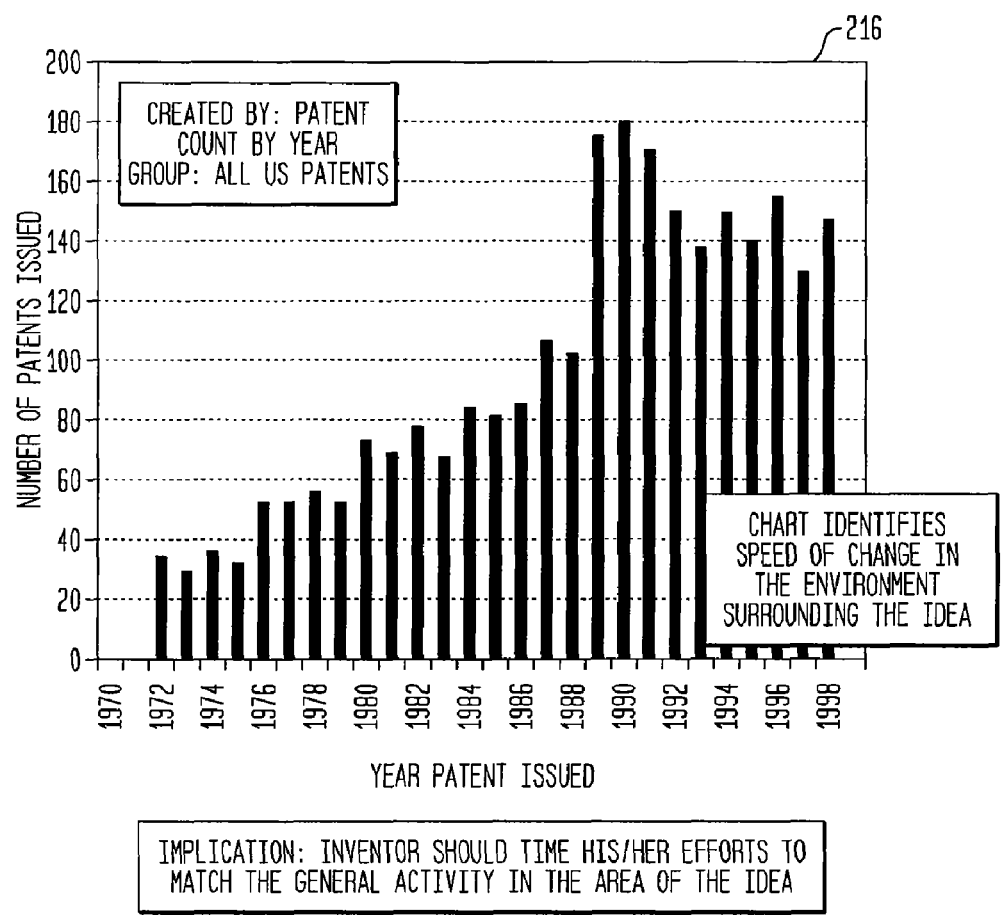
FIG. 30 illustrates the patent count per year facilitating the Idea Stage according to an embodiment of the present invention.

Referring to FIG. 2, IPAM server works in conjunction with the patent count per year 216 to facilitate the Idea Stage (as Tool 5). FIG. 30 illustrates the count per year 216 facilitating the Idea Stage as Tool 5, entitled "Patent Activity Chart." As stated above, in the Idea Stage, the idea is expanded and is prepared for consideration as a formal project/product.

In FIG. 30, patent count per year 216 as Tool 5 is shown. The purpose of Tool 5 in the Idea Stage is to provide such information to the user/inventor so that he or she can time his or her efforts to match the general activity in the area of the idea. In addition, Tool 5 identifies speed of change in the environment surrounding the idea (i.e., the velocity and intensity of activity in the market). How the IPAM server works in conjunction with the patent count per year 216 to aid in the R&D Idea Stage is described with reference to FIG. 31.

Figure 31:
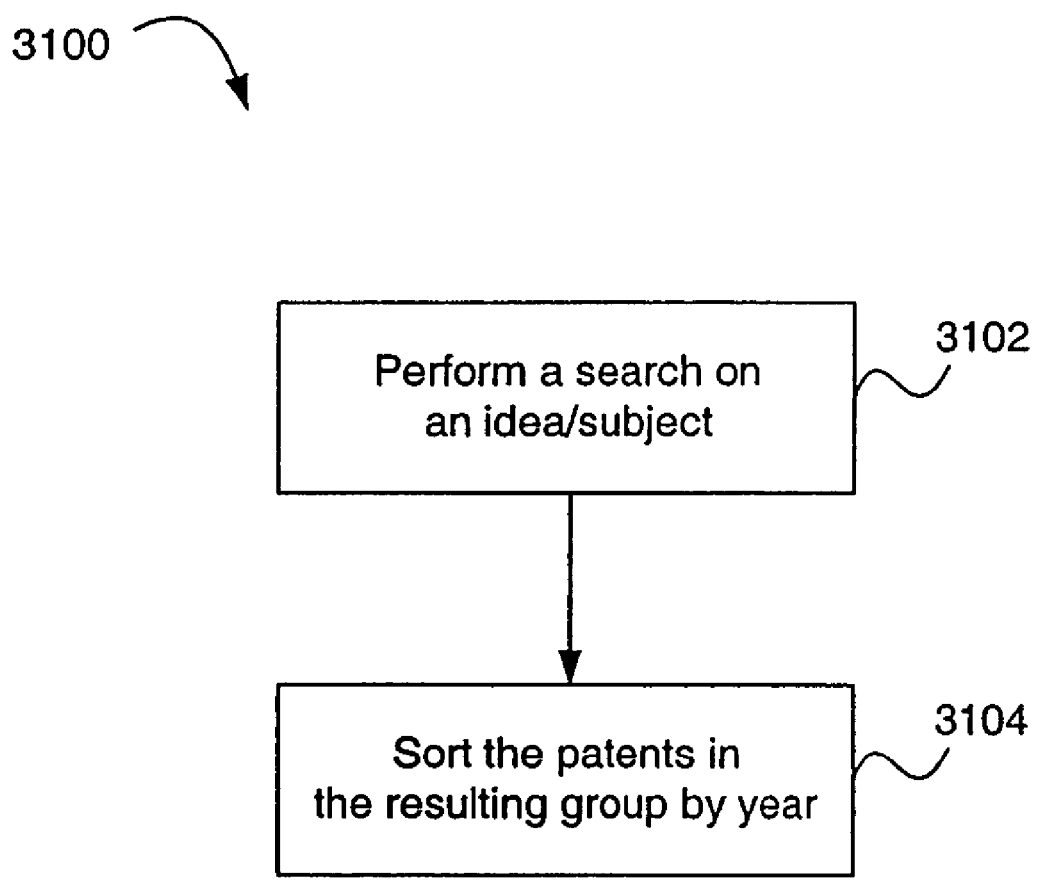
FIG. 31 is a flowchart illustrating how the IPAM server works in conjunction with the patent count per year to aid in the Idea Stage according to an embodiment of the present invention.

In FIG. 31, a flowchart 3100 begins at step 3102. In step 3102, in an embodiment of the present invention a user performs a search on the group of all U.S. patents. Here, because the user is just pointing at a broad field, the abstract of each U.S. patent is typically the section that is searched, but is not limited to this. The present invention is not limited to doing the search on U.S. patents, but may include European, Japanese (and other available) patents and/or applications. Here, the search performed is typically a boolean and/or natural language search on the idea/subject to produce a group of patents. Control passes to step 3104.

In step 3104, IPAM server is used in conjunction with patent count per year 216 to create a chart that indicates the top assignees/companies in a related area to the idea/subject searched in step 3102. Here, the group of patents produced in step 3102 are further divided into subgroups, with each subgroup having patents that were issued in the same year and relate to the idea. Typically, step 3104 is initiated by the user selecting a patent count per year function on the computer screen. At this point flowchart 3100 ends.

Following is a general discussion describing an example thought process of the user as he or she uses Tool 5 in the Idea Stage. Referring to FIG. 30, the idea relates to the microwave heating of food. The user may look at the chart and notice that through the mid-1980s there was slow and steady growth of patents being issued relating to microwave heating of food. This indicates there is a lot of art in that time frame. But, it also tells the user that it's an area of growth and people are still investing in it so if the user has a good idea, he or she should consider participating.

What the user sees in the years 1990 and 1991 is doubling of the activity from the year or two previous. This indicates that in 1990 and 1991, everyone jumped into the markets relating to the microwave heating of food. Again, unless the user has a very distinctive idea, he or she may decline to get into the market. Looking at the late 1990's it appears as if the market is declining. At this time it may not be a good business decision to pursue the idea of microwave heating of food.

IX. IPAM Server and Patent Count Per Year

Referring to FIG. 2, IPAM server works in conjunction with the patent count per year 218 to facilitate the Preliminary Assessment Stage (as Tool 15), the Feasibility Stage (as Tool 26), the Development Stage (as Tool 37) and the Scale-up Stage (as Tool 45). What these tools illustrate (in three dimensional form) what Tool 5 illustrated, as discussed above.

A. Preliminary Assessment Stage

Figure 32:
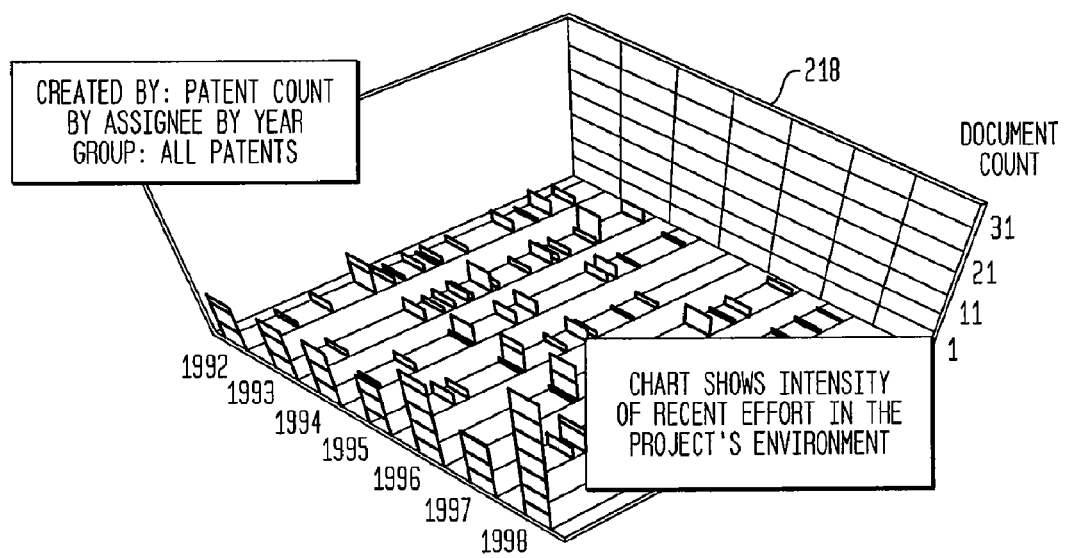
FIG. 32 illustrates the patent count per year facilitating the Preliminary Assessment Stage according to an embodiment of the present invention.

FIG. 32 illustrates the patent count per year 218 facilitating the Preliminary Assessment Stage as Tool 15, entitled "Recent Patent Activity Chart." The purpose of Tool 15 in the Preliminary Assessment Stage is provide information to the project team in terms of recent patent activity. Here, if there is heavy activity in recent years, the project team must consider whether the product/idea is distinctive enough to ensure commercial success. In addition, Tool 15 shows the intensity of recent effort in the project's environment. How the IPAM server works in conjunction with the patent count per year 218 to aid in the R&D Preliminary Assessment Stage is described with reference to FIG. 33.

Figure 33:
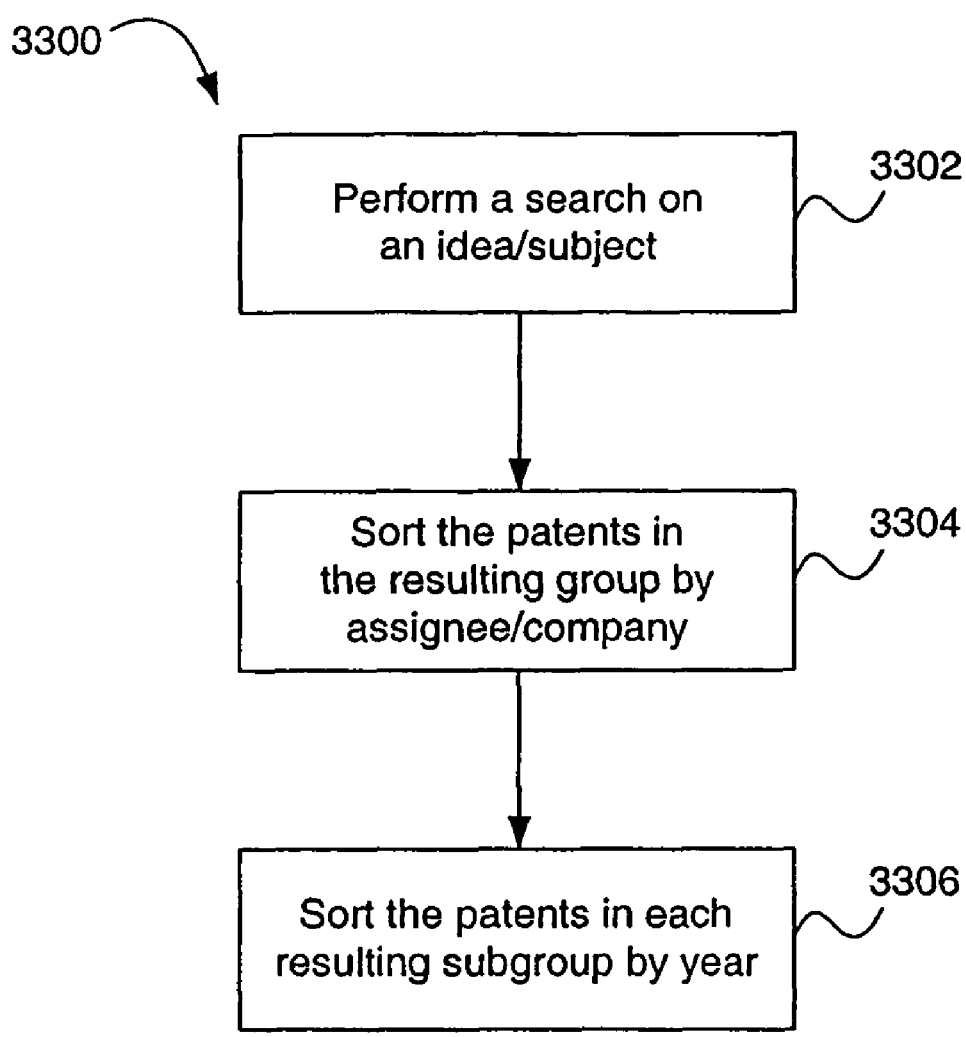
FIG. 33 is a flowchart illustrating how the IPAM server works in conjunction with the patent count per year to aid in the Preliminary Assessment Stage according to an embodiment of the present invention.

In FIG. 33, a flowchart 3300 begins at step 3302. In step 3302, in an embodiment of the present invention a user performs a search on the groups of all U.S., European (and other available) patents. Here, because the user is just pointing at a broad field, the abstract of each patent is typically the section that is searched, but is not limited to this. Here, the search performed is typically a boolean and/or natural language search on the idea/subject to produce a group of patents. Control passes to step 3304.

In step 3304, the group of patents produced in step 3302 are further divided into subgroups, with each subgroup having the same assignee/company. IPAM server may store the assignee information of patents in a meta-data field that will also need to be searched to determine the assignee, but is not limited to this. Control then passes to step 3306.

In step 3306, each subgroup produced in step 3304 is further divided into subgroups by year. IPAM server may store the year information of patents in a meta-data field that will also need to be searched to determine the year, but is not limited to this. The flowchart 3300 ends at this point.

B. Feasibility Stage

Figure 34:
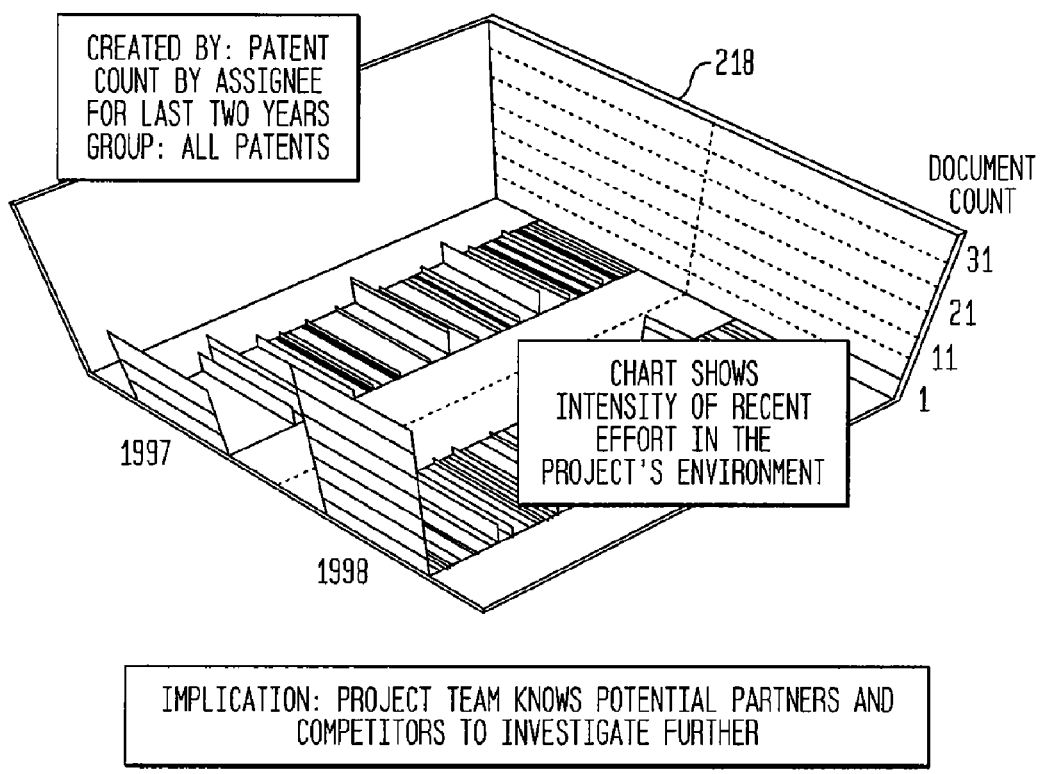
FIG. 34 illustrates the patent count per year facilitating the Feasibility Stage according to an embodiment of the present invention.

As shown in FIG. 2, the patent count per year 218, in conjunction with IPAM server, is also useful in the Feasibility Stage of the R&D process. In general, the Feasibility Stage tests whether a concept is validated in the laboratory and with at least one lead customer. The patent count per year 218, used in conjunction with IPAM server, is shown in FIG. 34 as Tool 26, entitled "Recent Patent Activity Chart." The purpose of Tool 26 is to inform the project team of potential partners and competitors to investigate further. In addition, the chart shows intensity of recent effort in the project's environment.

How the IPAM server works in conjunction with the patent count per year 218 to aid in the R&D Feasibility Stage is similar to how it works in the Preliminary Assessment Stage as described with reference to FIG. 33 above. One exception is in step 3306. In the Preliminary Assessment Stage, all years we included in the chart. Here, only the last two years is typically included, but is not limited to this.

C. Development Stage

Figure 35:
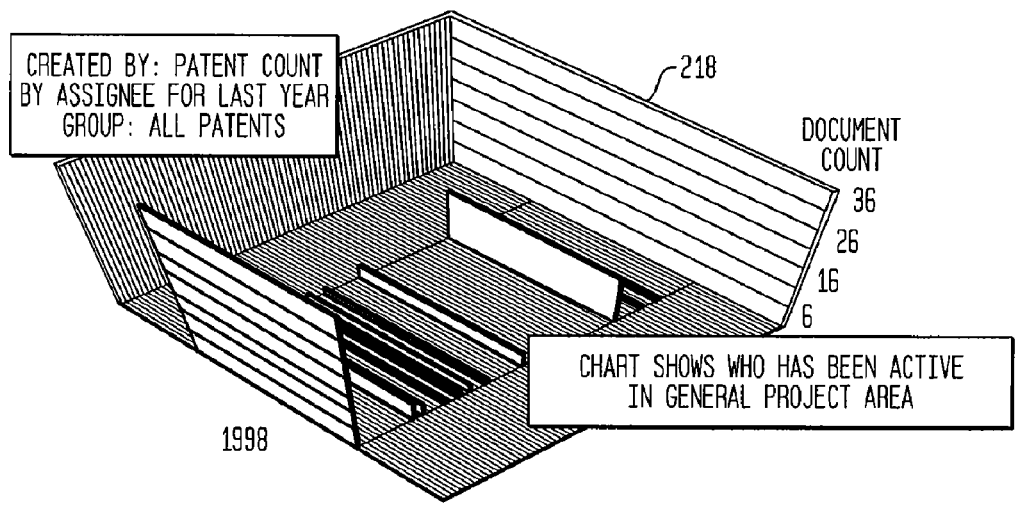
FIG. 35 illustrates the patent count per year facilitating the Development Stage according to an embodiment of the present invention.

As shown in FIG. 2, the patent count per year 218, in conjunction with IPAM server, is also useful in the Development Stage of the R&D process. The patent count per year 218, used in conjunction with IPAM server, is shown in FIG. 35 as Tool 37, entitled "Recent Patent Activity Chart." The purpose of Tool 37 is to inform the project team and competitive intelligence of which companies to watch or investigate for ongoing activity in the project area. In addition, the chart shows who has been active in the general project area.

How the IPAM server works in conjunction with the patent count per year 218 to aid in the R&D Development Stage is similar to how it works in the Preliminary Assessment Stage as described with reference to FIG. 33 above. One exception is in step 3306. In the Preliminary Assessment Stage, all years we included in the chart. Here, only the last year is typically included, but is not limited to this.

D. Scale-up Stage

Figure 36:
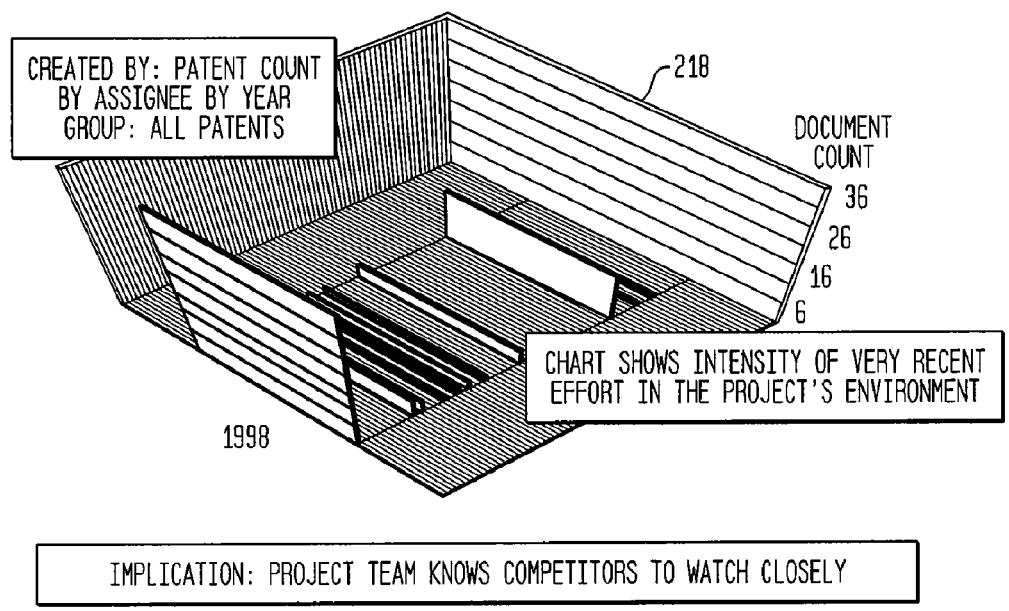
FIG. 36 illustrates the patent count per year facilitating the Scale-up Stage according to an embodiment of the present invention.

As shown in FIG. 2, the patent count per year 218, in conjunction with IPAM server, is also useful in the Scale-up Stage of the R&D process. The patent count per year 218, used in conjunction with IPAM server, is shown in FIG. 36 as Tool 45, entitled "Recent Patent Activity Chart." The purpose of Tool 45 is to inform the project team of which competitors to watch closely. In addition, the chart shows the intensity of very recent effort in the project's environment. How the IPAM server works in conjunction with the patent count per year 218 to aid in the R&D Scale-up Stage is similar to how it works in the Preliminary Assessment Stage as described with reference to FIG. 33 above.

X. IPAM Server and Application Count Per Year

Referring to FIG. 2, IPAM server works in conjunction with the application count per year 220 to facilitate the Preliminary Assessment Stage (as Tool 16), the Feasibility Stage (as Tool 27), the Development Stage (as Tool 38) and the Scale-up Stage (as Tool 46).

A. Preliminary Assessment Stage

Figure 38:
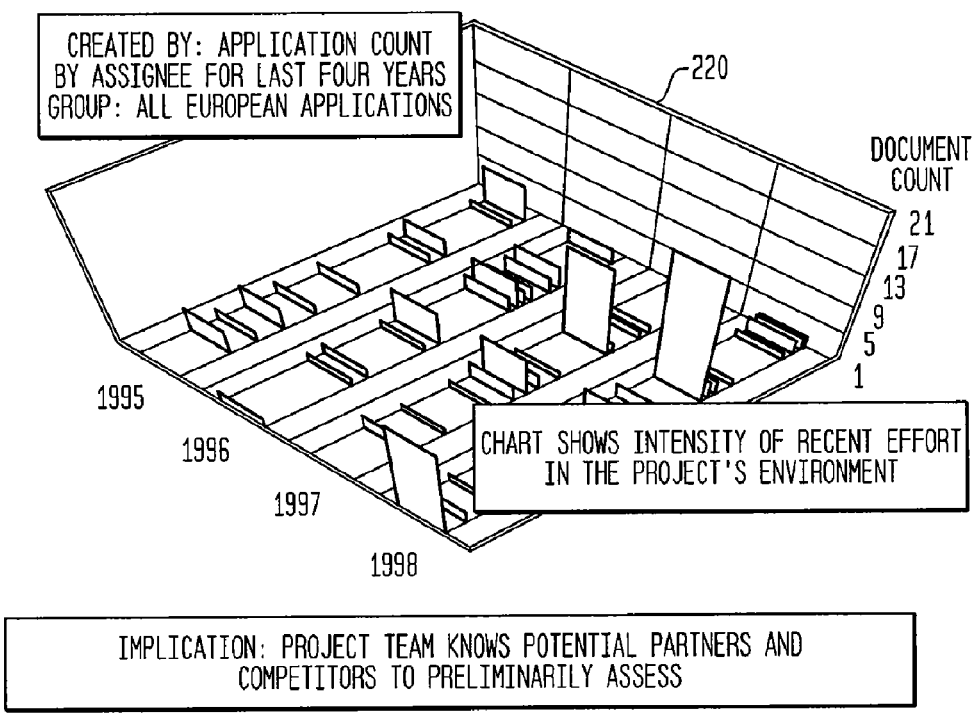
FIG. 38 illustrates the application count per year facilitating the Preliminary Assessment Stage according to an embodiment of the present invention.

FIG. 38 illustrates the application count per year 218 facilitating the Preliminary Assessment Stage as Tool 16, entitled "Recent Patent Application Chart." The purpose of Tool 16 in the Preliminary Assessment Stage is provide information to the project team as to the potential partners and competitors to preliminarily assess. In addition, Tool 16 shows the intensity of recent effort in the project' environment. How the IPAM server works in conjunction with the application count per year 220 to aid in the R&D Preliminary Assessment Stage is described with reference to FIG. 39.

Figure 39:
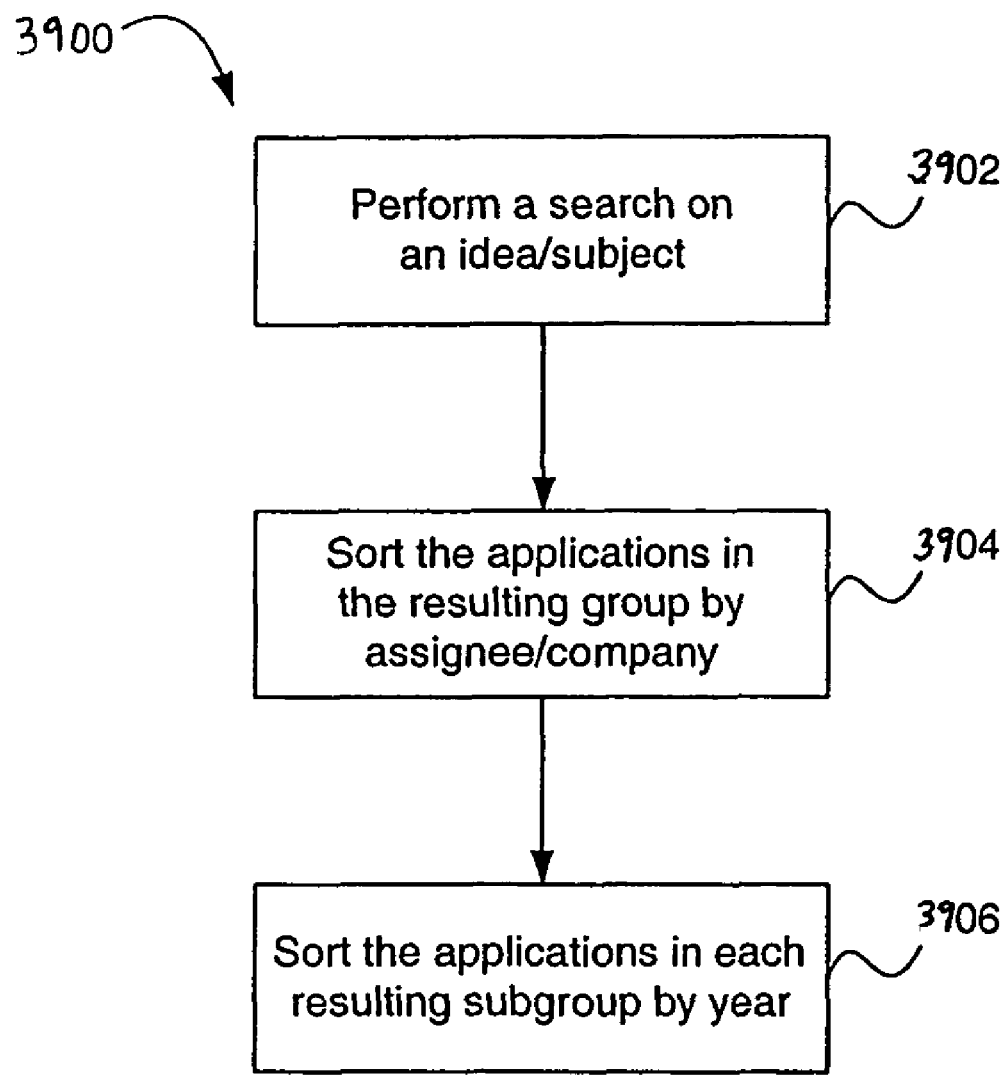
FIG. 39 is a flowchart illustrating how the IPAM server works in conjunction with the application count per year to aid in the Preliminary Assessment Stage according to an embodiment of the present invention.

In FIG. 39, a flowchart 3900 begins at step 3902. In step 3902, in an embodiment of the present invention a user performs a search on the group of all European applications, but is not limited to this. Here, because the user is just pointing at a broad field, the abstract of each patent is typically the section that is searched, but is not limited to this. The search performed is typically a boolean and/or natural language search on the idea/subject to produce a group of applications. Control passes to step 3904.

In step 3904, the group of applications patents produced in step 3902 are further divided into subgroups, with each subgroup having the same assignee/company. IPAM server may store the assignee information of applications in a meta-data field that will also need to be searched to determine the assignee, but is not limited to this. Control then passes to step 3906.

In step 3906, each subgroup produced in step 3904 is further divided into subgroups by year, where year is limited to the last four years. IPAM server may store the year information of applications in a meta-data field that will also need to be searched to determine the year, but is not limited to this. The flowchart 3900 ends at this point.

B. Feasibility Stage

Figure 40:
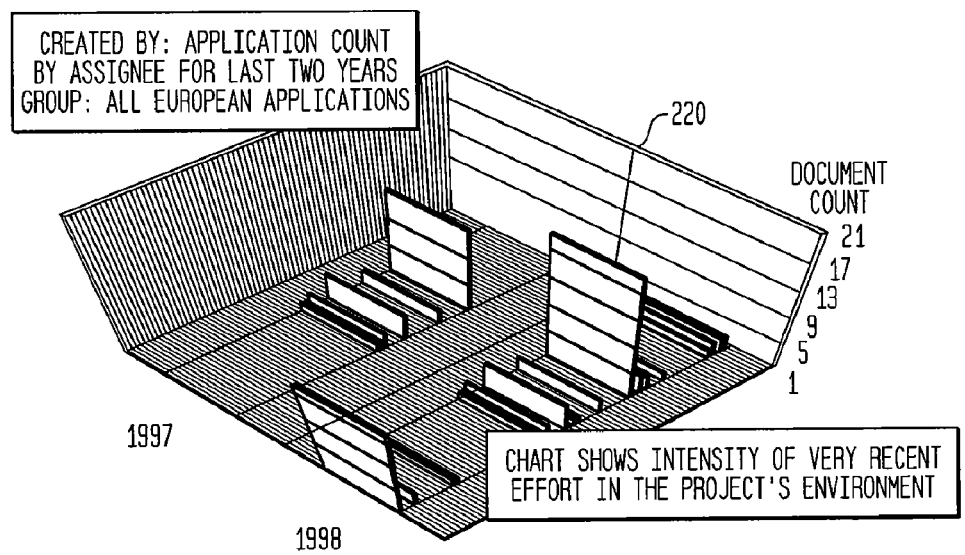
FIG. 40 illustrates the application count per year facilitating the Feasibility Stage according to an embodiment of the present invention.

As shown in FIG. 2, the application count per year 220, in conjunction with IPAM server, is also useful in the Feasibility Stage of the R&D process. In general, the Feasibility Stage tests whether a concept is validated in the laboratory and with at least one lead customer. The application count per year 220, used in conjunction with IPAM server, is shown in FIG. 40 as Tool 27, entitled "Recent Patent Application Chart." The purpose of Tool 27 is to inform the project team of potential partners and competitors to watch. In addition, the chart shows intensity of very recent effort in the project's environment.

How the IPAM server works in conjunction with the application count per year 220 to aid in the R&D Feasibility Stage is similar to how it works in the Preliminary Assessment Stage as described with reference to FIG. 39 above. One exception is in step 3906. In the Preliminary Assessment Stage, the last four years were included in the chart. Here, only the last two years are typically included, but it not limited to this.

C. Development Stage

Figure 41:
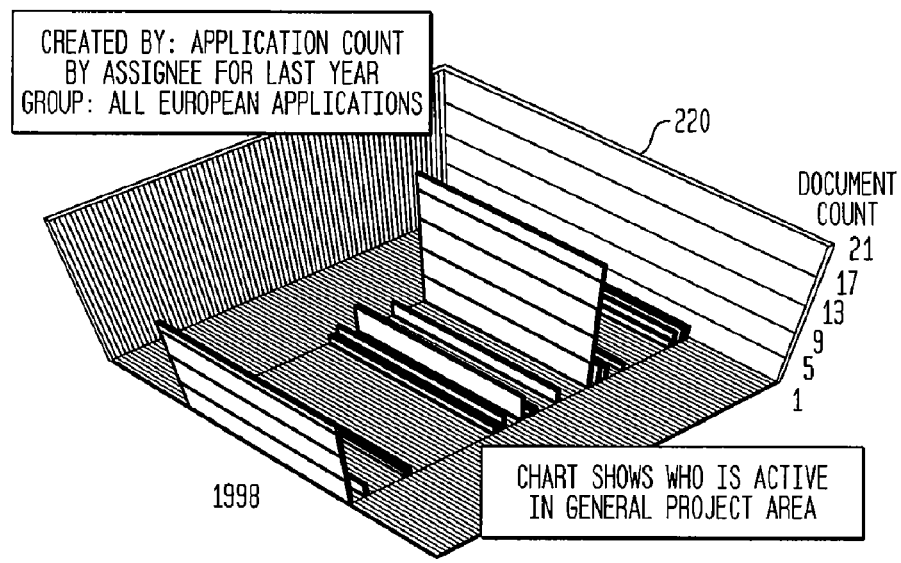
FIG. 41 illustrates the application count per year facilitating the Development Stage according to an embodiment of the present invention.

As shown in FIG. 2, the application count per year 220, in conjunction with IPAM server, is also useful in the Development Stage of the R&D process. The application count per year 220, used in conjunction with IPAM server, is shown in FIG. 41 as Tool 38, entitled "Recent Patent Application Chart." The purpose of Tool 38 is to inform the project team and competitive intelligence of which companies to watch for ongoing activity in the project area. In addition, the chart shows who has been active in the general project area.

How the IPAM server works in conjunction with the application count per year 220 to aid in the R&D Development Stage is similar to how it works in the Preliminary Assessment Stage as described with reference to FIG. 39 above. One exception is in step 3906. In the Preliminary Assessment Stage, the last four years were included in the chart. Here, only the last year is typically included, but is not limited to this.

D. Scale-up Stage

Figure 42:
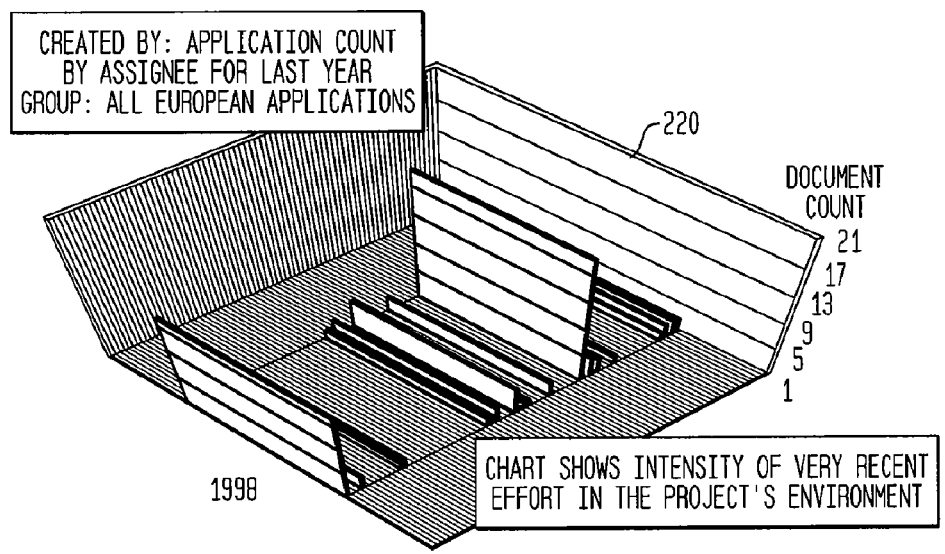
FIG. 42 illustrates the application count per year facilitating the Scale-up Stage according to an embodiment of the present invention.

As shown in FIG. 2, the application count per year 220, in conjunction with IPAM server, is also useful in the Scale-up Stage of the R&D process. The application count per year 220, used in conjunction with IPAM server, is shown in FIG. 42 as Tool 46, entitled "Recent Patent Application Chart." The purpose of Tool 46 is to inform the project team of potential partners and competitors to watch closely. In addition, the chart shows the intensity of very recent efforts in the project's environment.

How the IPAM server works in conjunction with the application count per year 220 to aid in the R&D Scale-up Stage is similar to how it works in the Preliminary Assessment Stage as described with reference to FIG. 39 above. One exception is in step 3906. In the Preliminary Assessment Stage, the last four years were included in the chart. Here, only the last year is typically included, but is not limited to this.

XI. IPAM Server and Technology by Company Map

Referring to FIG. 2, IPAM server works in conjunction with the technology by company map 222 to facilitate the Idea Stage (as Tool 6), the Preliminary Assessment Stage (as Tool 17), the Feasibility Stage (as Tool 28), the Development Stage (as Tool 39) and the Scale-up Stage (as Tool 47).

A. Idea Stage

Figure 43:
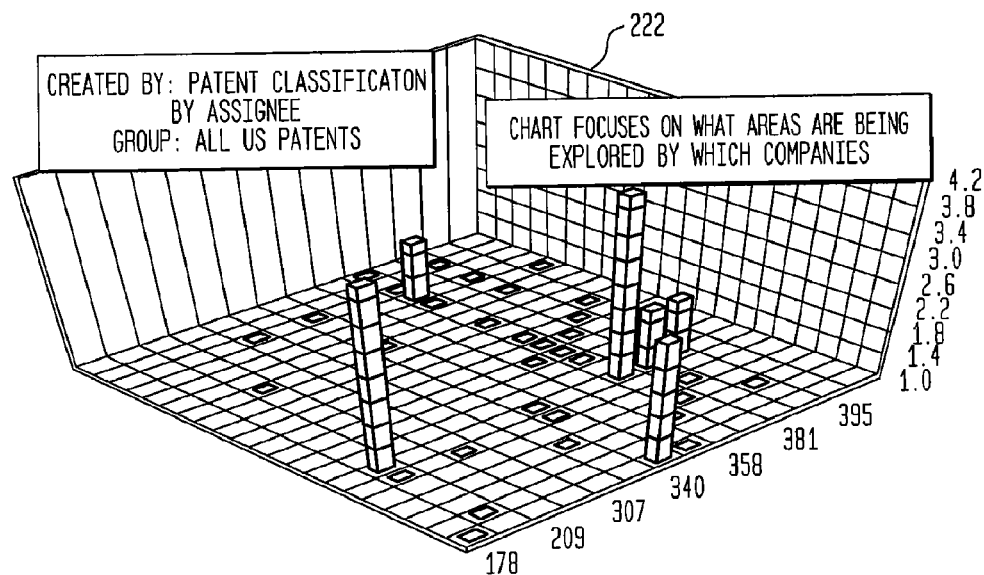
FIG. 43 illustrates the technology by company map facilitating the Idea Stage according to an embodiment of the present invention.

FIG. 43 illustrates the technology by company map 222 facilitating the Idea Stage as Tool 6, entitled "Chart Narrowing Areas to Explore." As stated above, in the Idea Stage, the idea is expanded and is prepared for consideration as a formal project/product.

In FIG. 43, technology by company map 222 as Tool 6 is shown. The purpose of Tool 6 in the Idea Stage is to provide the necessary information to the user (e.g., inventor of the idea) as to which competitors have put forth major effort in areas related to the idea. In addition, Tool 6 focuses on what areas are being explored by which companies. This provides more directed information because it visually displays patent counts of particular companies. How the IPAM server works in conjunction with the technology by company map 222 to aid in the R&D Idea Stage is described with reference to FIG. 44.

Figure 44:
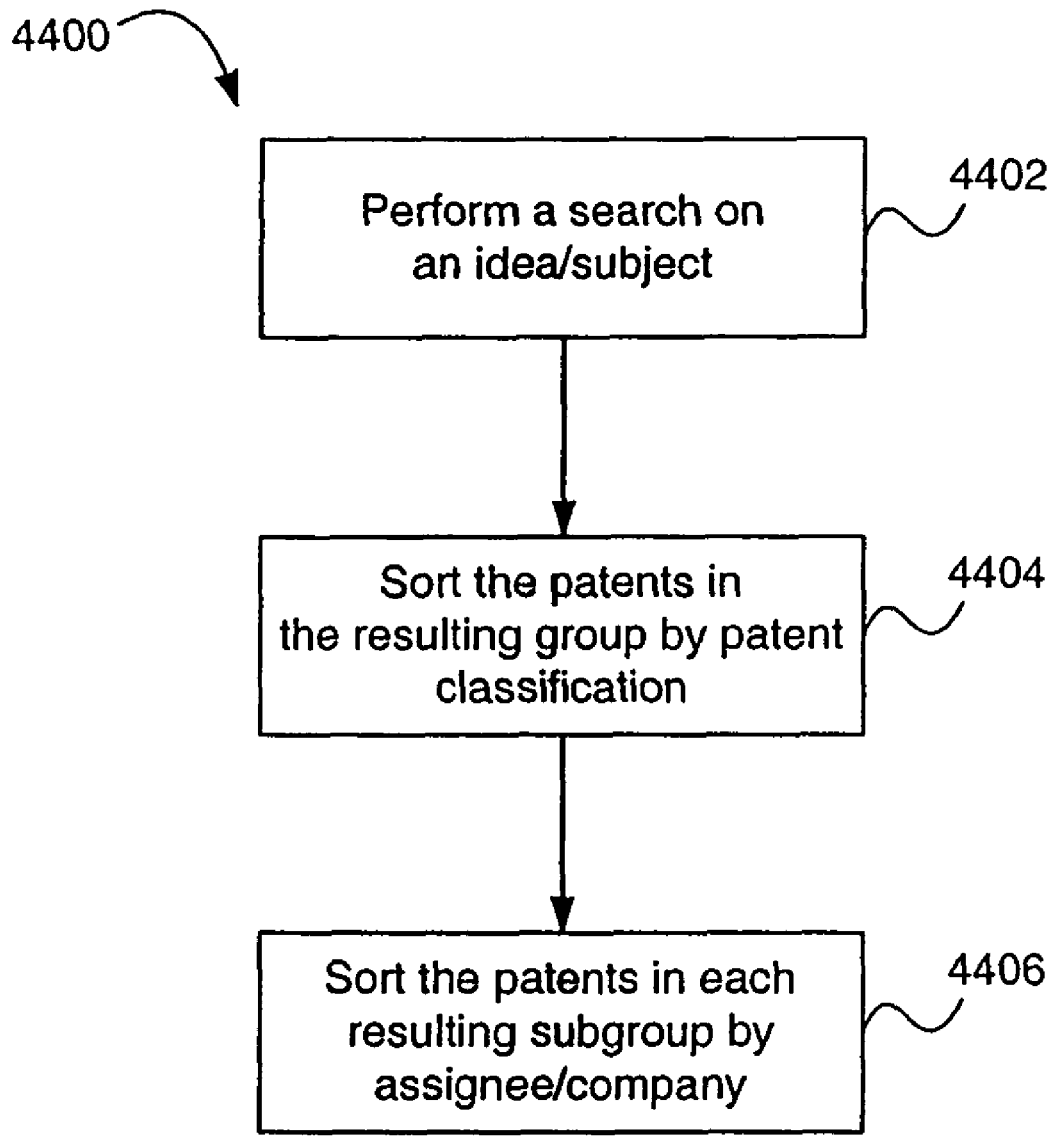
FIG. 44 is a flowchart illustrating how the IPAM server works in conjunction with the technology by company map to aid in the Idea Stage according to an embodiment of the present invention.

In FIG. 44, a flowchart 4400 begins at step 4402. In step 4402, in an embodiment of the present invention a user performs a search on the group of all U.S. patents. Here, because the user is just pointing at a broad field, the abstract of each U.S. patent is typically the section that is searched, but is not limited to this. The present invention is not limited to doing the search on U.S. patents, but may include European, Japanese (and other available) patents and/or applications. Here, the search performed is typically a boolean and/or natural language search on the idea/subject to produce a group of patents. Control passes to step 4404.

In step 4404, IPAM server takes the group of patents produced in step 4402 and further divides it into subgroups, with each subgroup having the same patent classification. When the search in step 4402 is on the group of U.S. patents, the classification used is the U.S. Patent Classification designated by the U.S. Patent and Trademark Office. In a similar manner, if the search in step 4402 is on the group of International patents, then the classification used would be the IPC classification. IPAM server may store the U.S. Patent Classification (or IPC classification) in a meta-data field that will also need to be searched to determine the patent classification, but is not limited to this. Control then passes to step 4406.

In step 4406, each subgroup produced in step 4404 is further divided by assignee/company. Thus, IPAM server is used in conjunction with a technology by company map 222 to create a graphical representation of company and technical area by frequency. Typically, this is done by the user selecting a technology by company function on the computer screen. The flowchart 4400 ends at this point.

Referring again to FIG. 43, the chart produced by Tool 6 tells the user several things. First, it shows that companies like AT&T Bell Laboratories and International Business Machines Corporation are active in the area of the idea but have a broader set of activity (as represented by several patents in several different patent classifications). Companies, like Westinghouse Electric Corporation, appear to be targeting specific areas (as represented by many patents in one patent classification).

B. Preliminary Assessment Stage

Figure 45:
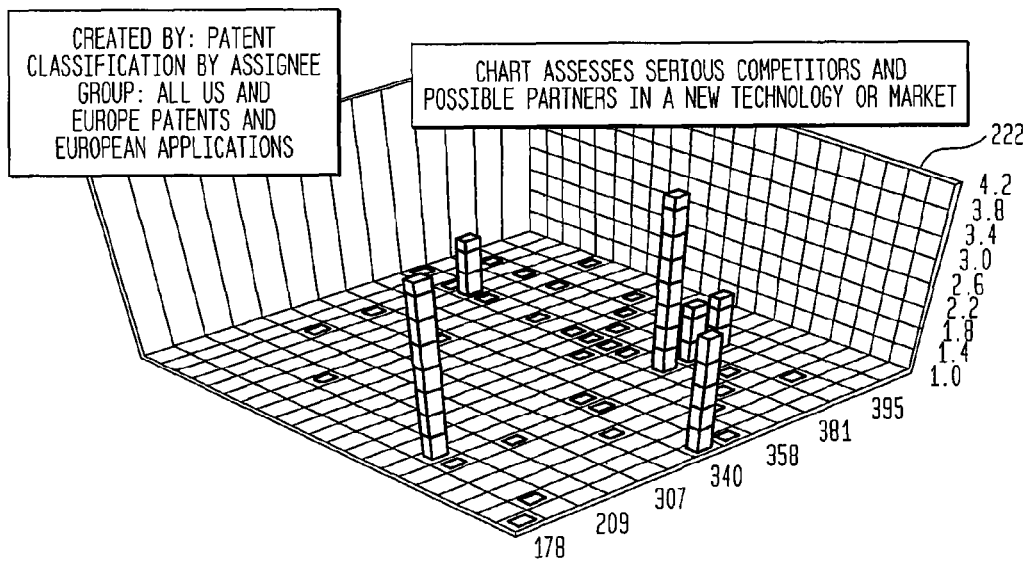
FIG. 45 illustrates the technology by company map facilitating the Preliminary Assessment Stage according to an embodiment of the present invention.

FIG. 45 illustrates the technology by company map 222 facilitating the Preliminary Assessment Stage as Tool 17, entitled "A Chart of Other Company's Work Related to the Project Goal." The purpose of Tool 17 in the Preliminary Assessment Stage is to provide the necessary information to the user as to which areas and what companies to track during the project. In addition, Tool 17 assesses serious competitors and possible partners in a new technology or market. How the IPAM server works in conjunction with the technology by company map 222 to aid in the R&D Preliminary Assessment Stage is similar to how it works in the Idea Stage as described with reference to FIG. 44. One exception is in step 4402. In the Idea Stage, only U.S. patents were searched in step 4402. In the Preliminary Assessment Stage all U.S. patents, European patents and European applications (and other available patents and/or applications) are searched, but is not limited to this.

C. Feasibility Stage

Figure 46:
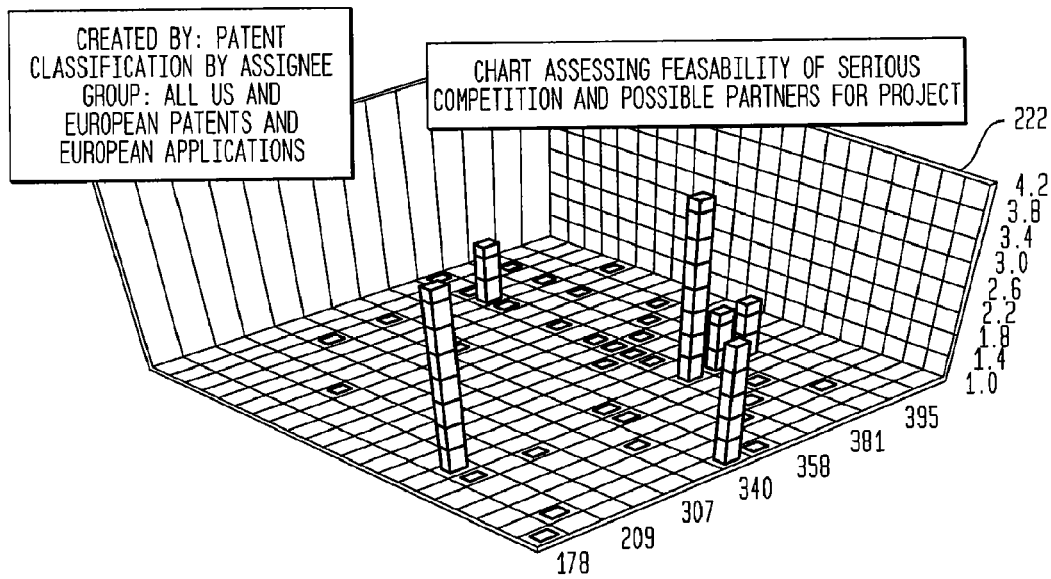
FIG. 46 illustrates the technology by company map facilitating the Feasibility Stage according to an embodiment of the present invention.

FIG. 46 illustrates the technology by company map 222 facilitating the Feasibility Stage as Tool 28, entitled "A Chart Narrowing Areas to Explore." The purpose of Tool 28 in the Feasibility Stage is to provide the project team with the companies to approach and avoid for each technical area. In addition, Tool 28 assesses the feasibility of serious competition and possible partners for the project. How the IPAM server works in conjunction with the technology by company map 222 to aid in the R&D Feasibility Stage is similar to how it works in the Idea Stage as described with reference to FIG. 44. One exception is in step 4402. In the Idea Stage, only U.S. patents were searched in step 4402. In the Feasibility Stage all U.S. patents, European, Japanese, and any other, patents and applications are searched, but is not limited to this.

D. Development Stage

Figure 47:
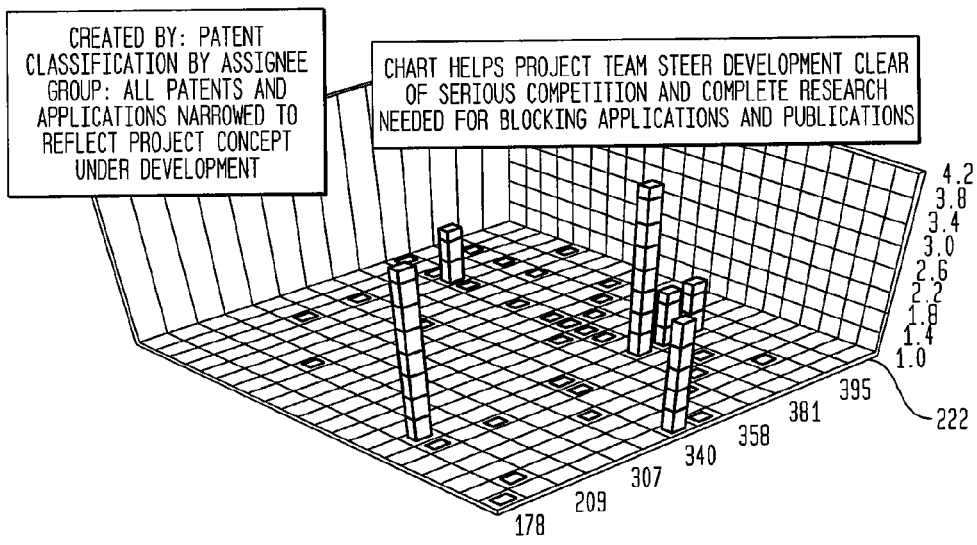
FIG. 47 illustrates the technology by company map facilitating the Development Stage according to an embodiment of the present invention.

FIG. 47 illustrates the technology by company map 222 facilitating the Development Stage as Tool 39, entitled "A Chart Showing Areas to Lock-Up or Lock-Out." The purpose of Tool 39 in the Development Stage is to determine whether the project has appropriate intellectual property to protect sales margin. In addition, Tool 39 helps the project team steer the development of the product clear of serious competition and complete research needed for blocking applications and publications. How the IPAM server works in conjunction with the technology by company map 222 to aid in the R&D Development Stage is similar to how it works in the Idea Stage as described with reference to FIG. 44. One exception is in step 4402. In the Idea Stage, only U.S. patents were searched in step 4402. In the Development Stage all U.S., European, Japanese, and any other, patents and applications searched are narrowed to reflect the project concept under development, but is not limited to this.

E. Scale-up Stage

Figure 48:
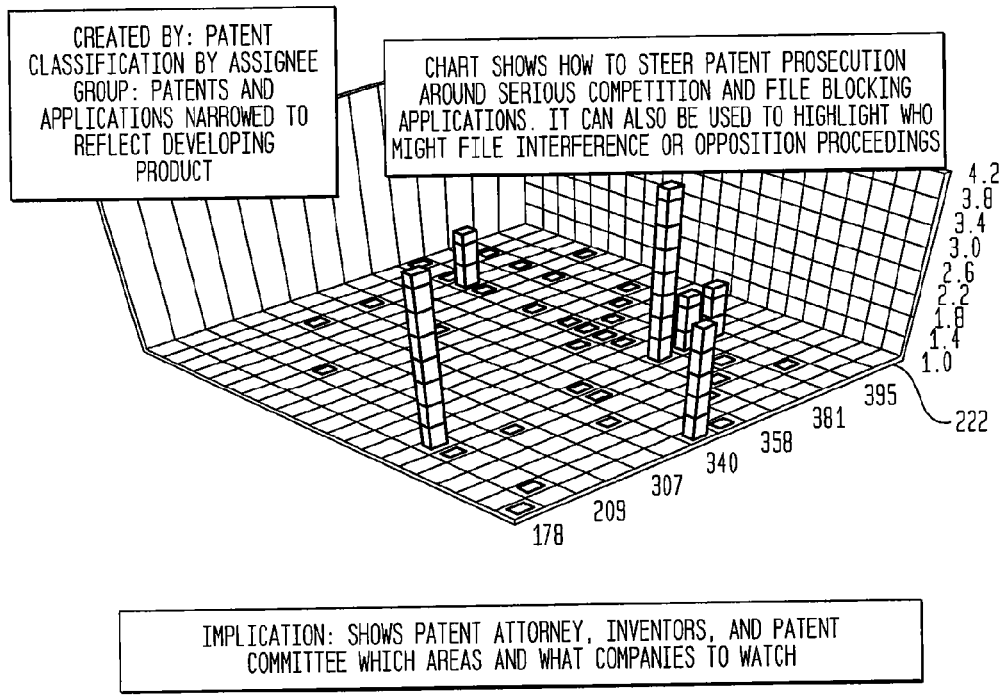
FIG. 48 illustrates the technology by company map facilitating the Scale-up Stage according to an embodiment of the present invention.

FIG. 48 illustrates the technology by company map 222 facilitating the Scale-up Stage as Tool 47, entitled "A Chart Narrowing Areas to Explore." The purpose of Tool 47 in the Scale-up Stage is to show patent attorneys, inventors, and patent committees which areas and what companies to watch. In addition, Tool 47 shows how to steer patent prosecution around serious competition and file blocking applications. Tool 47 can also be used to highlight who might file interference or opposition proceedings on any patent application filed. How the IPAM server works in conjunction with the technology by company map 222 to aid in the R&D Scale-up Stage is similar to how it works in the Idea Stage as described with reference to FIG. 44. One exception is in step 4402. In the Idea Stage, only U.S. patents were searched in step 4402. In the Scale-up Stage all U.S., European, Japanese, and other available, patents and applications searched are narrowed to reflect the developing product, but is not limited to this.

XII. IPAM Server and Patent Citation Tree

Referring to FIG. 2, IPAM server works in conjunction with the patent citation tree 224 to facilitate the Idea Stage (as Tool 7), the Preliminary Assessment Stage (as Tool 18), the Feasibility Stage (as Tool 29) and the Development Stage (as Tool 40). Citation trees are described in detail in the patent and applications referenced above in the section entitled "Cross-Reference to Other Patents and Applications." In general, during an R & D project, the user can look at the patent citation tree 224 to decide how crowded the area is and how quickly it is moving (note that the icons can display dates relevant to the patents in the tree). The invention automatically displays contour maps that connect patents having the same dates, assignees, classifications, etc., upon user command. In the map, the greatest gradient is the highest change and so you can use that as a way to plot the velocity in different directions. Thus, the contour lines can show the time line for the subject areas, and how fast they are developing.

A. Idea Stage

Figure 49:
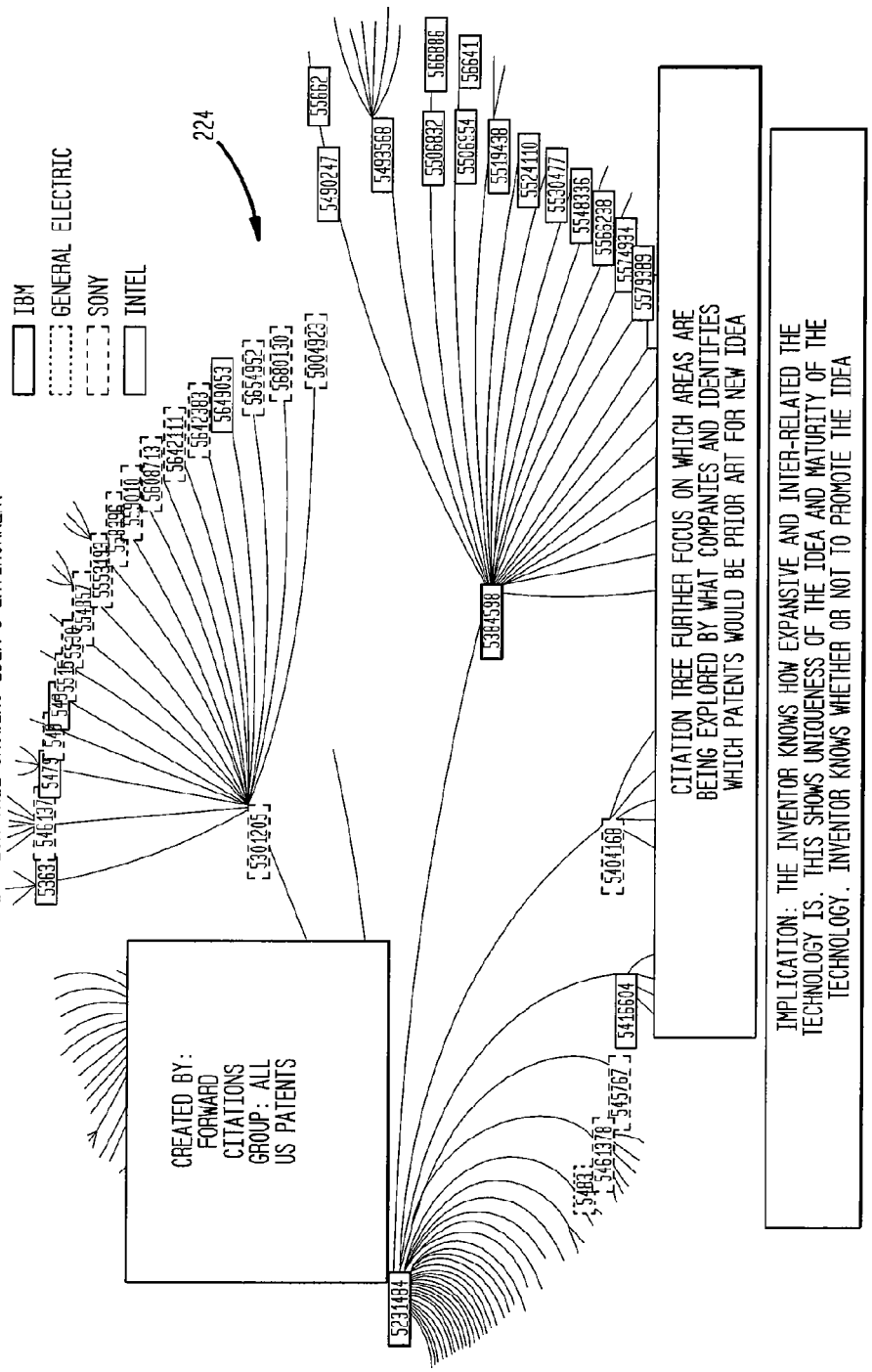
FIG. 49 illustrates the patent citation tree facilitating the Idea Stage according to an embodiment of the present invention.

FIG. 49 illustrates the patent citation tree 224, used in the Idea Stage, as Tool 7, entitled "A Citation Tree Showing Idea's Environment." The purpose of Tool 7 in the Idea Stage is to provide information to the user (inventor) as to how expansive and inter-related the technology is. This shows uniqueness of the idea and maturity of the technology. In addition, the user will be able to tell whether or not to promote the idea. Further, the patent citation tree 224 focuses on which areas are being explored by what companies and identifies which patents would be prior art for the new idea. How the IPAM server works in conjunction with the patent citation tree 224 to aid in the R&D Idea Stage is described with reference to FIG. 50.

Figure 50:
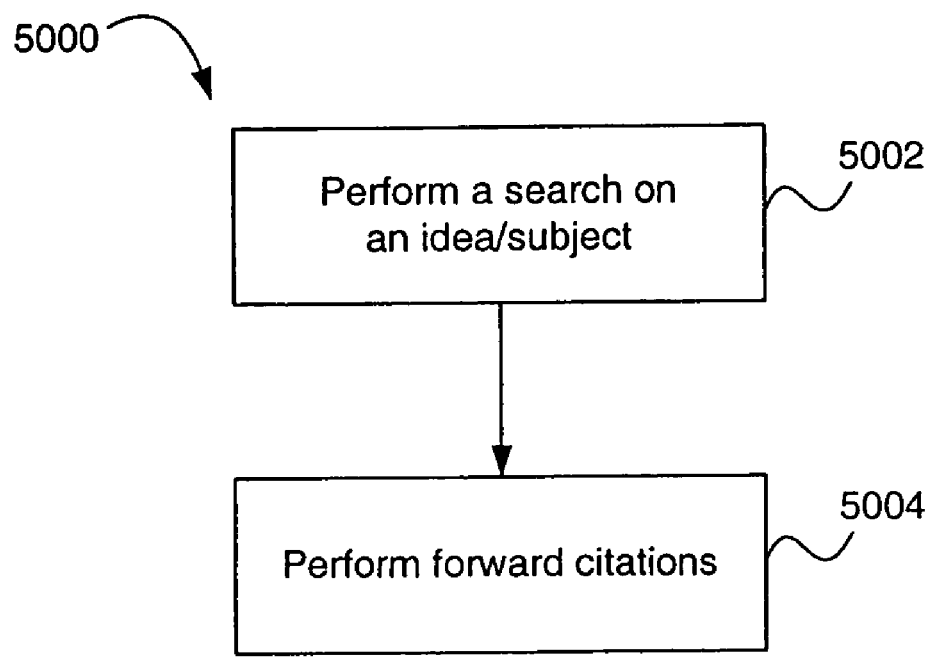
FIG. 50 is a flowchart illustrating how the IPAM server works in conjunction with the patent citation tree to aid in the Idea Stage according to an embodiment of the present invention.

In FIG. 50, a flowchart 5000 begins at step 5002. In step 5002, in an embodiment of the present invention a user performs a search on the group of all U.S. patents. Here, because the user is just pointing at a broad field, the abstract of each U.S. patent is typically the section that is searched, but is not limited to this. The present invention is not limited to doing the search on U.S. patents, but may include European, Japanese (and other available) patents and/or applications. Here, the search performed is typically a boolean and/or natural language search on the idea/subject to produce a group of patents. Control passes to step 5004.

In step 5004, IPAM server takes the group of patents produced in step 5002 and further performs a forward citation on each of the patents to create a patent citation tree 224. Forward citations are described in detail in the patent and applications referenced above in the section entitled "Cross-Reference to Other Patents and Applications." The nodes in the patent citation tree 224 may be color coded by assignee to allow the user to pick out color patterns easily. The flowchart 5000 ends at this point.

B. Preliminary Assessment Stage

Figure 51:
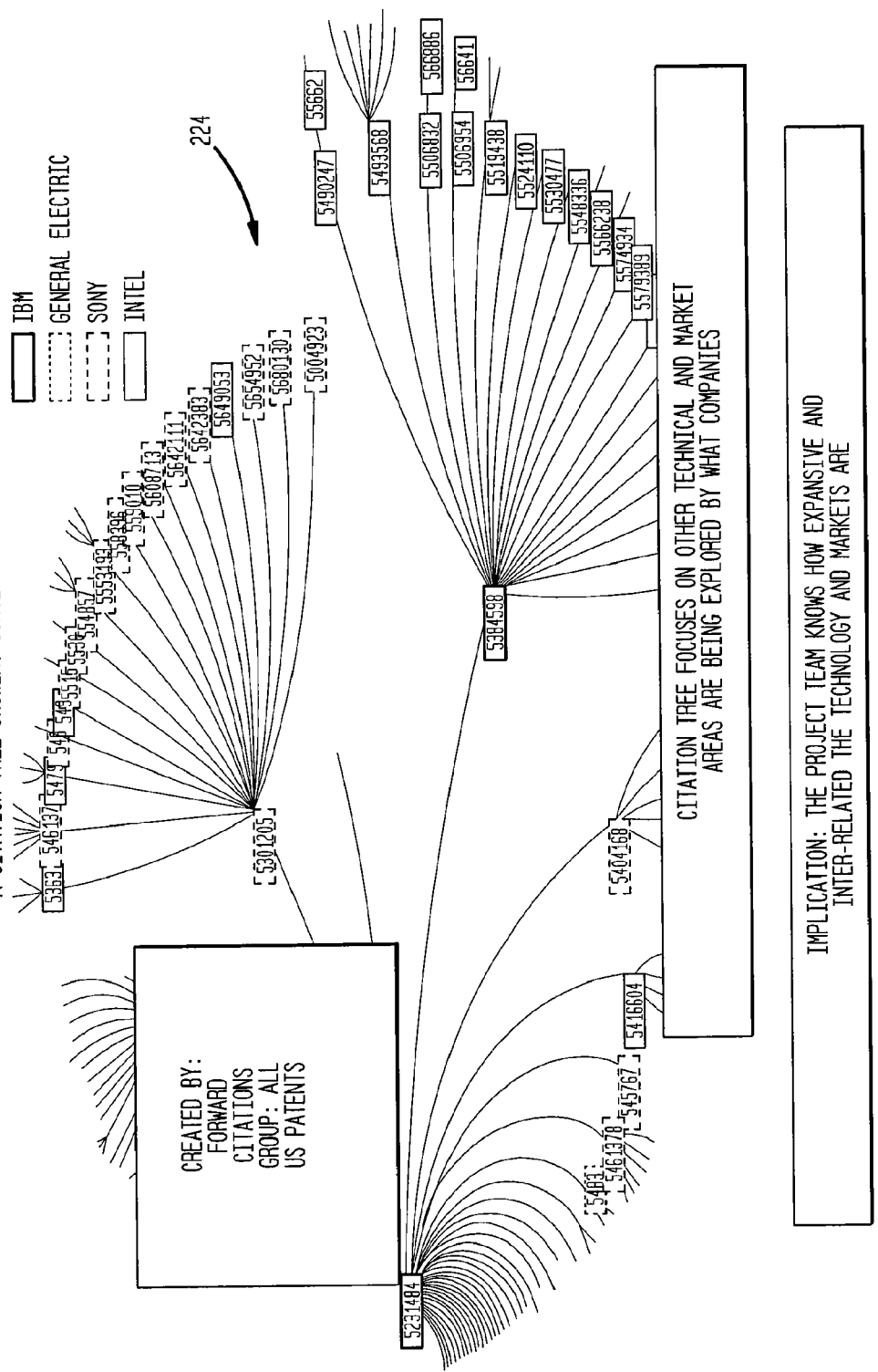
FIG. 51 illustrates the patent citation tree facilitating the Preliminary Assessment Stage according to an embodiment of the present invention.

FIG. 51 illustrates the patent citation tree 224, used in the Preliminary Assessment Stage, as Tool 18, entitled "A Citation Tree Showing Concept's History." The purpose of Tool 18 in the Preliminary Assessment Stage is to provide information to the project team on how expansive and inter-related the technology and markets are. In addition, the user will be able to tell whether or not to promote the idea. Further, the patent citation tree 224 focuses on other technical and market areas that are being explored, and by which companies. The nodes in the patent citation tree 224 may be color coded by assignee to allow the user to pick out color patterns easily. How the IPAM server works in conjunction with the patent citation tree 224 to aid in the R&D Preliminary Assessment Stage is similar to how it is done in the Idea Stage as described with reference to FIG. 50.

C. Feasibility Stage

Figure 52:
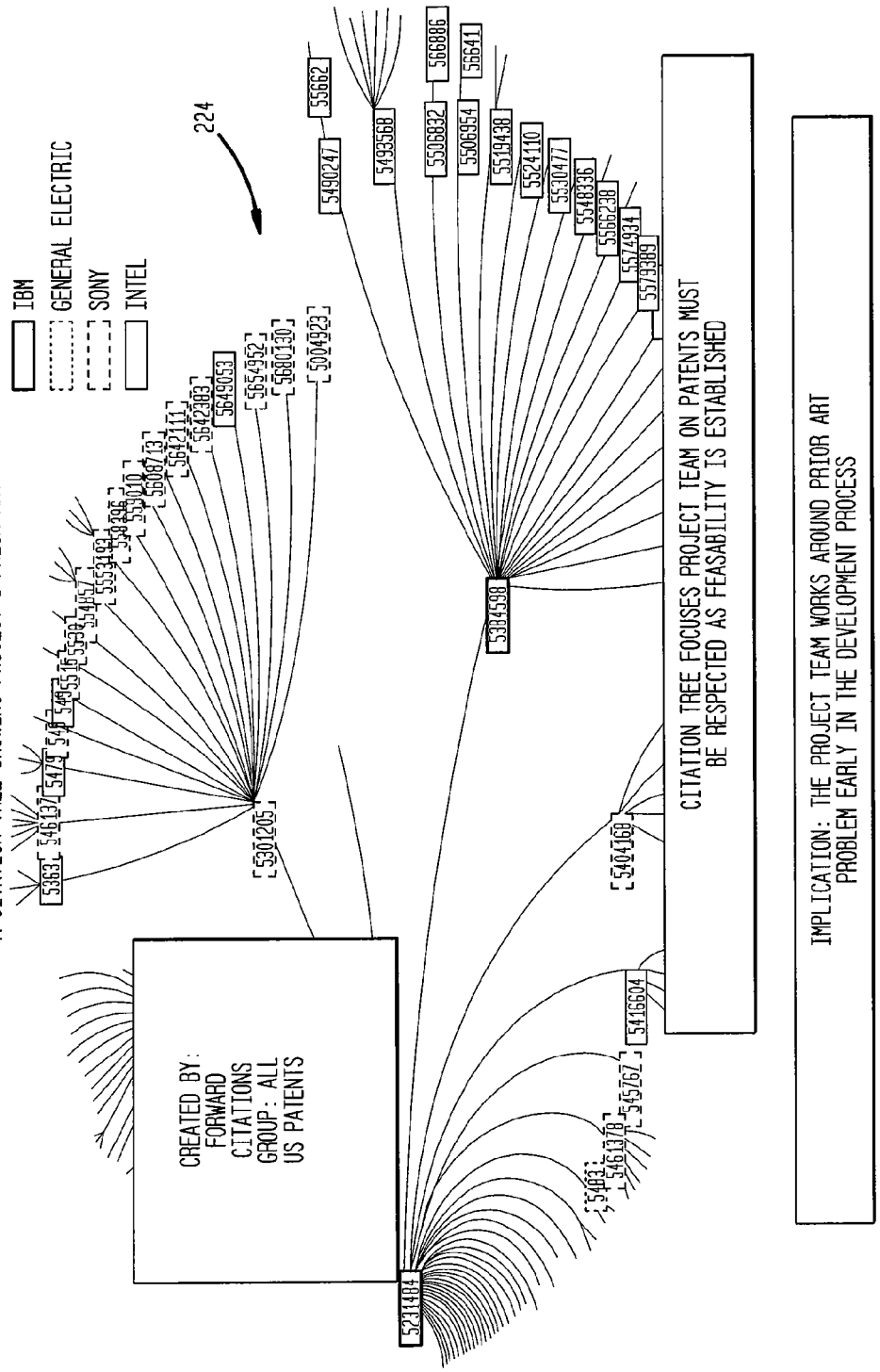
FIG. 52 illustrates the patent citation tree facilitating the Feasibility Stage according to an embodiment of the present invention.

FIG. 52 illustrates the patent citation tree 224, used in the Feasibility Stage, as Tool 29, entitled "A Citation Tree Showing Project's Prior Art." The purpose of Tool 29 in the Feasibility Stage is to provide information to the project team on how to work around prior art problems early in the development process. Further, the patent citation tree 224 focuses the project team on patents that must be respected as feasibility of the project is established. The nodes in the patent citation tree 224 may be color coded by assignee and/or by freedom to practice to allow the user to pick out color patterns easily. How the IPAM server works in conjunction with the patent citation tree 224 to aid in the R&D Feasibility Stage is similar to how it is done in the Idea Stage as described with reference to FIG. 50.

D. Development Stage

FIG. 53 illustrates the patent citation tree 224, used in the Development Stage, as Tool 40, entitled "A Citation Tree Showing Project's IP Position." The purpose of Tool 40 in the Development Stage is to provide information to the project team on what key prior art to acquire during the development phase for freedom to practice and to block competition. Further, the patent citation tree 224 focuses the project team on patents that must which could be key to blocking competitive approaches. The nodes in the patent citation tree 224 may be color coded by assignee and/or by freedom to practice to allow the user to pick out color patterns easily. How the IPAM server works in conjunction with the patent citation tree 224 to aid in the R&D Feasibility Stage is similar to how it is done in the Idea Stage as described with reference to FIG. 50.

XII. IPAM Server and Nested Patent Citation Tree

Referring to FIG. 2, IPAM server works in conjunction with the nested patent citation tree 226 to facilitate the Idea Stage (as Tool 8), the Preliminary Assessment Stage (as Tool 19), the Feasibility Stage (as Tool 30), the Development Stage (as Tool 41), and the Scale-up Stage (as Tool 48). Nested patent citation trees are described in detail in the patent and applications referenced above in the section entitled "Cross-Reference to Other Patents and Applications." In general, during an R & D project, the user can look at the nested patent citation tree 226 to promote his idea as distinct from other on-going work. Patents lag the technology due to the inherent delays in patent prosecution. Thus, if the user finds a very recent patent, it may not have any forward citations since any patents that might cite it are months or years away from issuing. Thus, it would not be possible to see how the technology is developing relative to this patent since it has no forward citations.

This tool utilizes a technique that involves going back one or more generations from a given patent, and then performing forward citations on the prior generations. This identifies a patent family that is a result of a unique combination of backwards and forwards citation processing. The resulting tree tells you who's playing and in what fields that's probably around the base patent. It's an approach to look into the future of a given technology (how the technology may develop in the future). Date contours (or contours according to some other criteria) is also applicable with this tool (and with all hyperbolic trees generated by the invention).

A. Idea Stage

Figure 54:
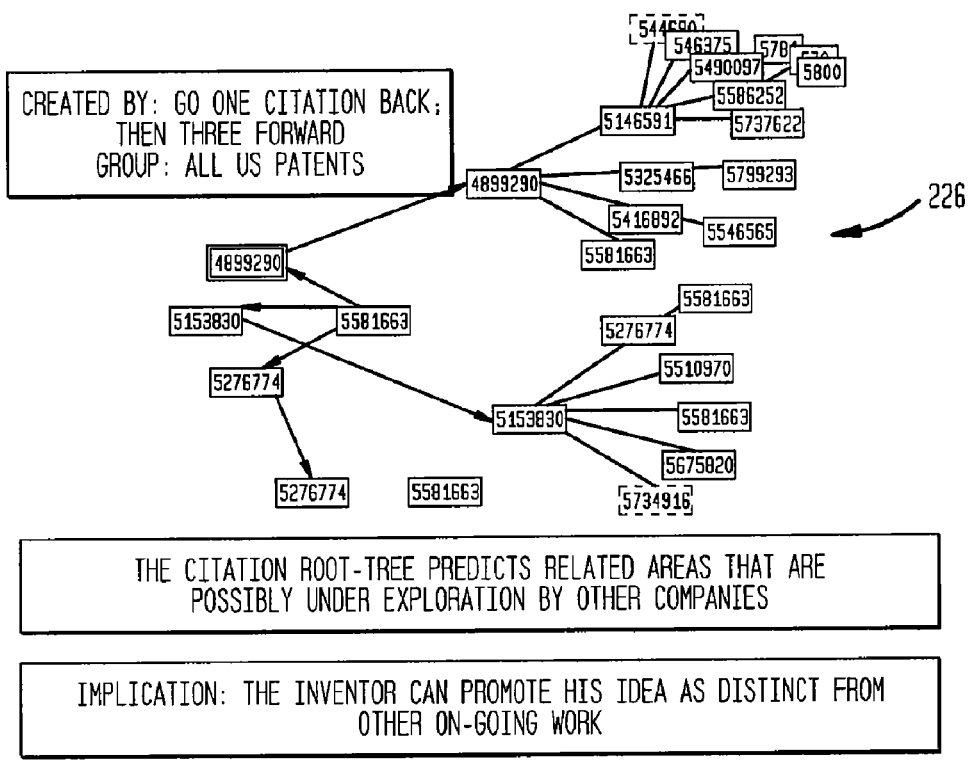
FIG. 54 illustrates the nested patent citation tree facilitating the Idea Stage according to an embodiment of the present invention.

FIG. 54 illustrates the nested patent citation tree 226, used in the Idea Stage, as Tool 8, entitled "A Citation Root-Tree Showing Idea's Environment." The purpose of Tool 8 in the Idea Stage is to provide information to the user (inventor) so as to allow the user to promote his idea as distinct from other on going work. The nested patent citation tree 226 predicts related areas that are possibly under exploration by other companies. How the IPAM server works in conjunction with the nested patent citation tree 226 to aid in the R&D Idea Stage is described with reference to FIG. 55.

Figure 55:
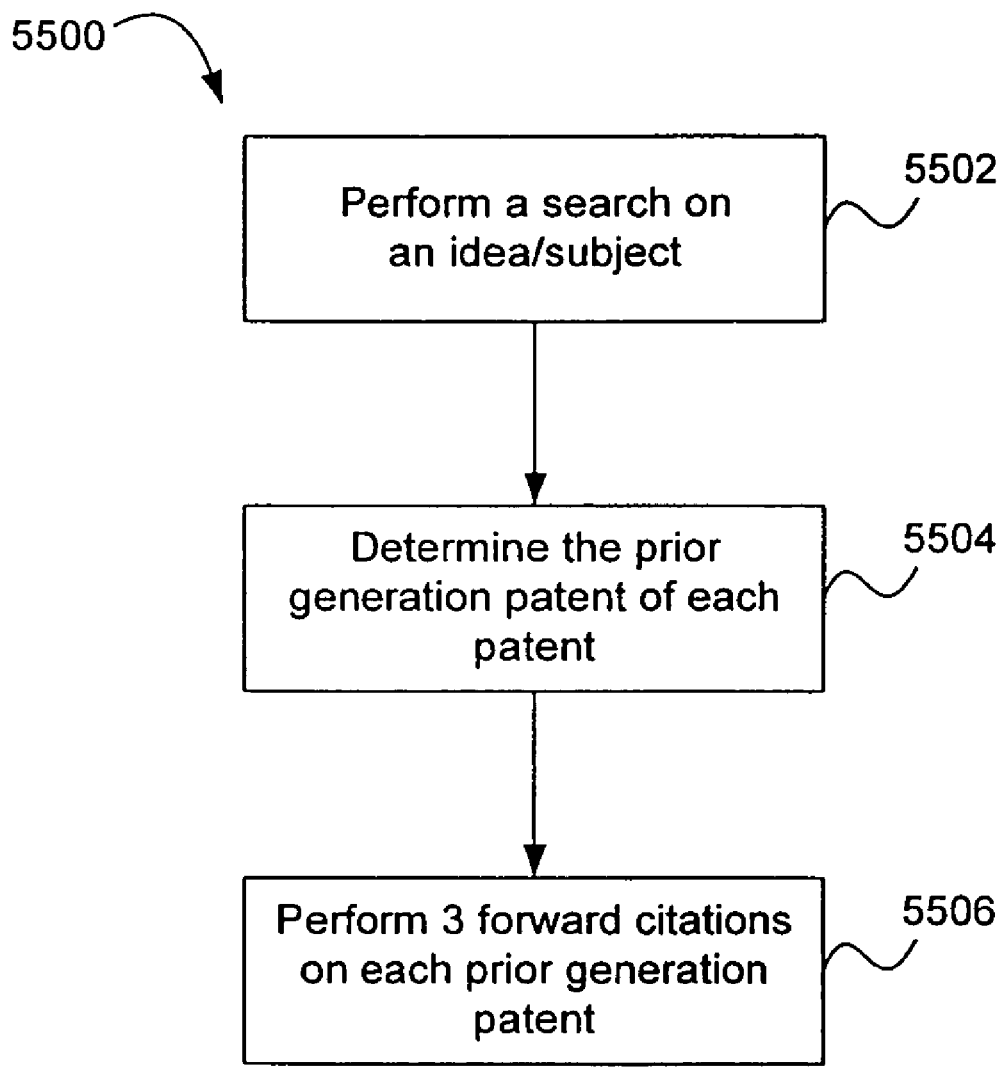
FIG. 55 is a flowchart illustrating how the IPAM server works in conjunction with the nested patent citation tree to aid in the Idea Stage according to an embodiment of the present invention.

In FIG. 55, a flowchart 5500 begins at step 5502. In step 5502, in an embodiment of the present invention a user performs a search on the group of all U.S. patents. The present invention is not limited to doing the search on U.S. patents, but may include European, Japanese (and other available) patents and/or applications. The search performed is typically a boolean and/or natural language search on the idea/subject to produce a group of patents. Control passes to step 5504.

In step 5504, the IPAM server determines the prior generation patent of each patent produced in step 5502 (e.g., goes back one citation for each patent). Control passes to step 5506.

In step 5506, IPAM server takes the group of patents produced in step 5002 and further performs three forward citations on each of the patents to create a nested patent citation tree 226. The nodes in the patent citation tree 224 may be color coded by assignee to allow the user to pick out color patterns easily. The flowchart 5500 ends at this point.

B. Preliminary Assessment Stage

Figure 56:
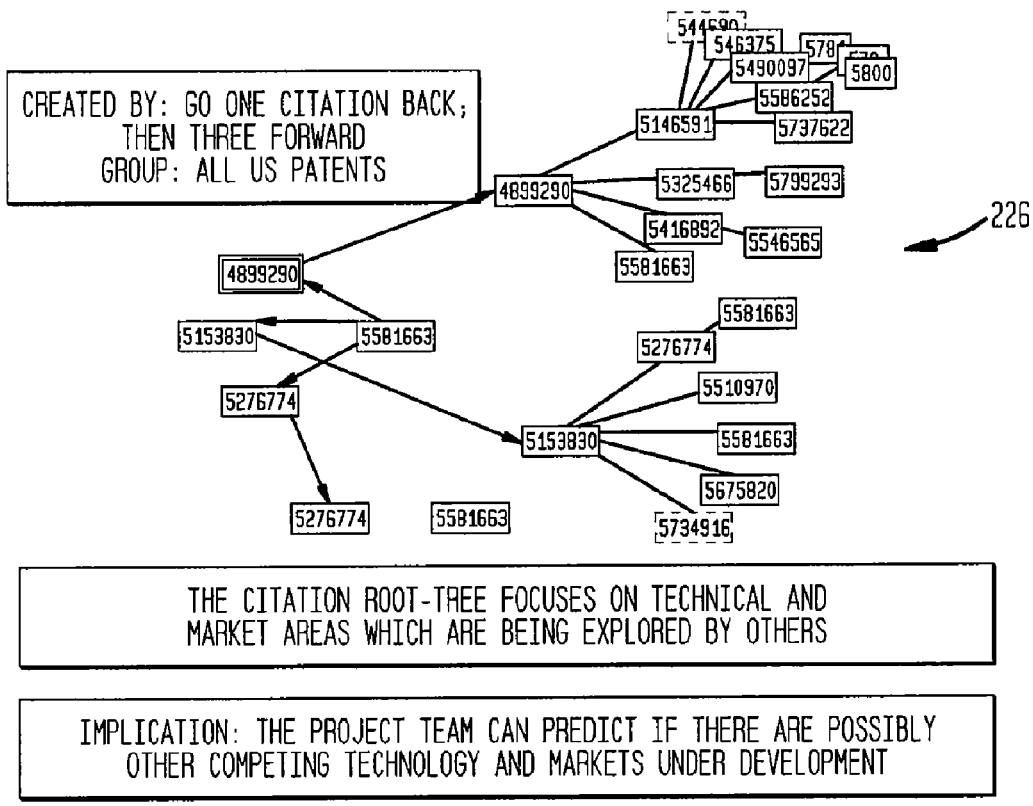
FIG. 56 illustrates the nested patent citation tree facilitating the Preliminary Assessment Stage according to an embodiment of the present invention.

FIG. 56 illustrates the nested patent citation tree 226, used in the Preliminary Assessment Stage, as Tool 19, entitled "A Citation Root-Tree Showing Concept's Environment." The purpose of Tool 19 in the Preliminary Assessment Stage is to provide information to the project team so it can predict if there are possibly other competing technologies and markets that are under development. Further, the nested patent citation tree 226 (i.e., citation root-tree) focuses on technical and market areas which are being explored by others. The nodes in the patent citation tree 224 may be color coded by assignee to allow the user to pick out color patterns easily. How the IPAM server works in conjunction with the nested patent citation tree 226 to aid in the R&D Preliminary Assessment Stage is similar to the Idea Stage as described with reference to FIG. 55.

C. Feasibility Stage

Figure 57:
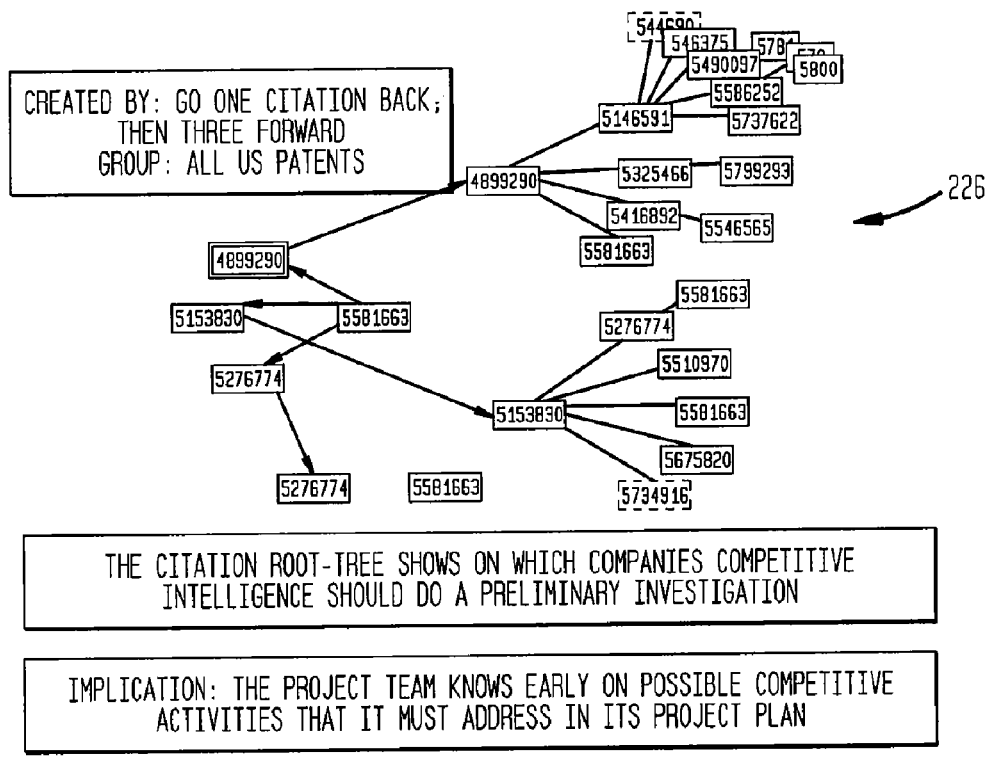
FIG. 57 illustrates the nested patent citation tree facilitating the Feasibility Stage according to an embodiment of the present invention.

FIG. 57 illustrates the nested patent citation tree 226, used in the Feasibility Stage, as Tool 30, entitled "A Citation Root-Tree Showing Competitive Environment." The purpose of Tool 30 in the Feasibility Stage is to provide information to the project team so it knows early on possible competitive activities that it must address in its project plan. The nested patent citation tree 226 (i.e., citation root-tree) indicates to the competitive intelligence group which companies a preliminary investigation should be conducted on. The nodes in the patent citation tree 224 may be color coded by assignee and/or by freedom to practice to allow the user to pick out color patterns easily. How the IPAM server works in conjunction with the nested patent citation tree 226 to aid in the R&D Feasibility Stage is similar to the Idea Stage as described with reference to FIG. 55.

D. Development Stage

Figure 58:
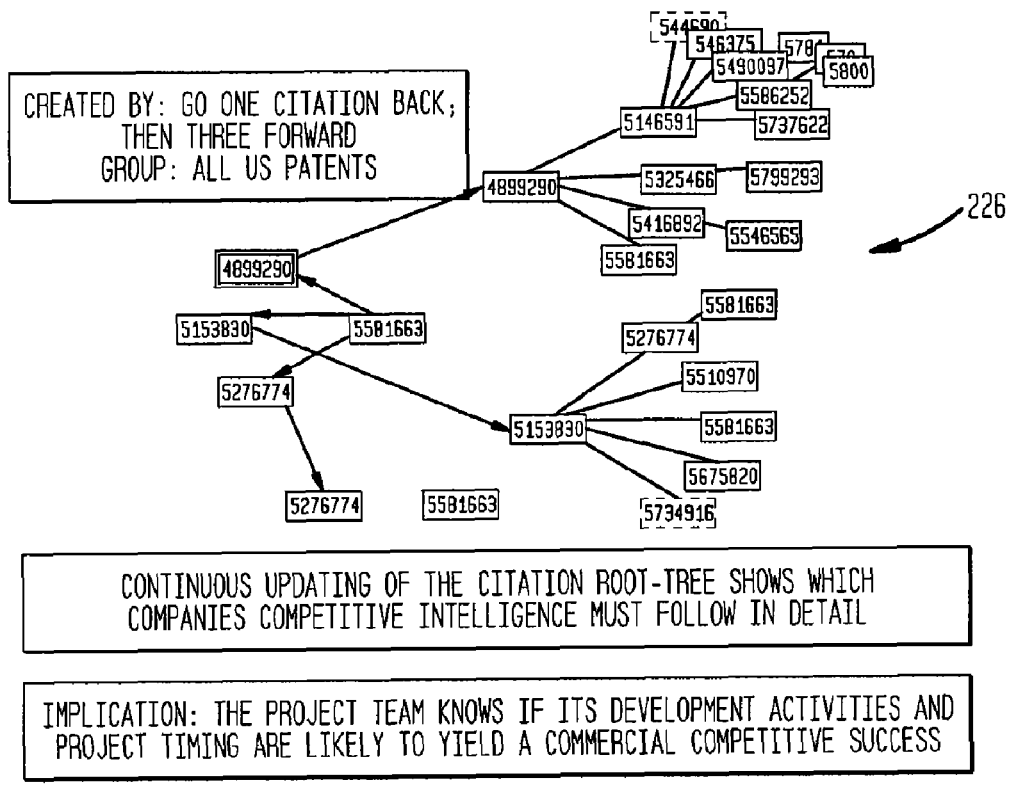
FIG. 58 illustrates the nested patent citation tree facilitating the Development Stage according to an embodiment of the present invention.

FIG. 58 illustrates the nested patent citation tree 226, used in the Development Stage, as Tool 41, entitled "A Citation Root-Tree Showing Project's IP Position." The purpose of Tool 41 in the Development Stage is to provide information to the project team so it knows whether its development and project timing are likely to yield a commercial competitive success. The continuous updating of the nested patent citation tree 226 (i.e., citation root-tree) shows which companies the competitive intelligence group must follow in detail. The nodes in the patent citation tree 224 may be color coded by assignee and/or by freedom to practice to allow the user to pick out color patterns easily. How the IPAM server works in conjunction with the nested patent citation tree 226 to aid in the R&D Development Stage is similar to the Idea Stage as described with reference to FIG. 55.

E. Scale-up Stage

Figure 59:
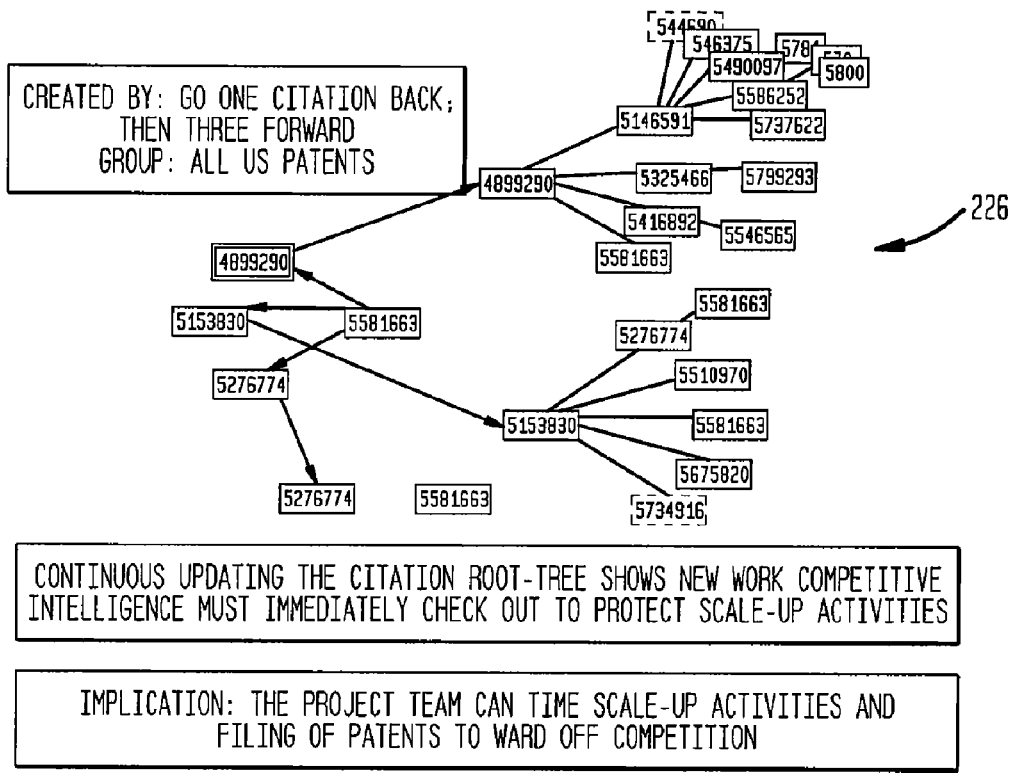
FIG. 59 illustrates the nested patent citation tree facilitating the Scale-up Stage according to an embodiment of the present invention.

FIG. 59 illustrates the nested patent citation tree 226, used in the Scale-up Stage, as Tool 48, entitled "A Citation Root-Tree To Time Project's IP Filings." The purpose of Tool 48 in the Scale-up Stage is to provide information to the project team so it can time scale-up activities and filing of patents to ward off competition. The continuous updating of the nested patent citation tree 226 (i.e., citation root-tree) shows new work the competitive intelligence group must immediately check out to protect scale-up activities. The nodes in the patent citation tree 224 may be color coded by assignee and/or by freedom to practice to allow the user to pick out color patterns easily. How the IPAM server works in conjunction with the nested patent citation tree 226 to aid in the R&D Scale-up Stage is similar to the Idea Stage as described with reference to FIG. 55.

XIV. IPAM Server and Product/Patent/Revenue Table

Figure 60:
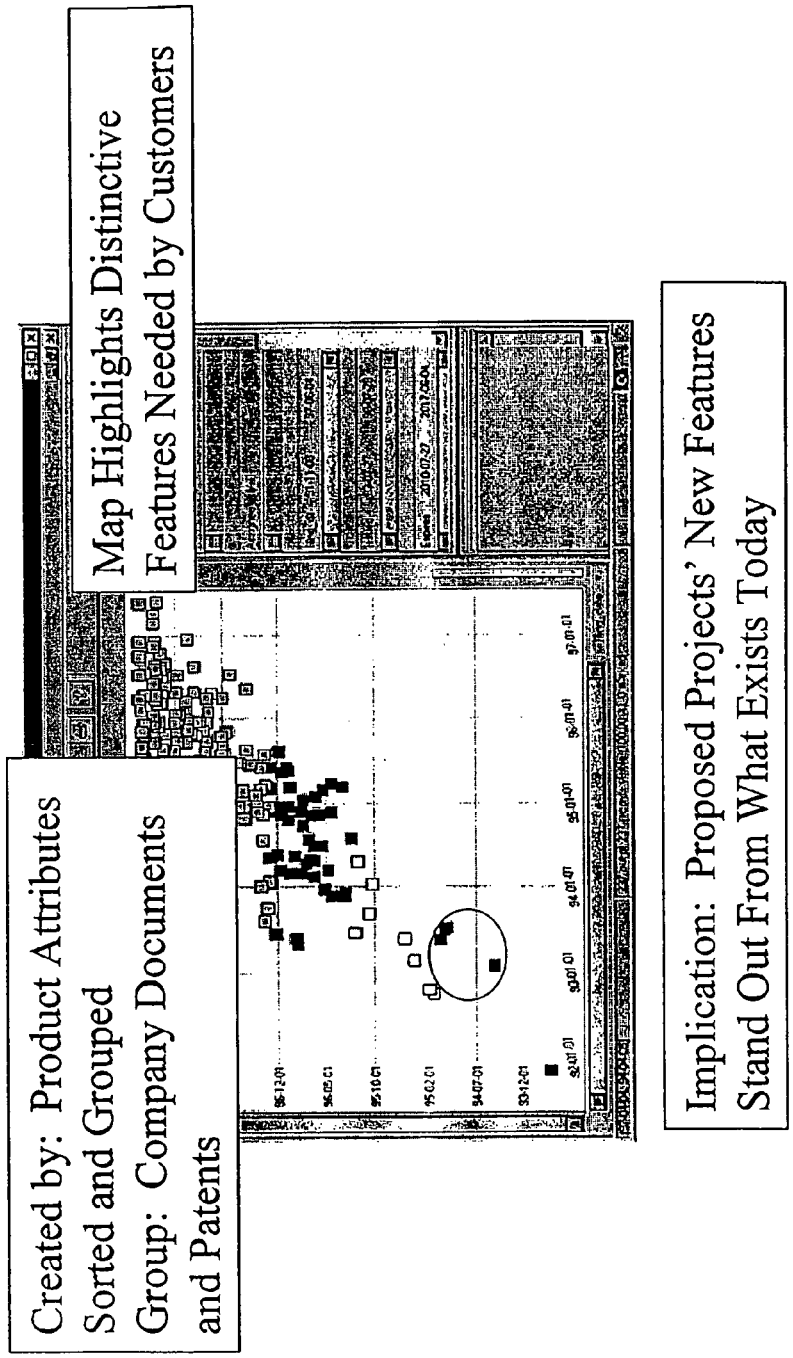
FIG. 60 illustrates the product/patent/revenue table facilitating the Portfolio Stage according to an embodiment of the present invention.

In FIG. 60, IPAM server works in conjunction with the product/patent/revenue table 228 to facilitate the Portfolio Stage (as Tool 52). FIG. 60 illustrates the product/patent/revenue table 228, used in the Portfolio Stage, as Tool 52, entitled "Proposed Features Map in the Context of all Possibilities." The purpose of Tool 52 is make the proposed projects' new features stand out from what exists today. Tool 52 highlights distinctive features needed by customers. How the IPAM server works in conjunction with the product/patent/revenue table 228 to aid in the Portfolio Stage is described with reference to FIG. 61.

Figure 61:
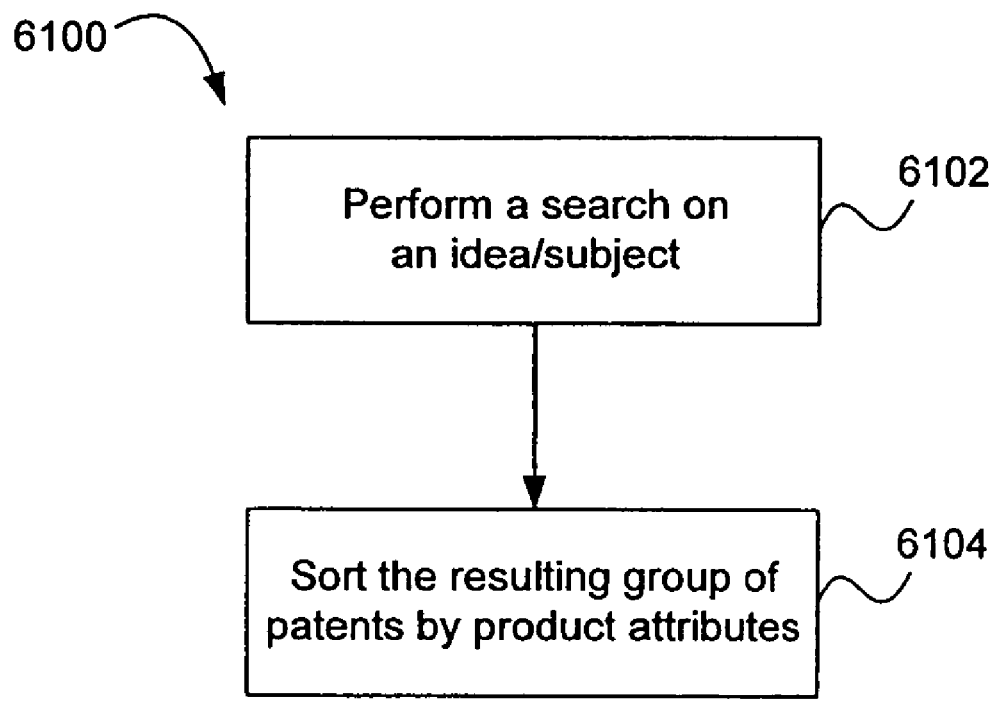
FIG. 61 is a flowchart illustrating how the IPAM server works in conjunction with the product/patent/revenue table to issue to aid in the Portfolio Stage according to an embodiment of the present invention.

In FIG. 61, a flowchart 6100 begins at step 6102. In step 6102, in an embodiment of the present invention a user performs a search on the group of company documents and patents, but is not limited to this. This typically involves a boolean and/or natural language search on the idea/subject to produce a group of documents and patents. Control passes to step 6104.

In step 6104, the IPAM server sorts the resulting group of documents and patents from step 6102 by product attributes. The flowchart 6100 ends.

XV. IPAM Server and Patent/Months to Issue Chart

Referring to FIG. 2, IPAM server works in conjunction with the patent/months to issue chart 230 to facilitate the Feasibility Stage (as Tool 31), the Development Stage (as Tool 42), the Scale-up Stage (as Tool 49) and the Portfolio Stage (as Tool 54). In general, during an R & D project, the user can look at the patent/months to issue chart 230 to determine the average time that competitor's patents are in prosecution. Patents lag the technology due to the inherent delays in patent prosecution. Delays in prosecution may be different for different technologies. Therefore, the user can also use the patent/months to issue chart 230 to get an idea on the prosecution time for different technologies. This also can help to predict the pace of certain technologies and what competitors are working on in their labs.

A. Feasibility Stage

Figure 62:
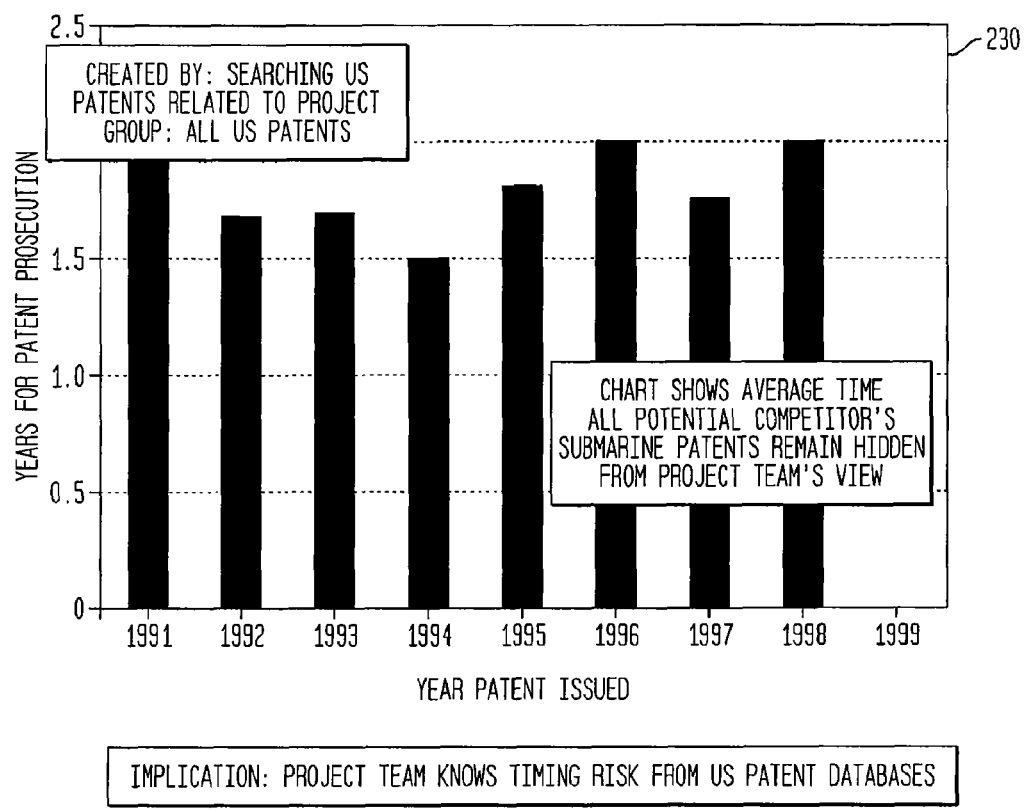
FIG. 62 illustrates the patent/months to issue facilitating the Feasibility Stage according to an embodiment of the present invention.

FIG. 62 illustrates the patent/months to issue chart 230, used in the Feasibility Stage, as Tool 31, entitled "Cycle Time for Patent Prosecution." The purpose of Tool 31 in the Feasibility Stage is to provide information to the project team so it knows the timing risks of the project based on the average prosecution time for U.S. patents related to a certain technology. The patent/months to issue chart 230 shows the average time all potential competitors' submarine patents remain hidden from the project team's view. How the IPAM server works in conjunction with the patent/months to issue chart 230 to aid in the R&D Feasibility Stage is described next with reference to FIG. 63.

Figure 63:
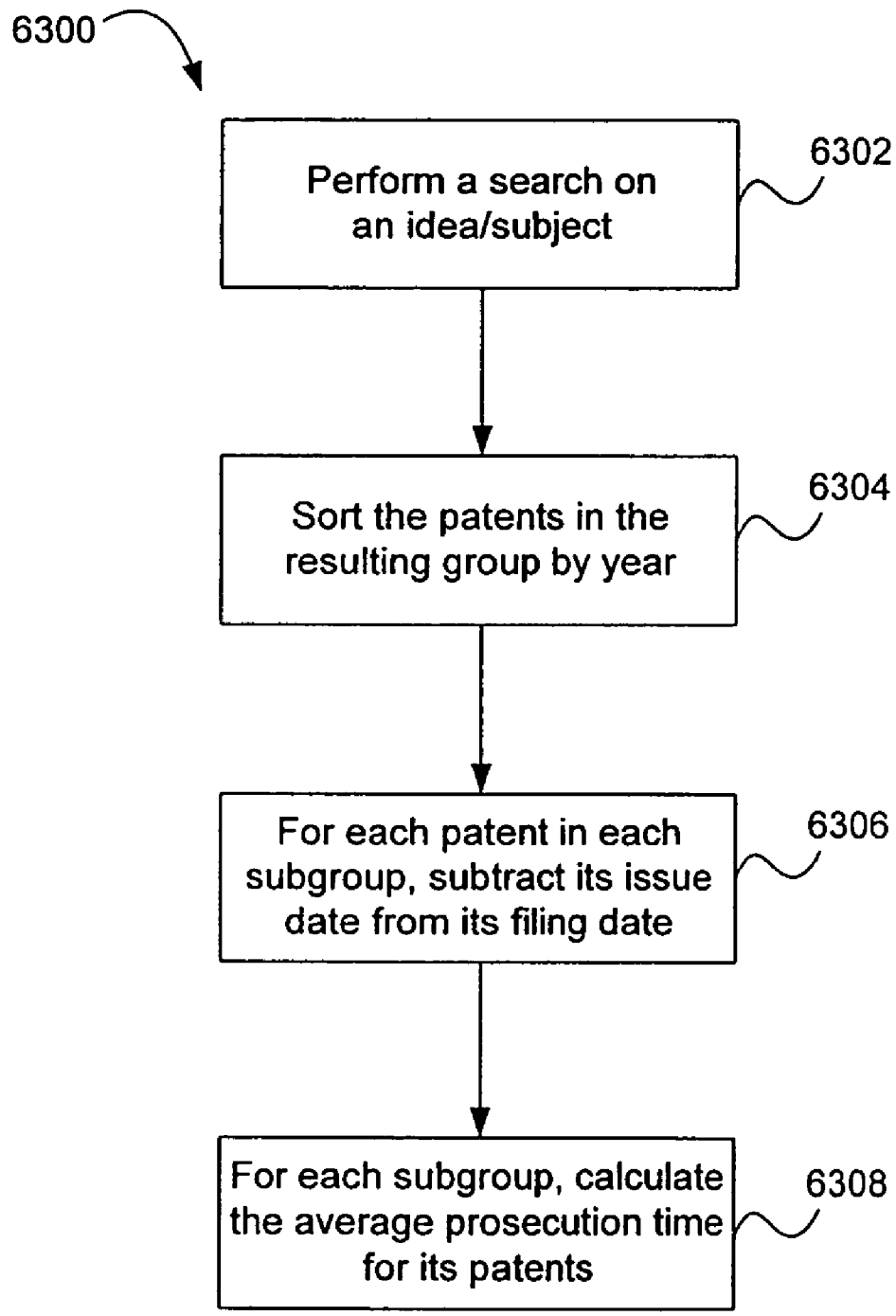
FIG. 63 is a flowchart illustrating how the IPAM server works in conjunction with the patent/months to issue to aid in the Feasibility Stage according to an embodiment of the present invention.

In FIG. 63, a flowchart 6300 begins at step 6302. In step 6302, in an embodiment of the present invention a user performs a search on the group of all U.S. patents. The present invention is not limited to doing the search on U.S. patents, but may include European, Japanese (and other available) patents and/or applications. The search performed is typically a boolean and/or natural language search on the idea/subject to produce a group of patents. Control passes to step 6304.

In step 6304, IPAM server sorts the patents in the resulting group from step 6302 by year to create subgroups of patents. Control passes to step 6306.

In step 6306, IPAM server, for each patent in each of the subgroups created in step 6304, subtracts the patent's issue date from its filing date. Control then passes to step 6308.

In step 6308, IPAM server calculates, for each subgroup of patents, the average prosecution time for its patents and displays the results to the user. Flowchart 6300 ends at this point.

B. Development Stage

Figure 64:
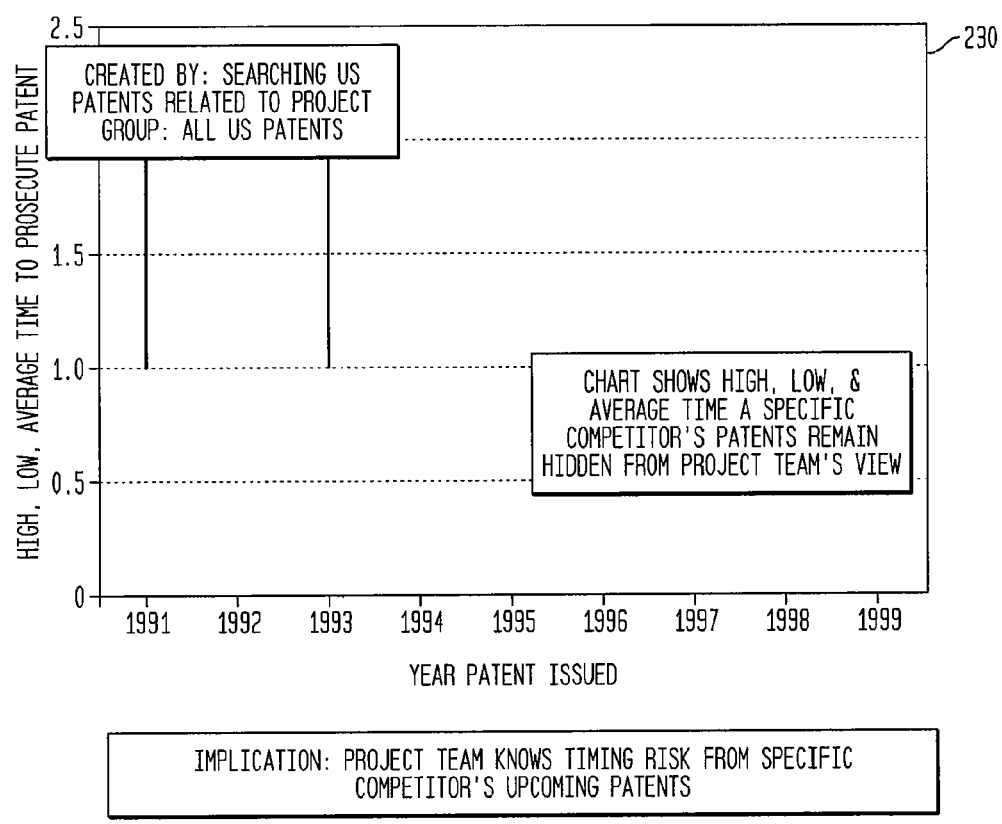
FIG. 64 illustrates the patent/months to issue facilitating the Development Stage according to an embodiment of the present invention.

FIG. 64 illustrates the patent/months to issue chart 230, used in the Development Stage, as Tool 42, entitled "Cycle Time for Patent Prosecution." The purpose of Tool 42 in the Development Stage is to provide information to the project team so it knows the timing risks of the project based on competitors' upcoming patents. The patent/months to issue chart 230 also shows the high, low, and average time a specific competitor's patents remain hidden from the project team's view. How the IPAM server works in conjunction with the patent/months to issue chart 230 to aid in the R&D Development Stage is similar to the Feasibility Stage, as described above with reference to FIG. 63.

C. Scale-up Stage

Figure 65:
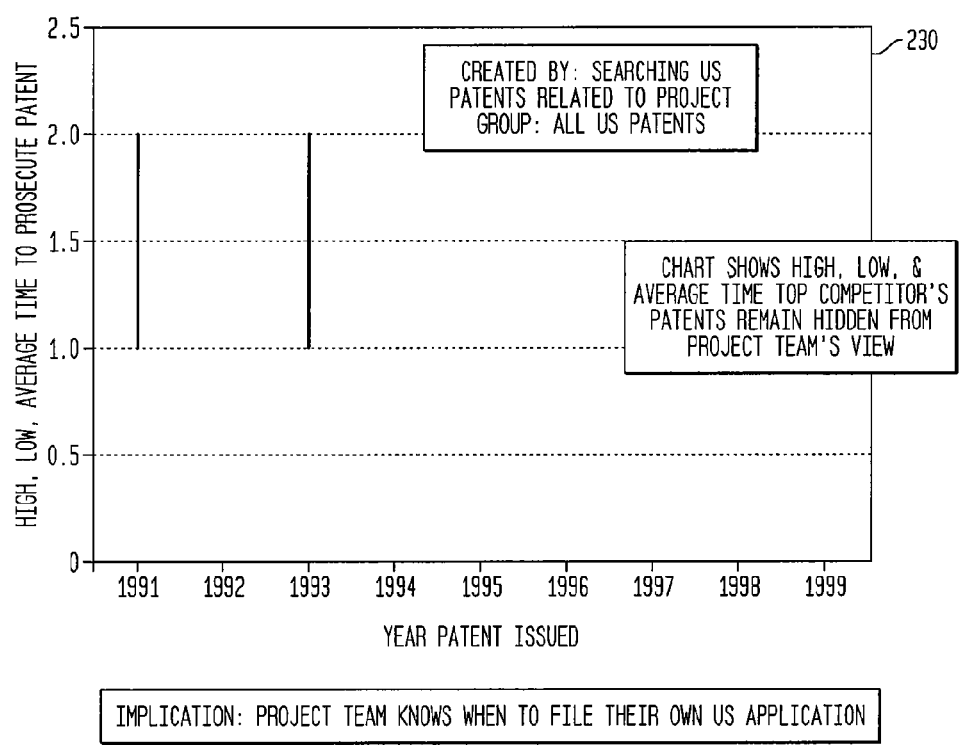
FIG. 65 illustrates the patent/months to issue facilitating the Scale-up Stage according to an embodiment of the present invention.

FIG. 65 illustrates the patent/months to issue chart 230, used in the Scale-up Stage, as Tool 42, entitled "Cycle Time for Patent Prosecution." The purpose of Tool 49 in the Scale-up Stage is to provide information to the project team so it knows when to file its own U.S. patent applications. The patent/months to issue chart 230 also shows the high, low, and average time top competitor's patents remain hidden from the project team's view. How the IPAM server works in conjunction with the patent/months to issue chart 230 to aid in the R&D Scale-up Stage is similar to the Feasibility Stage, as described above with reference to FIG. 63.

D. Portfolio Stage

Figure 66:
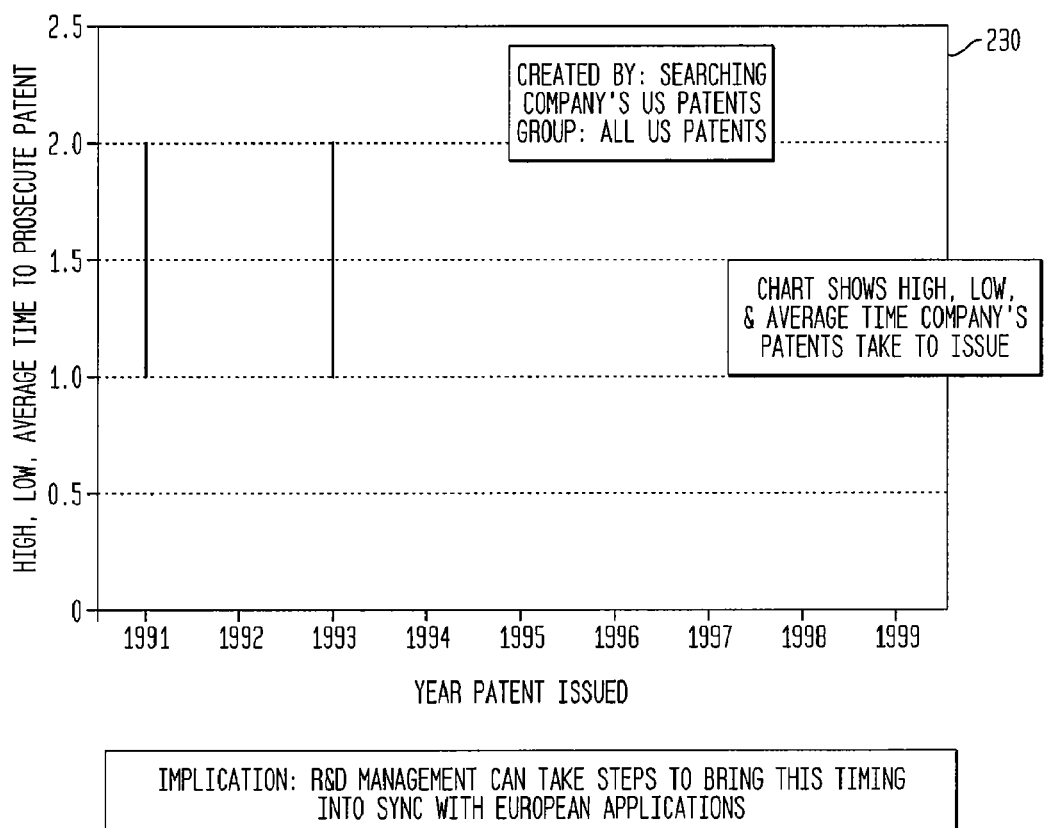
FIG. 66 illustrates the patent/months to issue facilitating the Portfolio Stage according to an embodiment of the present invention.

FIG. 66 illustrates the patent/months to issue chart 230, used in the Portfolio Stage, as Tool 54, entitled "Cycle Time for Patent Prosecution." The purpose of Tool 54 in the Portfolio Stage is to provide information to R&D management so it can take steps to bring the timing of their U.S. patents/applications into sync with European applications. The patent/months to issue chart 230 also shows the high, low, and average time the company's patents take to issue. How the IPAM server works in conjunction with the patent/months to issue chart 230 to aid in the R&D Portfolio Stage is similar to the Feasibility Stage, as described above with reference to FIG. 63. One exception is that the search is more focused on the company's U.S. patents, but is not limited to this.

XVI. IPAM Server and Document/Annotation

Referring to FIG. 2, IPAM server works in conjunction with the document/annotation 232 to facilitate the Idea Stage (as Tool 9), the Preliminary Assessment Stage (as Tool 20), the Feasibility Stage (as Tool 32), the Development Stage (as Tool 43), the Scale-up Stage (as Tool 50) and the Portfolio Stage (as Tool 55). Document annotation by IP server is described in detail in the patent and applications referenced above in the section entitled "Cross Reference to Other Patents and Applications." In general, during the different stages of an R & D project, the user can utilize the document notation 232 to help create a document trail. For example, in the Idea Stage any notes or annotations create by the user/inventor for an idea will help to establish priority dates in the future as needed.

A. Idea Stage

Figure 67:
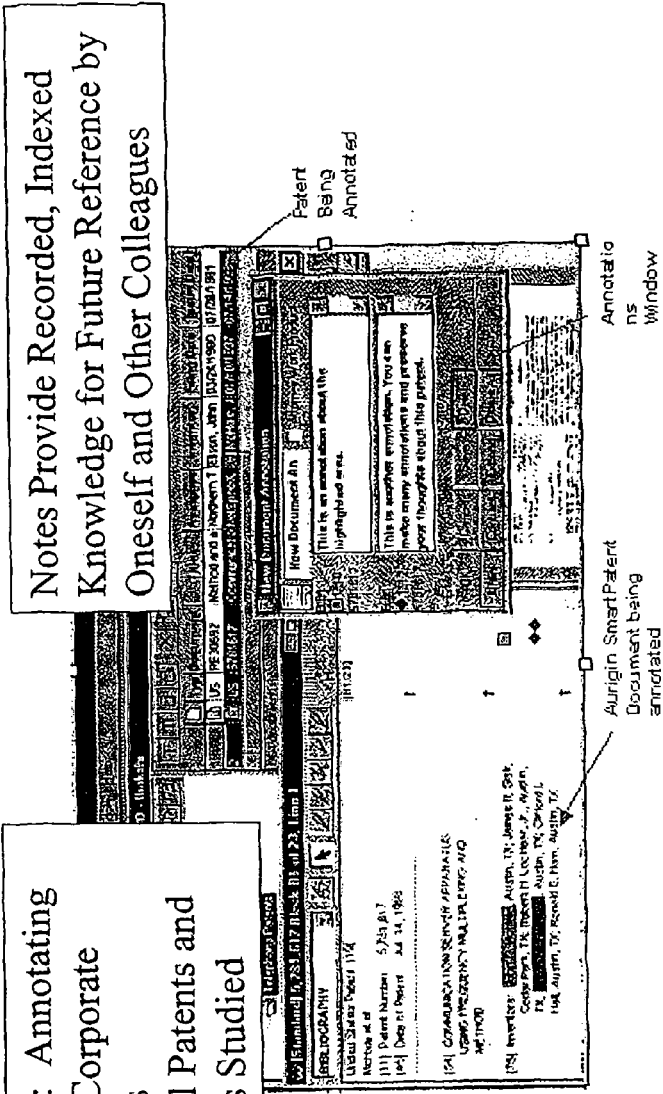
FIG. 67 illustrates the document/annotation facilitating the Idea Stage according to an embodiment of the present invention.

FIG. 67 illustrates the document/annotation 232, used in the Idea Stage, as Tool 9, entitled "Notes to Document Thoughts and Analysis." The purpose of Tool 9 in the Idea Stage is to start creating a "document trail" of the invention at the same time the idea is researched, thus giving as early of a priority date as possible. The document/annotation 232 provides recorded, indexed knowledge for further reference by the creator or by other colleagues. How the IPAM server works in conjunction with the document/annotation 232 to aid in the R&D Idea Stage is described next with reference to FIG. 68.

Figure 68:
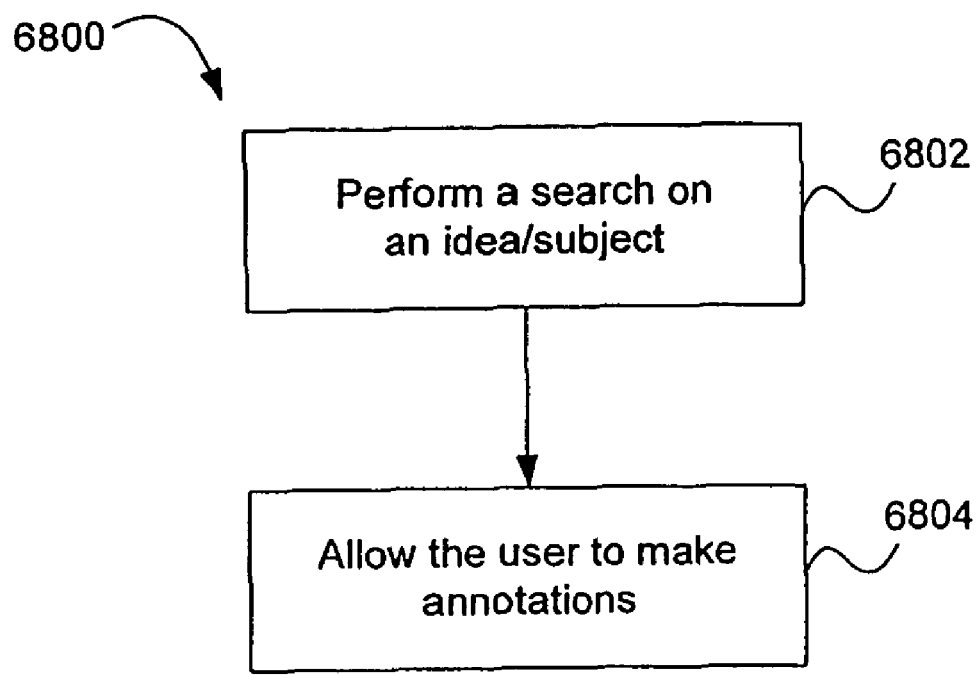
FIG. 68 is a flowchart illustrating how the IPAM server works in conjunction with the document/annotation to aid in the Idea Stage according to an embodiment of the present invention.
Figure 76:
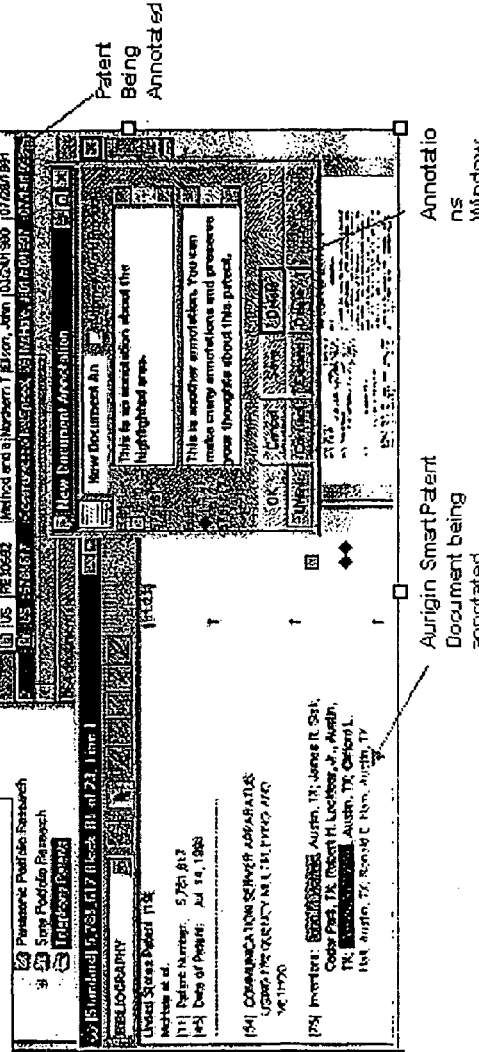

In FIG. 68, a flowchart 6800 begins at step 6802. In step 6802, in an embodiment of the present invention a user performs a search on the groups of patents and corporate documents, but is not limited to this. The search performed is typically a boolean and/or natural language search on the idea/subject to produce a group of patents and/or corporate documents. Control passes to step 6804.

In step 6804, IPAM server allows the user to make annotations on one or more of the patents and/or corporate documents in the group produced by step 6802. Flowchart 6800 ends at this point.

B. Preliminary Assessment Stage

FIG. 69 illustrates the document/annotation 232, used in the Preliminary Assessment Stage, as Tool 20, entitled "Notes to Document Thoughts and Analysis." The purpose of Tool 20 in the Preliminary Assessment Stage is to create the documentation of the continuous effort to reduce the idea to practice and to obtain patent protection. The document/annotation 232 provides recorded, indexed knowledge for further reference by the project team members, management and patent attorneys. How the IPAM server works in conjunction with the document/annotation 232 to aid in the R&D Preliminary Assessment Stage is similar to how it is done in the Idea Stage, as described above with reference to FIG. 68.

C. Feasibility Stage.

FIG. 70 illustrates the document/annotation 232, used in the Feasibility Stage, as Tool 32, entitled "Notes to Document Thoughts and Analysis." The purpose of Tool 32 in the Feasibility Stage is to create the documentation of the continuous effort to reduce the idea to practice and to obtain patent protection. The document/annotation 232 provides recorded, indexed knowledge for further reference by the project team members, management and patent attorneys. How the IPAM server works in conjunction with the document/annotation 232 to aid in the R&D Feasibility Stage is similar to how it is done in the Idea Stage, as described above with reference to FIG. 68.

D. Development Stage

Figure 71:
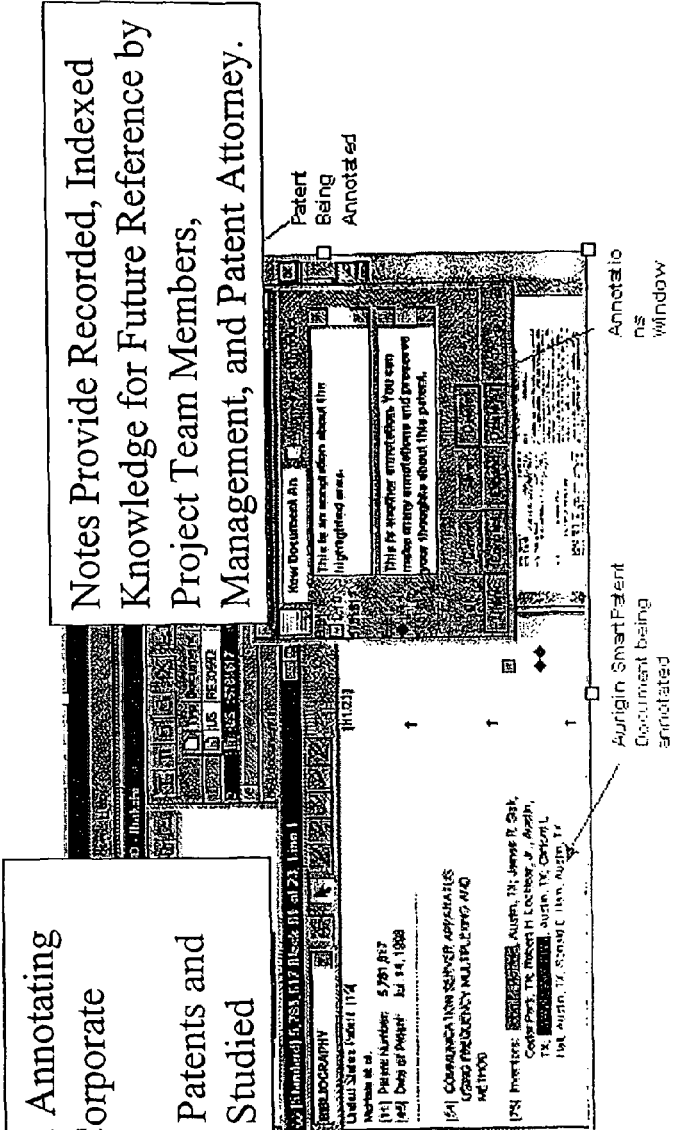
FIG. 71 illustrates the document/annotation facilitating the Development Stage according to an embodiment of the present invention.

FIG. 71 illustrates the document/annotation 232, used in the Development Stage, as Tool 43, entitled "Notes to Support U.S. Patent Application Preparation." The purpose of Tool 43 in the Development Stage is to create the documentation of the continuous effort to reduce the idea to practice and to obtain patent protection. The document/annotation 232 provides recorded, indexed knowledge for further reference by the project team members, management and patent attorneys. How the IPAM server works in conjunction with the document/annotation 232 to aid in the R&D Development Stage is similar to how it is done in the Idea Stage, as described above with reference to FIG. 68.

E. Scale-up Stage

Figure 72:
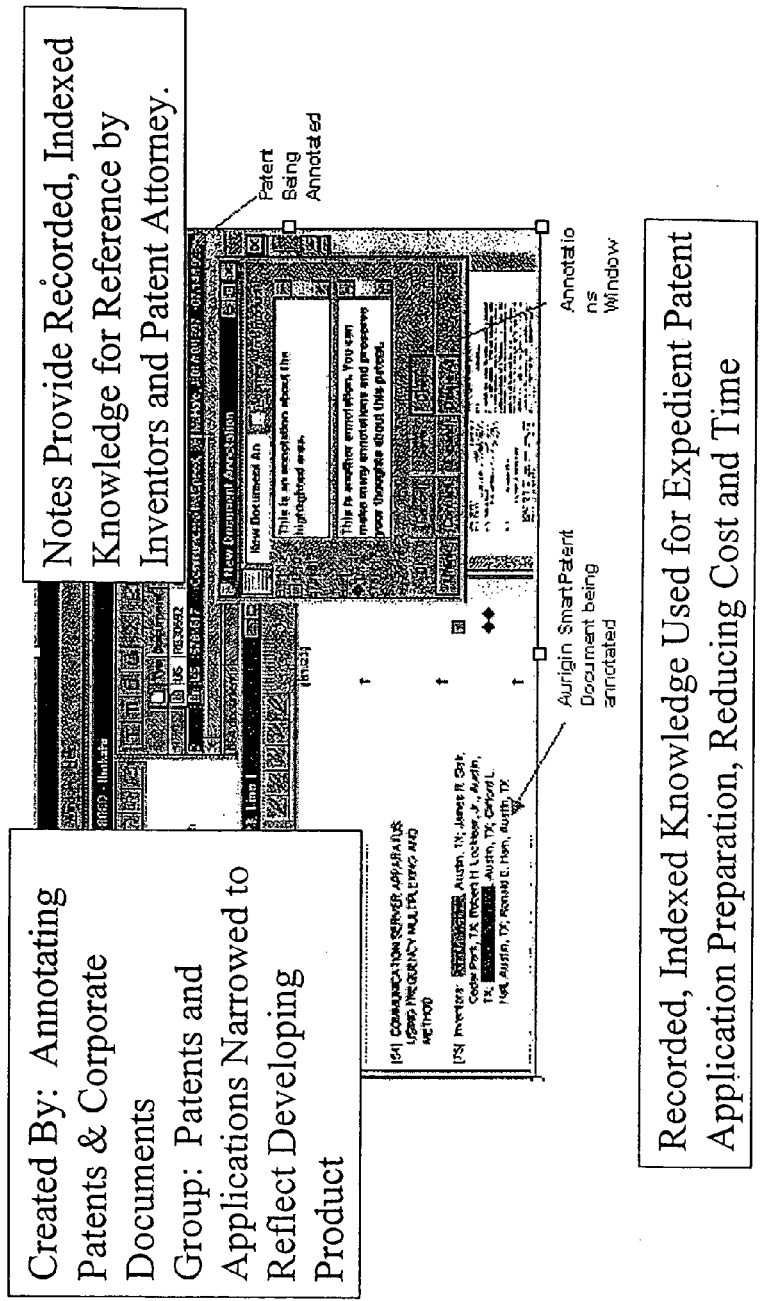
FIG. 72 illustrates the document/annotation facilitating the Scale-up Stage according to an embodiment of the present invention.

FIG. 72 illustrates the document/annotation 232, used in the Scale-up Stage, as Tool 50, entitled "Notes to Document Thoughts and Support U.S. Patent Prosecution and Foreign Filings." The purpose of Tool 50 in the Scale-up Stage is to use recorded, indexed knowledge to expedite the preparation of patent applications, whereby reducing the cost and time The document/annotation 232 provides recorded, indexed knowledge for reference by inventors and patent attorneys. How the IPAM server works in conjunction with the document/annotation 232 to aid in the R&D Scale-up Stage is similar to how it is done in the Idea Stage, as described above with reference to FIG. 68. One exception is that the groups of patents and applications searched are narrowed to only include those that reflect the developing product, but is not limited to this.

F. Portfolio Stage

Figure 73:
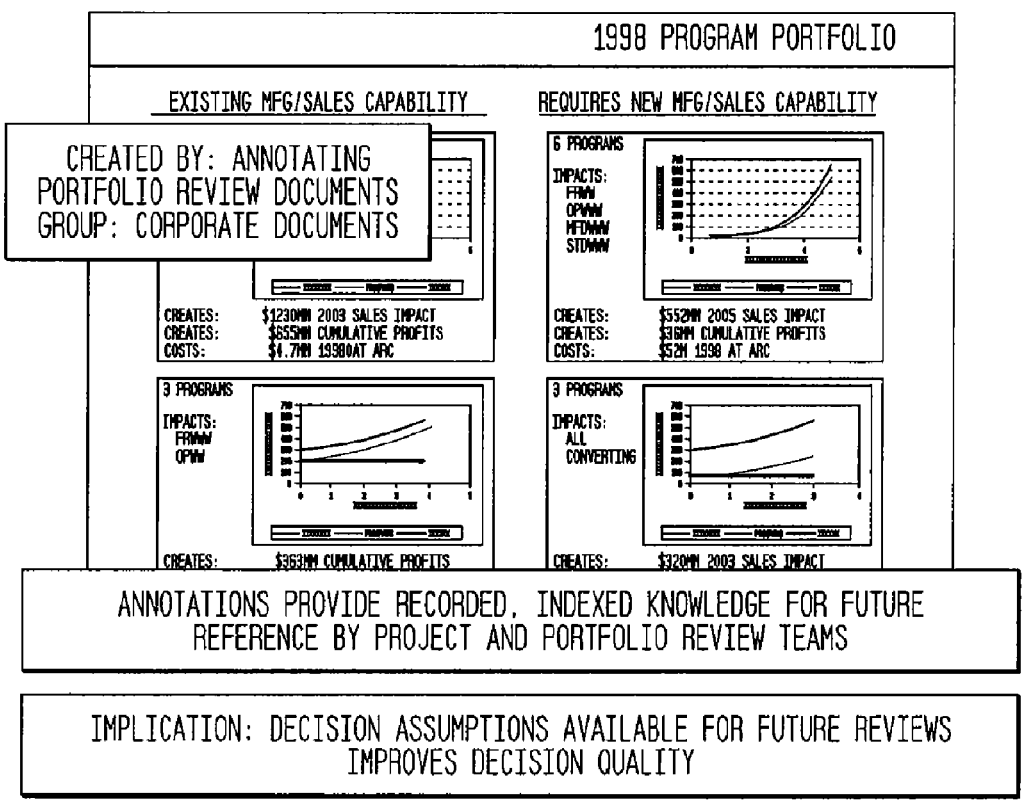
FIG. 73 illustrates the document/annotation facilitating the Portfolio Stage according to an embodiment of the present invention.

FIG. 73 illustrates the document/annotation 232, used in the Portfolio Stage, as Tool 55, entitled "Notes to Document Meeting Thoughts and Analysis." The purpose of Tool 55 in the Portfolio Stage is to improve decision quality through decision assumptions that are made available for future reviews. The document/annotation 232 provides recorded, indexed knowledge for future reference by project and portfolio review teams. How the IPAM server works in conjunction with the document/annotation 232 to aid in the R&D Stage is similar to how it is done in the Idea Stage, as described above with reference to FIG. 68.

One exception is that the initial search is conducted only on the group of corporate documents, but is not limited to this.

XVII. Combination of the Tools or Methods

It is important to note that most, if not all, of the tools or methods described above may be combined to interactively go back and forth between different tools. Note that in the Idea Stage, a user may decided to combine or integrate one or more tools to facilitate the stage. For example, once the group of patents (from the search in step 1002 in FIG. 1) is divided into subgroups (in step 1004 in FIG. 1), the user may use Tool 1 to produce the topographic map 202 and/or Tool 2 to produce the top company table 204, or vice versa. The integration of tools discussed herein to facilitate the R&D stages is limitless.

XVIII. Conclusion

While various application embodiments of the present invention have been described above, it should be understood that they have been presented by way of example only, and not limitation. Thus, the breadth and scope of the present invention should not be limited by any of the above-described exemplary embodiments.

What is claimed is:

1. A computer-implemented method for facilitating performance of sequential stages of a research and development project wherein one of the stages is an idea stage, comprising:
   searching, by a computing device, a group of patents in a technology area related to an idea;
      dividing the group into subgroups according to technology classification;
      mapping the technology classification to a related Standard Industrial Codes classification;
   creating, by the computing device, a patent citation tree by performing a forward citation on the group of patents as part of a sequential stage of a research and development project, wherein the idea stage comprises:
      identifying, based on the group of patents, individuals or companies that are researching, developing, or commercializing ideas related to the idea;
      identifying relationships between the identified individuals or companies; and
      determining, based on the patent citation tree and the identified individuals or companies, the relative uniqueness of the idea and the number of citations to technology related to the idea;
      accessing, by the computing device, a tool box comprising a plurality of tools, wherein the tools are associated with one or more tasks of the sequential stages of the research and development project, and the tools are configured to perform a respective task using information from the searching;
      selecting a tool to perform a task associated with one of the sequential stages of the research and development project;
      performing, by the computing device, the task using the selected tool; and
      performing a second task, by the computing device, wherein the second task is associated with a subsequent stage of the research and development project using at least results from the task and information from the search results.

2. The computer-implemented method of claim 1, wherein the searching comprises searching a group of patents from search results stored in a database, and wherein the selected tool generates a company table that provides a patent count report of assignees involved in areas related to the idea.

3. The computer-implemented method of claim 1, wherein the searching comprises searching a group of patents from search results stored in a database, and wherein the selected tool generates an inventor table that provides a patent count report of inventors that are involved in areas related to the idea.

4. The computer-implemented method of claim 1, wherein the selecting a tool to perform a task comprises at least one of:
   selecting a tool for generating a topographic map;
   selecting a tool for generating a top company table;
   selecting a tool for generating a top inventor table;
   selecting a tool for generating an inventors by company table; invoking a tool for generating a features grouping chart;
   selecting a tool for generating a technology classification;
   selecting a tool for generating a Standard Industrial Codes classification;
   selecting a tool for generating a patent count/year chart;
   selecting a tool for generating an application count/year report;
   selecting a tool for generating a technology by company map;
   selecting a tool for generating the patent citation tree;
   selecting a tool for generating a nested patent citation tree;
   selecting a tool for generating a product/patent/revenue table;
   selecting a tool for generating a patent/months to issue report; or
   selecting a tool for generating document annotation.

5. The computer-implemented method of claim 1, wherein one of the stages is a preliminary assessment stage, wherein the preliminary assessment stage comprises:
   searching a group of patents from results stored in a database;
   dividing the group into subgroups according to inventor;
   dividing the subgroup according to assignee; and
   selecting a tool for generating an inventors by company table, wherein the inventors by company table identifies inventors who have worked in an area pertaining to an idea of a company.

6. The computer-implemented method of claim 1, wherein one of the stages is a preliminary assessment stage, wherein the preliminary assessment stage comprises:
   searching a group of patents from results stored in a database; and
   selecting a tool for generating a features grouping chart that displays product feature sets in a project.

7. The computer-implemented method of claim 1, wherein the searching further comprises:
   searching a group of patents from results stored in a database;
   wherein the idea stage further comprises:
   dividing the group into subgroups according to technology classification; and
   selecting a tool for generating a technology classification, wherein the technology classification provides information pertaining to other technology that could be used to build upon an initial concept.

8. The computer-implemented method of claim 1, further comprising:
   searching a group of patents related to the idea comprises searching a group of patents from results stored in a database;
   wherein the idea stage, further comprises:
   dividing the group into subgroups according to assignee; and
   selecting a tool for generating a technology by company map, wherein the map provides information regarding competitors that have shown effort in areas related to an idea.

9. The computer-implemented method of claim 1, wherein one of the stages is a preliminary assessment stage, wherein the preliminary assessment stage comprises:
   searching a group of patents from results stored in a database;

dividing the group into subgroups according to technology classification;

mapping the technology classification to a related Standard Industrial Codes classification; and selecting a tool for generating a Standard Industrial Codes classification that provides information to enable markets, which should be assessed, to be located.

10. The computer-implemented method of claim 1, wherein one of the stages is a development stage, wherein the development stage comprises:

searching a group of patents from results stored in a database; and selecting a tool for generating the patent citation tree, wherein the patent citation tree provides information pertaining to prior art to acquire during the development stage for freedom to practice.

11. The computer-implemented method of claim 1, wherein the idea stage further comprises:

searching a group of patents from results stored in a database; and selecting a tool for generating a nested patent citation tree that allows promotion of an idea as distinct from other work in a related market.

12. The computer-implemented method of claim 1, wherein one of the stages is a portfolio stage, wherein the portfolio stage comprises:

searching a group of patents from results stored in a database;

sorting the group according to product attributes; and selecting a tool for generating a product/patent/revenue table that distinguishes features of a proposed project from features of existing technology.

13. The computer-implemented method of claim 1, wherein the selecting a task comprises at least one of:

searching a group of company documents;

searching a group of patents and dividing the group into subgroups according to technology classification;

searching a group of patents, dividing the group into subgroups according to inventor, and dividing the subgroups according to assignee;

searching a group of patents and performing a specified number of forward citations on the patents to create a nested patent citation tree;

searching a group of patents, dividing the group into subgroups according to patent classification, and dividing the subgroups according to assignee;

searching a group of patents and documents and sorting the group according to product attributes;

searching a group of patents, sorting the group by a period of time field, and performing calculations relating to the field; or searching a group of patents and documents and annotating the patents and documents.

14. The computer-implemented method of claim 1, wherein the sequential stages of the research and development project further comprise one or more of a preliminary assessment stage, a feasibility stage, a development stage, a scale-up stage, or a portfolio stage.

15. The computer-implemented method of claim 14, wherein the selecting a tool comprises selecting a tool for generating a topographic map, wherein the tool for generating a topographic map is associated with one or more of the idea stage, the preliminary assessment stage, the development stage, and the portfolio stage.

16. The computer-implemented method of claim 14, wherein the selecting a tool comprises selecting a tool for generating a top company table, wherein the tool for generating the top company table is associated with the idea stage.

17. The computer-implemented method of claim 14, wherein the selecting a tool comprises selecting a tool for generating a top inventor table, wherein the tool for generating the top inventor table is associated with the idea stage.

18. The computer-implemented method of claim 14, wherein the selecting a tool comprises selecting a tool for generating an inventors by company table, wherein the tool for generating the inventors by company table is associated with the idea stage.

19. The computer-implemented method of claim 14, wherein the selecting a tool comprises selecting a tool for generating a features grouping chart, wherein the tool for generating the features grouping chart is associated with one or more of the preliminary assessment stage, the feasibility stage, and the development stage.

20. The computer-implemented method of claim 14, wherein the selecting a tool comprises selecting a tool for generating a technology classification, wherein the tool for generating the technology classification is associated with one or more of the idea stage, the preliminary assessment stage, the feasibility stage, the development stage, and the scale-up stage.

21. The computer-implemented method of claim 14, wherein the selecting a tool comprises selecting a tool for generating a Standard Industrial Codes classification, wherein the tool for generating the Standard Industrial Codes classification is associated with one or more of the preliminary assessment stage, the feasibility stage, and the development stage.

22. The computer-implemented method of claim 14, wherein the selecting a tool comprises selecting a tool for generating a patent count/year chart, wherein the tool for generating the patent count/year chart is associated with one or more of the idea stage, the preliminary assessment stage, the feasibility stage, the development stage, and the scale-up stage.

23. The computer-implemented method of claim 14, wherein the selecting a tool comprises selecting a tool for generating an application count/year report, wherein the tool for generating the application count/year report is associated with one or more of the preliminary assessment stage, the feasibility stage, the development stage, and the scale-up stage.

24. The computer-implemented method of claim 14, wherein the selecting a tool comprises selecting a tool for generating a technology by company map, wherein the tool for generating the technology by company map is associated with one or more of the idea stage, the preliminary assessment stage, the feasibility stage, the development stage, and the scale-up stage.

25. The computer-implemented method of claim 14, wherein the selecting a tool comprises selecting a tool for generating a nested patent citation tree, wherein the tool for generating the nested patent citation tree is associated with one or more of the idea stage, the preliminary assessment stage, the feasibility stage, the development stage, and the scale-up stage.

26. The computer-implemented method of claim 14, wherein the selecting a tool comprises selecting a tool for generating a product/patent/revenue table, wherein the tool for generating the product/patent/revenue table is associated with the portfolio stage.

27. The computer-implemented method of claim 14, wherein the selecting a tool comprises selecting a tool for generating a patent/months to issue report, wherein the tool for generating the patent/months to issue report is associated with one or more of the feasibility stage, the development stage, the scale-up stage, and the portfolio stage.

28. The computer-implemented method of claim 14, wherein the selecting a tool comprises selecting a tool for generating document annotation, wherein the tool for generating the document annotation is associated with one or more of the idea stage, the preliminary assessment stage, feasibility stage, the development stage, the scale-up stage, the portfolio stage, and the portfolio stage.

29. A system comprising:
   an input device configured to receive information identifying a technology area related to an idea;
   a processor configured to perform a search on a database based on the received information as part of performing sequential stages of a research and development project, wherein one of the stages is an idea stage, wherein the search includes a search of a group of patents in the technology area related to the idea;
   dividing the group into subgroups according to technology classification;
   mapping the technology classification to a related Standard Industrial Codes classification;
   a tool for performing a forward citation on the group of patents to create a patent citation tree as part of the idea stage, wherein the tool is configured to:
   identify individuals or companies that are researching, developing, or commercializing ideas related to the idea;
   identify relationships between the identified individuals or companies; and
   determine, based on the patent citation tree and the identified individuals or companies, the relative uniqueness of the idea and the number of citations to technology related to the idea;
   a controller configured to generate control signals based on the received information;
   a comparator configured to compare stored information and the control signals to determine a set of the stored information correlating with the control signals; and
   a plurality of tools in a tool box, the tools being configured to formulate a corresponding type of output from the set of stored information, wherein the output is displayed on a display device, wherein the tools are associated with one or more tasks of the sequential stages of the research and development project, wherein the tools are configured to perform a respective task using at least the set of stored information, and wherein the output formulated by at least one of the tools is used as input into at least one tool associated with one or more tasks of a subsequent stage of the research and development project.

30. The system of claim 29, wherein the tool box comprises at least one of:
   a tool for generating a topographic map;
   a tool for generating a top company table;
   a tool for generating a top inventor table;
   a tool for generating an inventors by company table;
   a tool for generating a features grouping chart;
   a tool for generating a technology classification;
   a tool for generating a Standard Industrial Codes classification;
   a tool for generating a patent count/year chart;
   a tool for generating an application count/year report;
   a tool for generating a technology by company map;
   a tool for generating a nested patent citation tree;
   a tool for generating a product/patent/revenue table;
   a tool for generating a patent/months to issue report; or
   a tool for generating document annotation.

31. A tangible computer-readable medium having instructions stored thereon that, in response to execution by a system, cause the system to perform sequential stages of a research and development project wherein one of the stages is an idea stage, the instructions comprising:
   instructions for generating a topographic map to identify existing and non-existing technologies;
   instructions for identifying a new technology area as an idea for research and development using the topographic map;
   instructions for searching a database as part of an idea stage of the research and development project, wherein the instructions for searching comprise instructions for searching of a group of patents in the new technology area related to the idea;
   instructions for dividing the group into subgroups according to technology classification;
   instructions for mapping the technology classification to a related Standard Industrial Codes classification;
   instructions for performing a forward citation on the group of patents to create a patent citation tree as part of the idea stage, wherein the idea stage comprises:
   identifying individuals or companies that are researching, developing, or commercializing ideas related to an idea;
   identifying relationships between the identified individuals or companies; and
   determining, based on the patent citation tree and the identified individuals or companies, the relative uniqueness of the idea and the number of citations to technology related to the idea; and
   instructions for assessing one of the identified existing technologies for possible implementation in the new technology area, wherein the assessment is performed by:
   selecting a tool to perform a task associated with one of the sequential stages of the research and development project;
   performing the task using the selected tool; and
   performing a second task, wherein the second task is associated with a subsequent stage of the research and development project using at least results from the task and information from the search results.

32. The tangible computer-readable medium of claim 31, the instructions further comprising:
   instructions for determining market feasibility and alternative technologies using the topographic map.

33. The tangible computer-readable medium of claim 31, wherein the instructions for generating comprise:
   instructions for searching a database for existing technology; receiving a list of existing technologies; categorizing the existing technologies into groups according to a technology classification; and
   instructions for mapping the technology classification to related Standard Industrial Codes classification.

34. A computer-readable medium having computer readable program code for manipulating information in a database stored thereon, the computer readable program code comprising:
   a first computer readable program code for causing a processor to receive a search input identifying a technology area related to an idea associated with an idea stage of a research and development project;
   a second computer readable program code for causing a processor to receive and store results of the search in the database based on the received search input as part of the idea stage, wherein during the idea stage the second computer readable program code causes the processor to perform a method that comprises:
  searching a group of patents in the technology area related to the idea;
  dividing the group into subgroups according to technology classification;
  mapping the technology classification to a related Standard Industrial Codes classification;
  performing a forward citation on the patents to create a patent citation tree;
  identifying individuals or companies that are researching, developing, or commercializing ideas related to the idea;
  identifying relationships between the identified individuals or companies; and
  determining, based on the patent citation tree and the identified individuals or companies, the relative uniqueness of the idea and the number of citations to technology related to the idea; and
a third computer readable program code for causing a processor to access a tool box comprising a plurality of tools, wherein the tools are associated with one or more tasks of the sequential stages of the research and development project, wherein the tools are configured to perform a respective task using information from the search results stored in the database, wherein the tools are configured to formulate a corresponding type of output from the search results stored in the database, and wherein the output formulated by at least one of the tools is used as input into at least one tool associated with one or more tasks of a subsequent stage of the research and development project.

35. The computer-readable medium of claim 34, wherein the third computer readable program code comprises computer readable program code for at least one of:
  computer readable program code for causing a processor to search a group of company documents;
  computer readable program code for causing a processor to search a group of patents and dividing the group into subgroups according to technology classification;
  computer readable program code for causing a processor to search a group of patents, dividing the group into subgroups according to inventor, and dividing the subgroups according to assignee;
  computer readable program code for causing a processor to search a group of patents and performing a specified number of forward citations on the patents to create a nested patent citation tree;
  computer readable program code for causing a processor to search a group of patents, dividing the group into subgroups according to patent classification, and dividing the subgroups according to assignee;
  computer readable program code for causing a processor to search a group of patents and documents and sorting the group according to product attributes;
  computer readable program code for causing a processor to search a group of patents, sorting the group by a period of time field, and performing calculations relating to the field; or
  computer readable program code for causing a processor to search a group of patents and documents and annotating the patents and documents.

36. A computer-implemented method comprising:
  searching, by a computing device, a group of patents in a technology area related to an idea;
  dividing, by the computing device, the group into subgroups according to technology classification;
  mapping, by the computing device, the technology classification to a related Standard Industrial Codes classification;
  performing a forward citation on the group of patents as part of one or more sequential stages of a research and development project, said stages including an idea stage, a preliminary assessment stage, a feasibility stage, a development stage, a scale-up stage, and a portfolio stage, and wherein the idea stage comprises:
    identifying, based on the group of patents, individuals or companies that are researching, developing, or commercializing ideas related to the idea;
    identifying relationships between the identified individuals or companies; and
    determining, based on the forward citation and the identified individuals or companies, the relative uniqueness of the idea and the number of citations to technology related to the idea;
  accessing, by the computing device, a tool box comprising a plurality of tools, wherein the tools are associated with one or more tasks of the sequential stages of the research and development project, and the tools are configured to perform a respective task using information from the searching;
  receiving a selection of a tool to perform a task associated with the preliminary assessment stage;
  performing, by the computing device, the task associated with the preliminary assessment stage using the selected tool and results from the idea stage; and
  receiving a selection of a tool to perform a second task associated with a subsequent stage of the research and development project; and
  performing, by the computing device, the second task associated with the subsequent stage using the selected tool and results from the preliminary assessment stage, wherein the subsequent stage is one or more of the feasibility stage, the development stage, the scale-up stage, and the portfolio stage.

37. A computer-implemented method for enabling review of patent and non-patent documents as part of a research and development project, the method comprising:
  searching, by an intellectual property asset manager (IPAM) server, a group of patents in a technology area related to an idea;
  dividing, by the IPAM server, the group into subgroups according to technology classification;
  mapping, by the IPAM server, the technology classification to a related Standard Industrial Codes classification;
  performing, by the IPAM server, a forward citation on the group of patents as part of one or more sequential stages of the research and development project, said stages including an idea stage and one or more of a preliminary assessment stage, a feasibility stage, a development stage, a scale-up stage, and a portfolio stage, and wherein the idea stage comprises:
    identifying, based on the group of patents, individuals or companies that are researching, developing, or commercializing ideas related to the idea;
    identifying relationships between the identified individuals or companies; and
    determining, based on the forward citation and the identified individuals or companies, the relative uniqueness of the idea and the number of citations to technology related to the idea;
  accessing, by the IPAM server, a tool box comprising a plurality of tools, wherein the tools are associated with one or more tasks of the sequential stages of the research and development project, and the tools are configured to perform a respective task using information from the searching;

receiving, at the IPAM server, a selection of a tool to perform a first task associated with one of the sequential stages of the research and development project;

performing, by the IPAM server, the first task associated with the stage using the selected tool and results from the idea stage;

receiving a selection of a tool to perform a second task associated with a next stage of the research and development project; and performing the second task, by the IPAM server, wherein the second task is associated with the next stage of the research and development project using at least results from the first task and information from the search results.

* * * * *

UNITED STATES PATENT AND TRADEMARK OFFICE
CERTIFICATE OF CORRECTION

| | | |
|---|---|---|
| PATENT NO. | : 7,966,328 B2 | |
| APPLICATION NO. | : 11/513165 | |
| DATED | : June 21, 2011 | |
| INVENTOR(S) | : Germeraad et al. | |

It is certified that error appears in the above-identified patent and that said Letters Patent is hereby corrected as shown below:

On the Title Page, item (75), under "Inventors", Line 1, delete "Paul Germeraad,"
and insert -- Paul B. Germeraad, --.

On the Title Page, item (75), under "Inventors", Line 3, delete "Irviing" and insert -- Irving --.

Page 3, item (56), under "Other Publications", Line 33, delete "Coproration,"
and insert -- Corporation, --.

Page 3, item (56), under "Other Publications", Line 53, delete "Serivces:"
and insert -- Services: --.

Page 4, item (56), under "Other Publications", Line 45, delete ""ZyImage"
and insert -- "ZyImage --.

Page 4, item (56), under "Other Publications", Line 46, delete "Pulishing"
and insert -- Publishing --.

Page 4, item (56), under "Other Publications", Line 48, delete ""ZyImage,""
and insert -- "ZyImage," --.

Page 4, item (56), under "Other Publications", Line 49, delete ""ZyImage:"
and insert -- "ZyImage: --.

Page 4, item (56), under "Other Publications", Line 49, delete "ZyImage,""
and insert -- ZyImage," --.

Page 5, item (56), under "Other Publications", Line 3, delete ""ZyImage's"
and insert -- "ZyImage's --.

Signed and Sealed this
Twenty-fifth Day of October, 2011

David J. Kappos
*Director of the United States Patent and Trademark Office*

CERTIFICATE OF CORRECTION (continued)
U.S. Pat. No. 7,966,328 B2

Page 5, item (56), under "Other Publications", Line 52, delete "Mazazine." and insert -- Magazine. --.

Page 5, item (56), under "Other Publications", Line 55, delete ""ZyImage" and insert -- "ZyImage --.

Page 5, item (56), under "Other Publications", Line 64, delete "wit" and insert -- with --.

Page 6, item (56), under "Other Publications", Line 28, delete ""ZyImage" and insert -- "ZyImage --.

Page 6, item (56), under "Other Publications", Line 30, delete ""ZyImage" and insert -- "ZyImage --.

Page 6, item (56), under "Other Publications", Line 3, delete ""ZyIndex" and insert -- "ZyIndex --.

Page 6, item (56),"under "Other Publications", Line 8, delete ""ZyImage" and insert -- "ZyImage --.

Page 6, item (56), under "Other Publications", Line 8, delete "ZyIndex,"" and insert -- ZyIndex," --.

Page 6, item (56), under "Other Publications", Line 10, delete ""ZyImage" and insert -- "ZyImage --.

Page 6, item (56), under "Other Publications", Line 10, delete "ZyIndex" and insert -- ZyIndex --.

Page 6, item (56), under "Other Publications", Line 48, delete "Performanc" and insert -- Performance --.

Page 6, item (56), under "Other Publications", Line 64, delete "to2" and insert -- to --.

Page 7, item (56), under "Other Publications", Line 61, delete "Anouncements" and insert -- Announcements --.

Page 7, item (56), under "Other Publications", Line 68, delete ""ZyImage:" and insert -- "ZyImage: --.

Page 7, item (56), under "Other Publications", Line 31, delete "ZyIndex" and insert -- ZyIndex --.

CERTIFICATE OF CORRECTION (continued)
U.S. Pat. No. 7,966,328 B2

Page 7, item (56), under "Other Publications", Line 38, delete ""Zylmage:" and insert -- "ZyImage: --.

Page 7, item (56), under "Other Publications", Line 65, delete "Magzine." and insert -- Magazine. --.

Page 7, item (56), under "Other Publications", Line 68, delete "Zylndex" and insert -- ZyIndex --.

Column 1, line 36, delete "application" and insert -- from application --.

Column 2, line 18, delete "application" and insert -- from application --.